United States Patent [19]
Furuyama et al.

[11] Patent Number: 6,081,668
[45] Date of Patent: Jun. 27, 2000

[54] CAMERA

[75] Inventors: Kiyomitsu Furuyama, Yokohama; Takashi Watanabe, Fuchu; Shigeki Sato, Yokohama, all of Japan

[73] Assignee: Canon Kabushiki Kaisha, Tokyo, Japan

[21] Appl. No.: 09/181,381

[22] Filed: Oct. 28, 1998

[30] Foreign Application Priority Data

Oct. 31, 1997 [JP] Japan .................................. 9-314589
Mar. 18, 1998 [JP] Japan ................................. 10-088325
May 7, 1998 [JP] Japan ................................. 10-124632

[51] Int. Cl.⁷ ................................................. G03B 13/36
[52] U.S. Cl. .............................. 396/55; 396/80; 396/123; 396/104; 396/147

[58] Field of Search .................................. 396/52, 53, 54, 396/55, 121, 122, 123, 79, 80, 104, 147

[56] References Cited

U.S. PATENT DOCUMENTS 5,862,415  1/1999  Matsumoto ................................. 396/55

*Primary Examiner*—W. B. Perkey
*Attorney, Agent, or Firm*—Robin, Blecker & Daley

[57] ABSTRACT

A camera is designed to select at least any one of a plurality of focus areas and adjust the focus relative to an object located in the selected focus area. The camera comprises panning detection means for detecting a panning operation and focus area selecting means for selecting a specific focus area among the plurality of focus areas based on the detection result of the panning detection means.

39 Claims, 44 Drawing Sheets

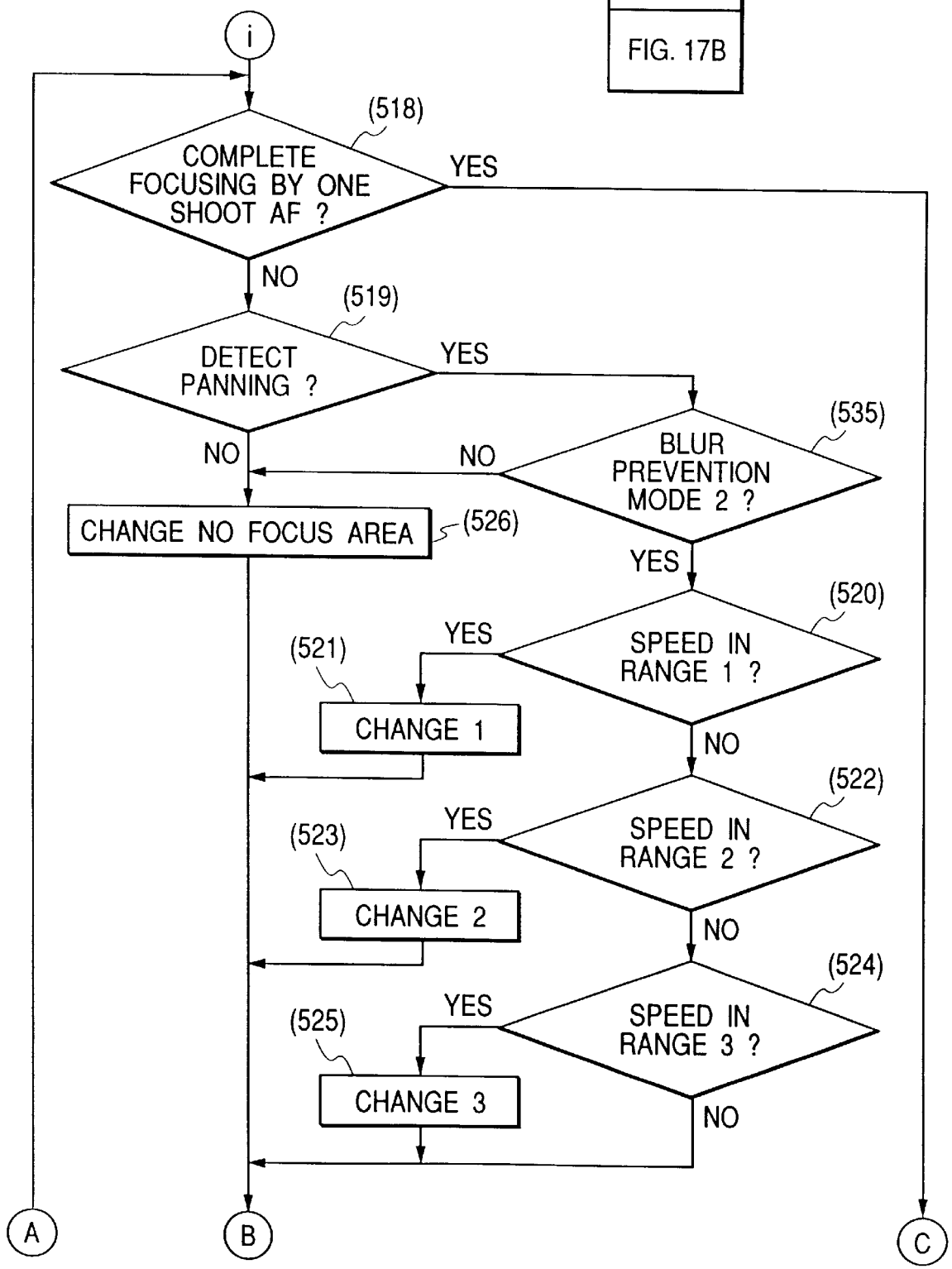

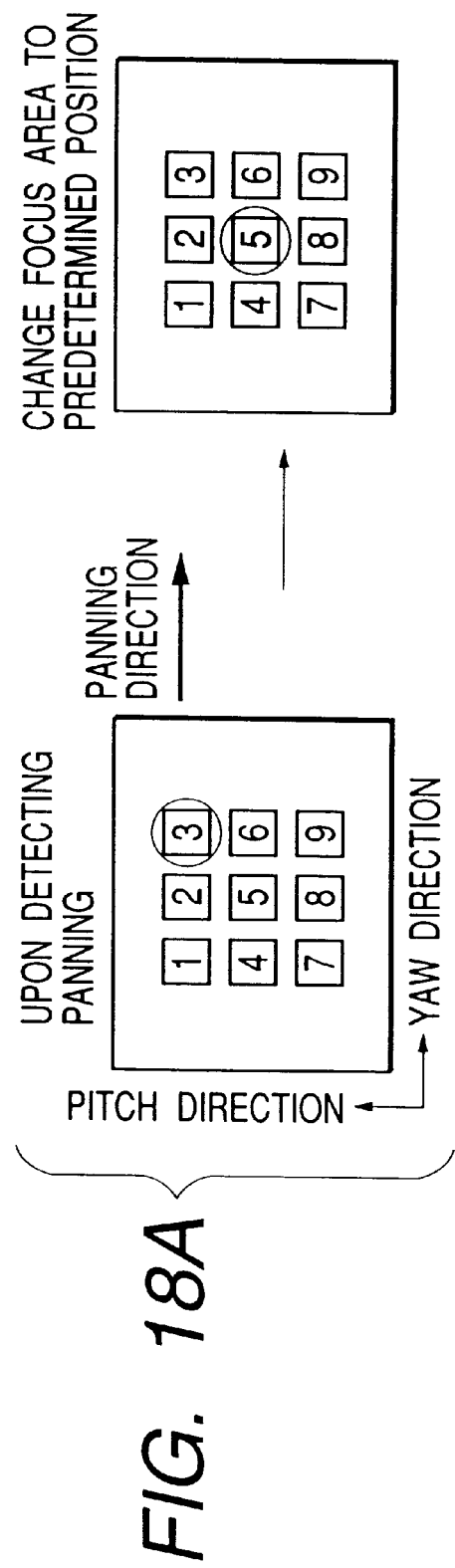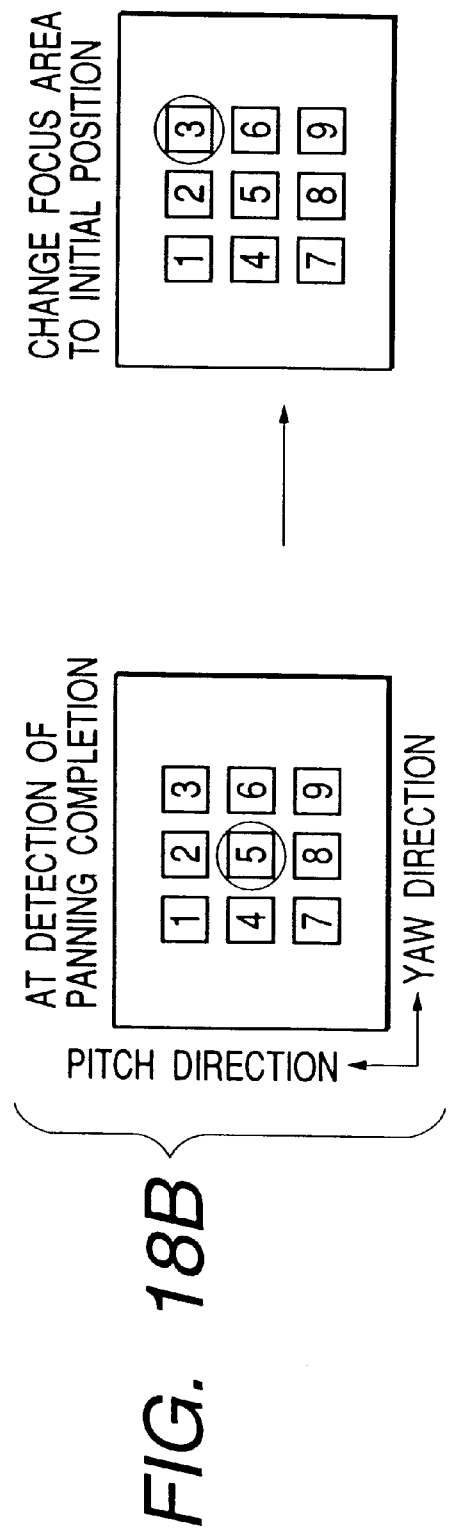

FIG. 25

| | DISTANCES TO OBJECT (m) IN FOCUS AREAS | COEFFICIENTS OF SELECTING PRIORITY IN FOCUS AREAS | EVALUATION VALUES FOR SELECTION IN FOCUS AREAS |
|---|---|---|---|
| NOT PANNING | (a)<br>\| 5 \| 15 \| 50 \|<br>\| 8 \| 10 \| 6 \|<br>\| 7 \| 7 \| 8 \| | (b)<br>\| 1 \| 1 \| 1 \|<br>\| 1 \| 1 \| 1 \|<br>\| 1 \| 1 \| 1 \| | (c)<br>\| (5) \| 15 \| 50 \|<br>\| 8 \| 10 \| 6 \|<br>\| 7 \| 7 \| 8 \| |
| UPON PANNING | (d)<br>\| 5 \| 15 \| 50 \|<br>\| 8 \| 10 \| 6 \|<br>\| 7 \| 7 \| 8 \| | (e)<br>\| 4 \| 2 \| 4 \|<br>\| 2 \| 1 \| 2 \|<br>\| 4 \| 2 \| 4 \| | (f)<br>\| 20 \| 30 \| 200 \|<br>\| 16 \| (10) \| 12 \|<br>\| 28 \| 14 \| 32 \| |

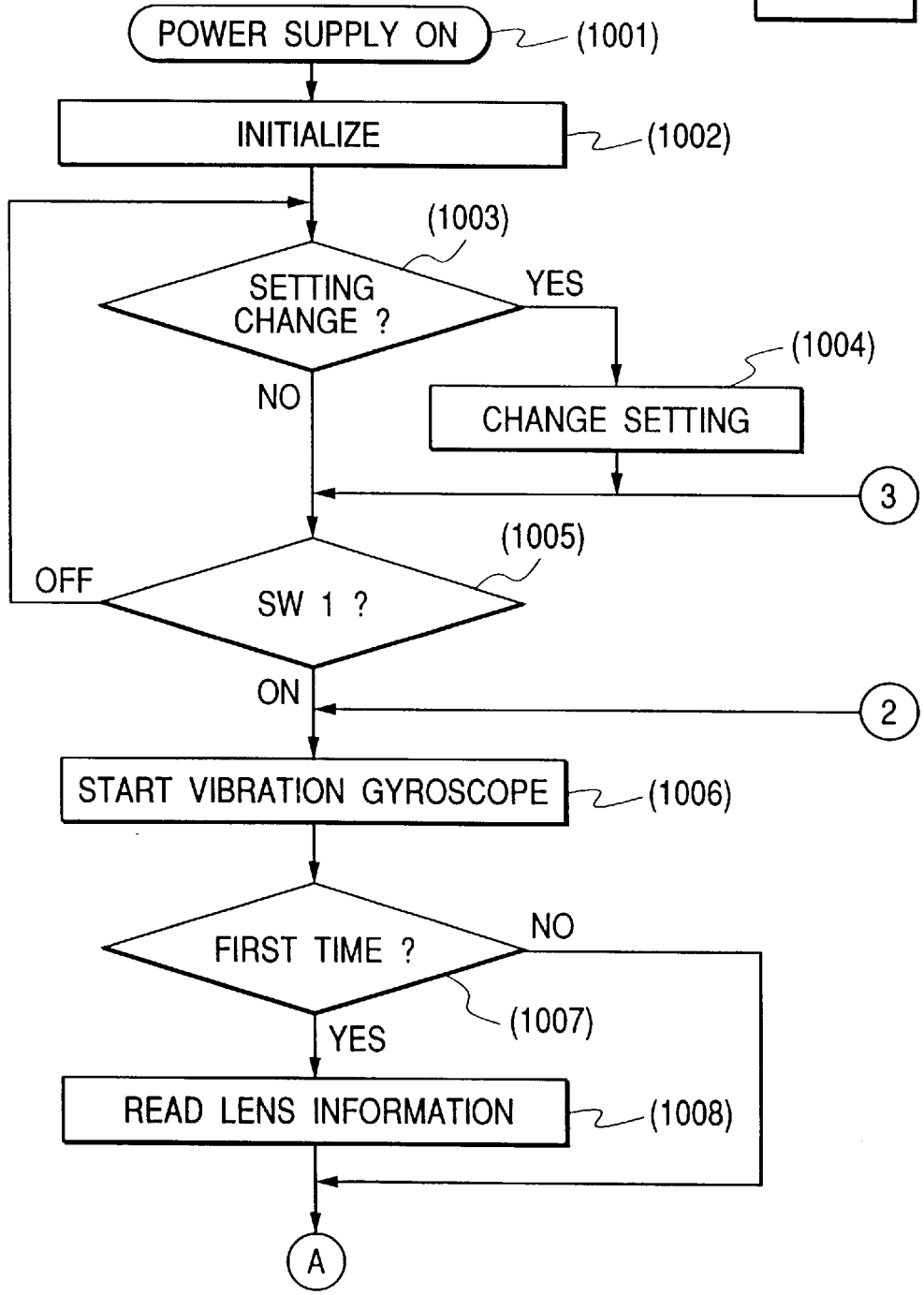

FIG. 29
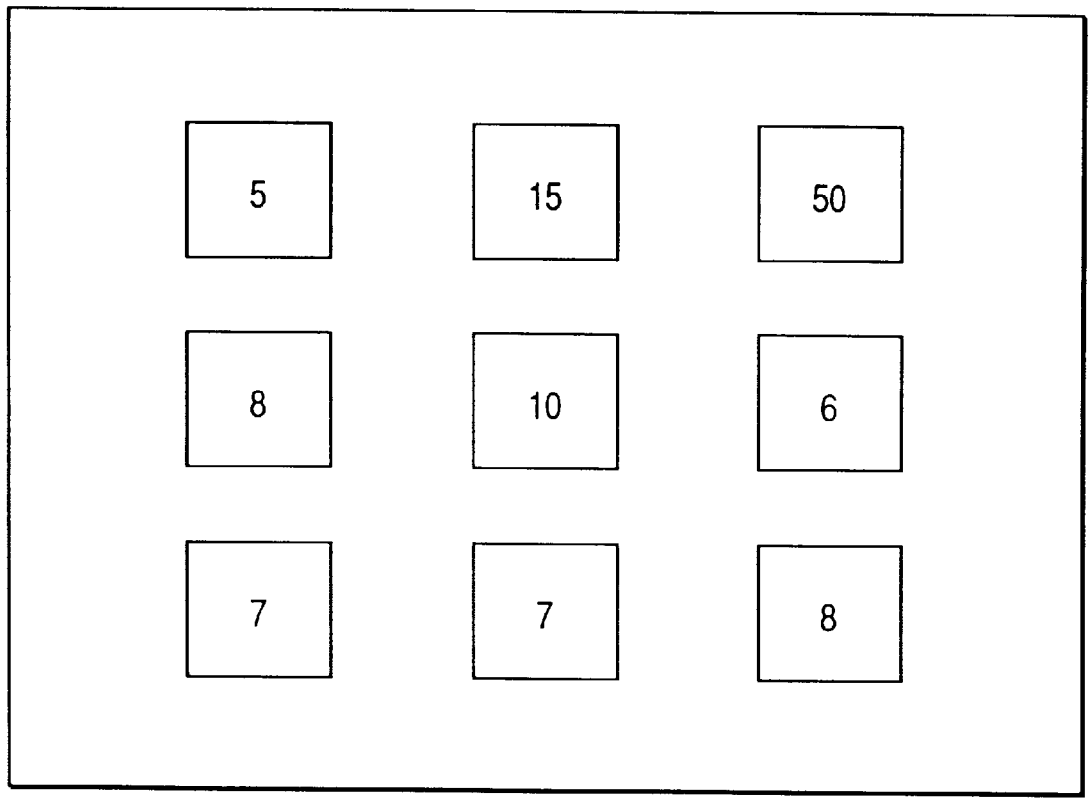
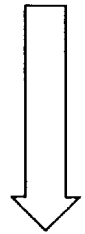

FIG. 31

| | DISTANCES TO OBJECT (m) IN FOCUS AREAS | COEFFICIENTS OF SELECTING PRIORITY IN FOCUS AREAS | EVALUATION VALUES FOR SELECTION IN FOCUS AREAS |
|---|---|---|---|
| NOT PANNING | (a)<br>5, 15, 50<br>8, 10, 6<br>7, 7, 8 | (b)<br>1, 1, 1<br>1, 1, 1<br>1, 1, 1 | (c)<br>5, 15, 50<br>8, 10, 6<br>7, 7, 8 |
| UPON LOW SPEED PANNING | (d)<br>5, 15, 50<br>8, 10, 6<br>7, 7, 8 | (e)<br>4, 2, 4<br>2, 1, 2<br>4, 2, 4 | (f)<br>20, 30, 200<br>16, 10, 12<br>28, 14, 32 |
| UPON HIGH SPEED PANNING | (g)<br>5, 15, 50<br>8, 10, 6<br>7, 7, 8 | (h)<br>8, 4, 8<br>4, 1, 4<br>8, 4, 8 | (i)<br>40, 60, 400<br>32, 10, 24<br>56, 28, 64 |

FIG. 33

| | DISTANCES TO OBJECT (m) IN FOCUS AREAS | COEFFICIENTS OF SELECTING PRIORITY IN FOCUS AREAS | EVALUATION VALUES FOR SELECTION IN FOCUS AREAS |
|---|---|---|---|
| NOT PANNING | (a)<br>5 15 50<br>8 10 6<br>7 7 8 | (b)<br>1 1 1<br>1 1 1<br>1 1 1 | (c)<br>(5) 15 50<br>8 10 6<br>7 7 8 |
| UPON PANNING IN A DIRECTION | (d)<br>5 15 50<br>8 10 6<br>7 7 8 | (e)<br>4 2 1<br>2 1 2<br>1 2 4 | (f)<br>20 30 50<br>16 10 12<br>(7) 14 32 |
| UPON PANNING IN A DIRECTION | (g)<br>5 15 50<br>8 10 6<br>7 7 8 | (h)<br>2 2 2<br>1 1 1<br>2 2 2 | (i)<br>10 30 100<br>8 10 (6)<br>14 14 16 |
| UPON PANNING IN A DIRECTION | (j)<br>5 15 50<br>8 10 6<br>7 7 8 | (k)<br>2 1 2<br>2 1 2<br>2 1 2 | (l)<br>10 15 100<br>16 10 12<br>14 (7) 16 |
| UPON PANNING IN A DIRECTION | (m)<br>5 15 50<br>8 10 6<br>7 7 8 | (n)<br>1 2 4<br>2 1 2<br>4 2 1 | (o)<br>(5) 30 200<br>16 10 12<br>28 14 8 |

FIG. 35

| | DISTANCES TO OBJECT (m) IN FOCUS AREAS | | COEFFICIENTS OF SELECTING PRIORITY IN FOCUS AREAS | | EVALUATION VALUES FOR SELECTION IN FOCUS AREAS | |
|---|---|---|---|---|---|---|
| NOT PANNING | (a) | 5 15 50 / 8 10 6 / 7 7 8 | (b) | 1 1 1 / 1 1 1 / 1 1 1 | (c) | 5 15 50 / 8 10 ⑥ / 7 7 8 |
| ACCELERATION DIRECTION UPON PANNING | (d) | 5 15 50 / 8 10 6 / 7 7 8 | (e) | 4 2 1 / 4 2 1 / 4 2 1 | (f) | 20 30 50 / 32 20 ⑥ / 28 14 8 |
| ACCELERATION DIRECTION UPON PANNING | (g) | 5 15 50 / 8 10 6 / 7 7 8 | (h) | 4 2 1 / 4 2 2 / 4 4 4 | (i) | 20 30 50 / 32 20 ⑫ / 28 28 32 |
| ACCELERATION DIRECTION UPON PANNING | (j) | 5 15 50 / 8 10 6 / 7 7 8 | (k) | 1 1 1 / 2 2 2 / 4 4 4 | (l) | ⑤ 15 50 / 16 20 12 / 28 28 32 |
| ACCELERATION DIRECTION UPON PANNING | (m) | 5 15 50 / 8 10 6 / 7 7 8 | (n) | 1 2 4 / 2 2 4 / 4 4 4 | (o) | ⑤ 30 200 / 16 20 24 / 28 28 32 |
| ACCELERATION DIRECTION UPON PANNING | (p) | 5 15 50 / 8 10 6 / 7 7 8 | (q) | 1 2 4 / 1 2 4 / 1 2 4 | (r) | ⑤ 30 200 / 8 20 24 / 7 14 32 |
| ACCELERATION DIRECTION UPON PANNING | (s) | 5 15 50 / 8 10 6 / 7 7 8 | (t) | 4 4 4 / 2 2 4 / 1 2 4 | (u) | 20 60 200 / 16 20 24 / ⑦ 14 32 |
| ACCELERATION DIRECTION UPON PANNING | (v) | 5 15 50 / 8 10 6 / 7 7 8 | (w) | 4 4 4 / 2 2 2 / 1 1 1 | (x) | 20 60 200 / 16 20 12 / ⑦ ⑦ 8 |
| ACCELERATION DIRECTION UPON PANNING | (y) | 5 15 50 / 8 10 6 / 7 7 8 | (z) | 4 4 4 / 4 2 2 / 4 2 1 | (aa) | 20 60 200 / 32 20 12 / 28 14 ⑧ |

FIG. 37

| | DISTANCES TO OBJECT (m) IN FOCUS AREAS | COEFFICIENTS OF SELECTING PRIORITY IN FOCUS AREAS | EVALUATION VALUES FOR SELECTION IN FOCUS AREAS |
|---|---|---|---|
| NOT PANNING | (a) <br> 5, 15, 50 <br> 8, 10, 6 <br> 7, 7, 8 | (b) <br> 1, 1, 1 <br> 1, 1, 1 <br> 1, 1, 1 | (c) <br> (5), 15, 50 <br> 8, 10, 6 <br> 7, 7, 8 |
| UPON PANNING AND FOCUS DISTANCE IS IN WIDE SIDE | (d) <br> 5, 15, 50 <br> 8, 10, 6 <br> 7, 7, 8 | (e) <br> 4, 2, 4 <br> 2, 1, 2 <br> 4, 2, 4 | (f) <br> 20, 30, 200 <br> 16, (10), 12 <br> 28, 14, 32 |
| UPON PANNING AND FOCUS DISTANCE IS IN TELE SIZE | (g) <br> 5, 15, 50 <br> 8, 10, 6 <br> 7, 7, 8 | (h) <br> 8, 4, 8 <br> 4, 1, 4 <br> 8, 4, 8 | (i) <br> 40, 60, 400 <br> 32, (10), 24 <br> 56, 28, 64 |

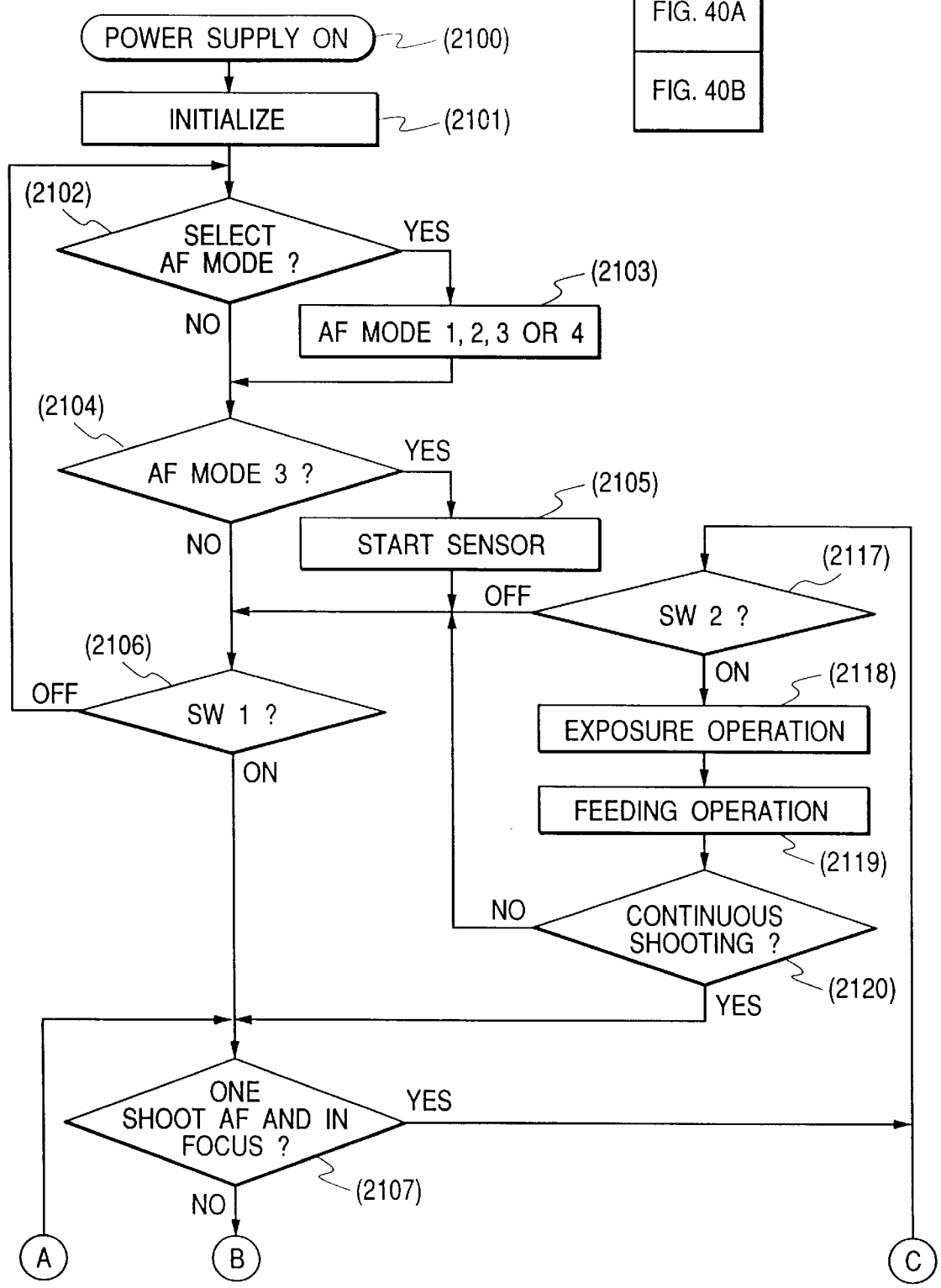

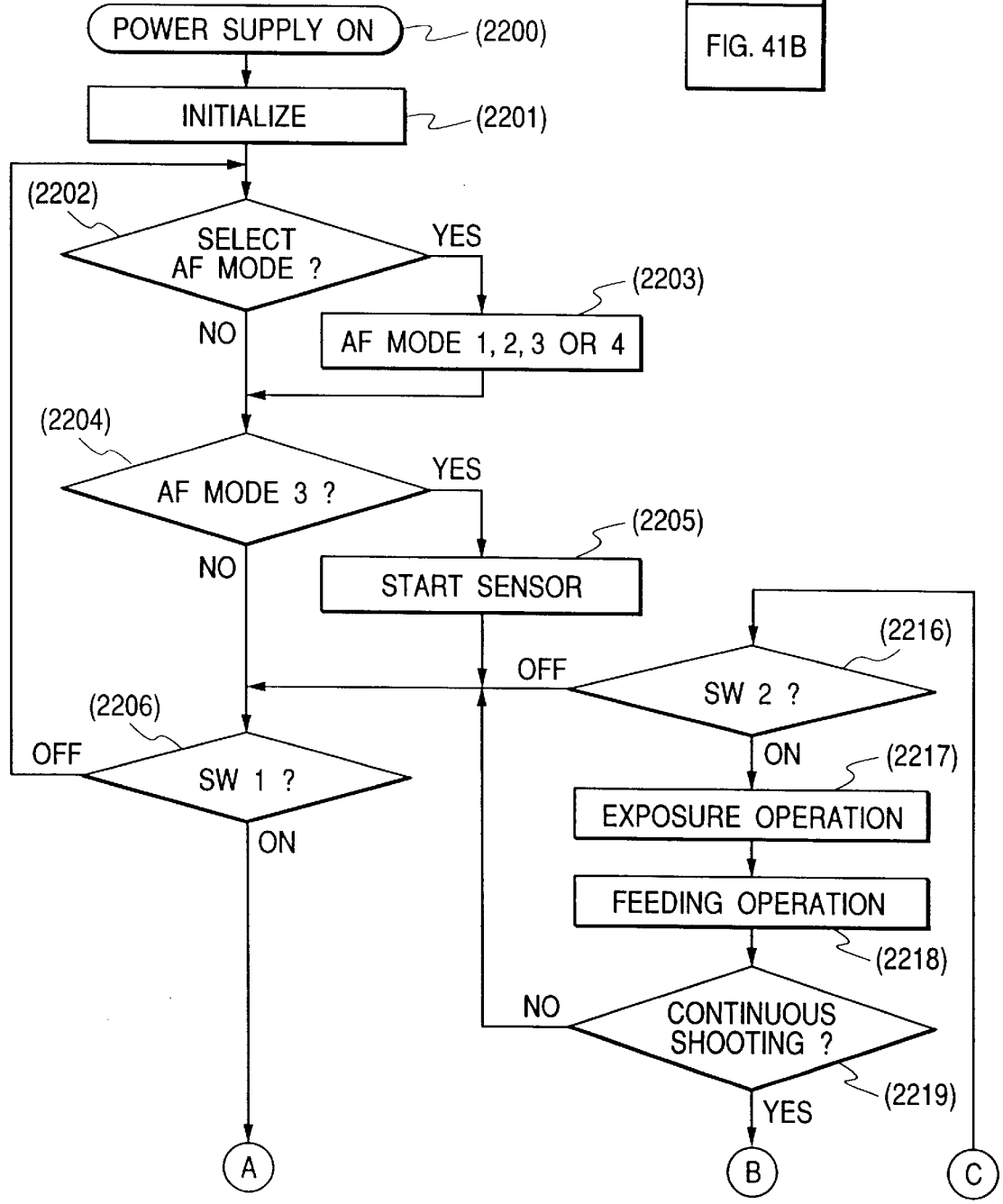

CAMERA

BACKGROUND OF THE INVENTION

1. Field of the Invention

The present invention relates to a camera employed together with a vibration detection means for detecting the vibration of a camera.

2. Related Background Art

Conventionally, a camera provided with a vibration-prevention mechanism using an acceleration sensor or a vibration gyroscope or the like has been well known. The camera of this type has been designed to detect the movement or vibration of the camera based on the output of the above-described sensor and correct the optical system of the camera in accordance with the output of the sensor.

SUMMARY OF THE INVENTION

According to one aspect of the present invention, a camera which selects at least any one focus area from a plurality of focus areas and adjusts the focus on an object located in the focus area comprises panning detecting means for detecting a panning operation and focus area selecting means for selecting a specific focus area from the plurality of focus areas based on the detected result of the panning detecting means. Thus, a specific focus area suitable for the panning operation can be selected.

BRIEF DESCRIPTION OF THE DRAWINGS

FIGS. 18A and 18B show diagrams for illustrating the states of focus area change upon detection of a panning operation or upon detection of completion of a panning operation in a camera according to a sixth embodiment of the present invention;

FIG. 25 is a diagram for explaining evaluation values for selection in focus areas which are obtained by applying coefficients of selecting priority in focus areas to distance information obtained in the eighth embodiment of the present invention;

FIG. 29 is a diagram showing distance information obtained in a plurality of focus detecting points of the automatic focusing camera according to the eighth embodiment of the present invention;

FIG. 31 is a diagram for explaining evaluation values for selection in focus areas obtained by applying coefficients of selecting priority in focus areas to distance information obtained in the ninth embodiment of the present invention;

FIG. 33 is a diagram for explaining evaluation values for selection in focus areas obtained by applying coefficients of selecting priority to distance information obtained in the tenth embodiment of the present invention.

FIG. 35 is a diagram for explaining evaluation values for selection in focus areas obtained by applying coefficients of selecting priority in focus areas to distance information obtained in the eleventh embodiment of the present invention;

FIG. 37 is a diagram for explaining evaluation values for selection in focus areas obtained by applying coefficients of selecting priority in focus areas to distance information obtained in the twelfth embodiment of the present invention;

DETAILED DESCRIPTION OF THE PREFERRED EMBODIMENTS

Now, the present invention will be described in more detail on the basis of the embodiments illustrated in the accompanying drawings.

Figure 1:
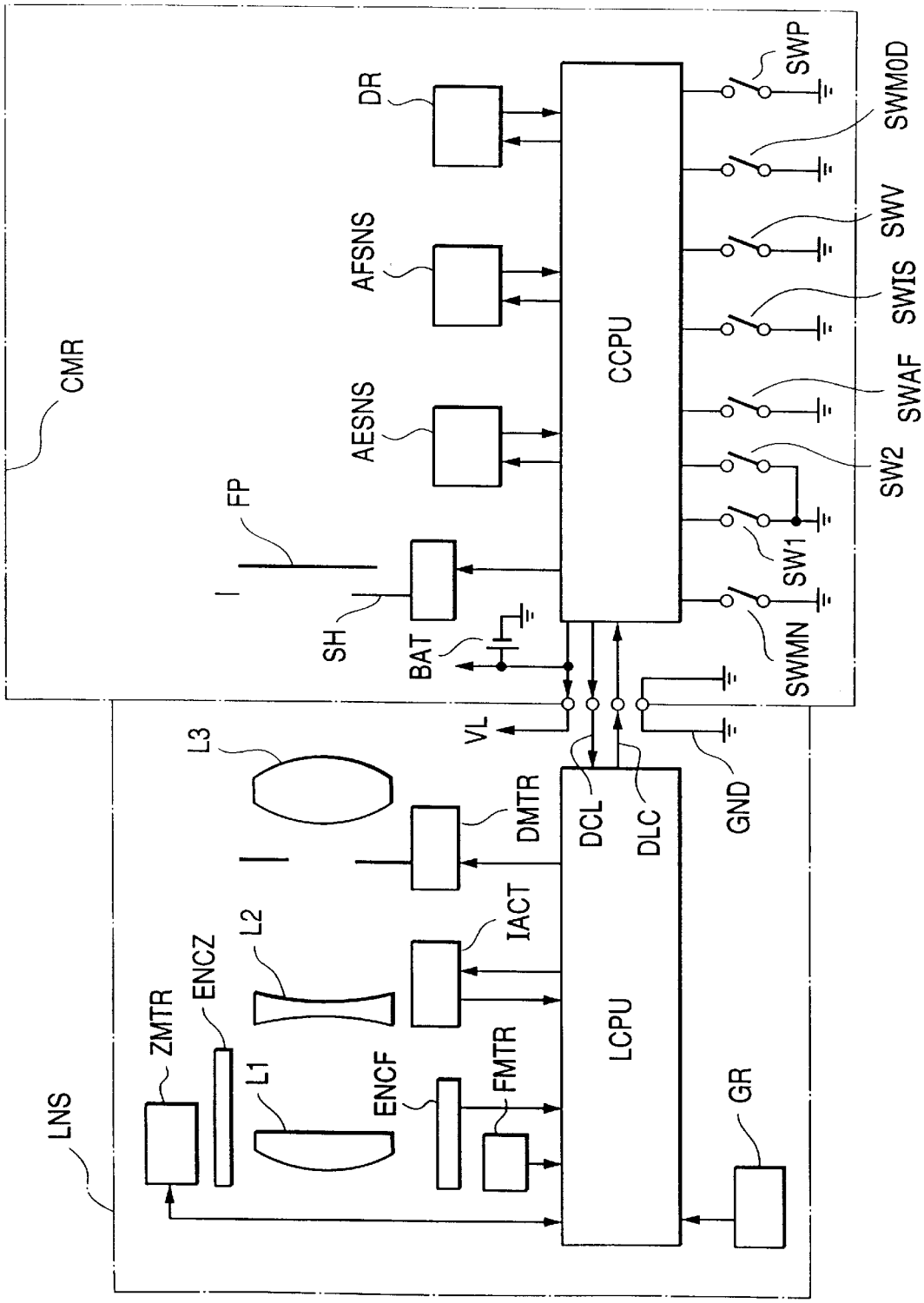
FIG. 1 is a block diagram showing the electric structure of a camera main body and lenses according to the respective embodiments of the present invention.

FIG. 1 is a block diagram showing the construction of the main parts of a camera according to the respective embodiments of the present invention. Therefore, components that are not necessary in some embodiments are also illustrated so that this figure can be employed in all the embodiments. In FIG. 1, CMR designates a camera main body, and LNS designates a lens detachably attached to the camera main body CMR.

Initially, the camera main body CMR side will be described below.

A CCPU is a microcomputer in a camera. It is a 1 chip-microcomputer having ROM, RAM, A/D and D/A converting functions, and performs a series of operations including automatic exposure control (AE), automatic focus adjustment (AF) and film winding (drive), etc., in accordance with the sequence program for the camera stored in the ROM. Accordingly, the microcomputer CCPU in the camera communicates with peripheral circuits in the camera main body CMR and the lens LNS to control the operations of the respective circuits or the lens. Four sets of connecting terminals are provided in a mount part for connecting the camera main body CMR to the lens LNS.

BAT represents a power source in a camera and serves to supply power to the respective circuit or an actuator in the camera and also to the lens LNS through a line VL. DCL is a line for transmitting a signal from the microcomputer CCPU in the camera to a microcomputer LCPU in the lens described below. DLC is a line for transmitting a signal from the microcomputer LCPU in the lens to the microcomputer CCPU in the camera. The camera CMR controls the lens LNS through the two lines. Furthermore, respective grounds are connected together through a line GND.

FP designates a photosensitive film or an image forming surface on which an image pick-up element is arranged and a shutter SH comprising a shading vane and a vane driving control part is arranged immediately before the photosensitive film. AESNS represents a photometry device for measuring the luminance or brightness of an object to be shot. AFSNS is a focus detector for detecting the focal state of the image of the object to be shot and DR is a feeder (drive device) for feeding film or charging the shutter using the power.

SWMN is a main switch. When this switch SWMN is turned on, the microcomputer CCPU permits a predetermined program related to a photographing operation to be executed. SW1 and SW2 are switches interlocking with the release button of the camera and are respectively turned on by pressing down a release button (not shown) to a first stroke position and a second stroke position. SWAF is a switch for setting the AF mode of the camera and can set a one-shoot mode AF (AF mode 1), a servo AF (AF mode 2) and an AI servo AF (AF mode 3). SWIS is a switch for selecting a blur prevention mode (mode for correcting image blur). SWP designates a switch for selecting an arbitrary focus area among a plurality of focus areas. SWMOD is a switch for determining a focus area selecting method upon panning. SWV designates a switch for selecting a speed determination mode.

Next, the construction of the lens LNS side will be described below.

LCPU designates a microcomputer in the lens which has ROM, RAM, A/D and D/A converting functions similarly to the microcomputer CCPU in the camera. It serves to drive and control a focusing motor, a zooming motor, an aperture control motor and an image blur correcting actuator, which will be described later, in accordance with an instruction sent through the signal line DCL from the microcomputer CCPU in the camera. Furthermore, the various kinds of operating states of the lens or parameters peculiar to the lens are transmitted to the microcomputer CCPU in the camera through the signal line DLC.

L1, L2 and L3 designate a first group, a second group and a third group of lenses which are respectively composed of a plurality of lenses. These groups of lenses constitute a photographing optical system provided with a zooming function. The image of an object to be photographed or shot is formed on the image forming surface FP of the camera main body CMR by the photographing optical system. FMTR is a focusing motor which performs a focusing operation by moving forward or backward the first group of lenses L1 in the direction of an optical axis. The position of the first group of lenses L1, that is to say, information corresponding to the distance of the object to be photographed is detected by a focus encoder ENCF which transmits the information to the microcomputer LCPU. ZMTR is a zooming motor which serves to perform a zooming operation by moving forward and backward the first and second groups of lenses L1 and L2 in the direction of an optical direction with a predetermined relationship by a zoom mechanism not shown. The zooming condition is detected by a zoom encoder ENCZ which transmits the zooming condition to the microcomputer LCPU. DMTR designates a step motor for controlling the aperture.

GR is a hand vibration detection sensor such as a vibration gyroscope which detects angular vibration in the vertical or pitch direction and the horizontal or yaw direction of the camera. The hand vibration detection sensor transmits the detected results to the microcomputer LCPU. IACT designates an actuator which corrects the image blur of the second group of lenses L2 supported by a mechanism not shown and drives these lenses in their respective directions so that the second group of lenses can be shifted independently in the two-dimensional directions on a plane perpendicular to the photographing optical axis. The second group of lenses L2 are shifted so that the image formed on the image forming surface FP can be also shifted. Therefore, the second group of lenses L2 are shifted and driven based on hand vibration information from the hand vibration detection sensor GR, so that image blur due to the hand vibration can be corrected. In this case, image blur is corrected independently in the two pitch and yaw directions, so that two sets of hand vibration detection sensors GR and image blur correcting actuators IACT are respectively provided for correcting the pitch and yaw directions.

When the switch SW1 is turned on, the camera starts AF and AE. At this time, when the image blur correcting switch SWIS is turned on, correction of image blur is also started simultaneously. Then, when the switch SW2 is turned on, an exposure operation is performed.

Figure 2:
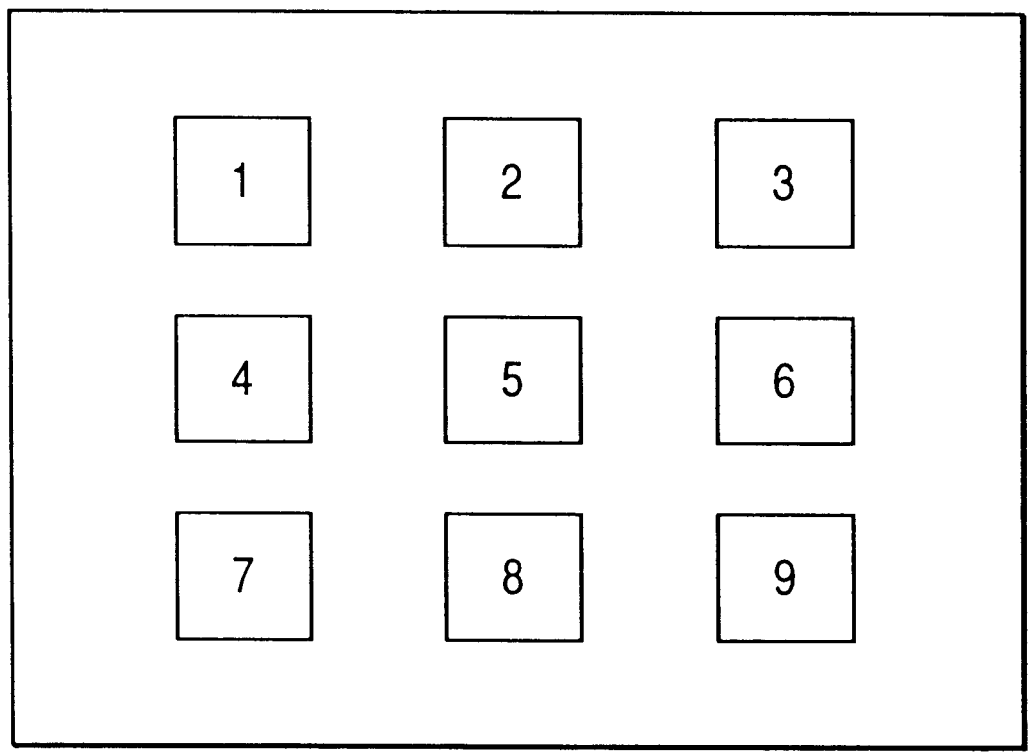
FIG. 2 shows a finder part of the camera main body according to the respective embodiments of the present invention.

FIG. 2 shows the inner part of the finder of the camera. Referring to the figure, nine focus areas are two-dimensionally arranged. For readily understanding the explanation, the positions of the focus areas are represented by the numbers 1 to 9.

All the focus areas can be selected by counting the number of times of the pressing operation of the focus area selecting button SWP or a specific focus area can be selected by the photographer. The selected focus area is displayed on the inner part of the finder or an external display part so that the photographer can recognize it. Accordingly, when a specific focus area is selected, a focus detecting operation is carried out in that focus area and an AF drive is performed to take the focus. If all the focus areas are selected, focus detecting operations are carried out in all the focus areas so that the focus area with a distance nearest to an object is automatically selected based on each defocus amount and the focus is adjusted by driving the AF based on the focus area information. When taking the focus properly, the selected focus area is brightened in the finder so that the photographer can recognize which focus area is in focus.

The panning operation of the camera is detected in accordance with the hand vibration information from the hand vibration detection sensor GR. Thus, when the image blur correcting switch SWIS is turned on, the hand vibration detection sensor GR detects the hand vibration and the panning operation (at this time, an image blur correcting drive system operates as a matter of course). When the image blur correcting switch SWIS is turned off, the image blur correcting drive system is not operated and only the hand vibration detection sensor GR is actuated. Even when the image blur correcting switch SWIS is turned on, the detected hand vibration is outputted from the hand vibration detection sensor GR. Thus, the panning operation of the camera can be detected based on the output. The hand vibration detection sensor GR is, for instance, a vibration gyroscope which serves to detect the angular velocity of the vibration of the camera. Therefore, when an angular velocity no lower than a predetermined angular velocity value is detected for a predetermined time or more in a predetermined direction by the hand vibration detection sensor GR, this can be decided as a panning operation.

As mentioned above, switch SWMOD is the switch for determining the focus area selecting method upon panning of the camera. A mode for not changing the focus area at the time of panning the camera (focus area changing mode 1), a mode for changing the focus area to a central focus area at the time of panning the camera (focus area changing mode 2) and a mode for changing the focus area to a predetermined focus area at the time of panning the camera (focus area changing mode 3) can be thus selected.

Figure 3:
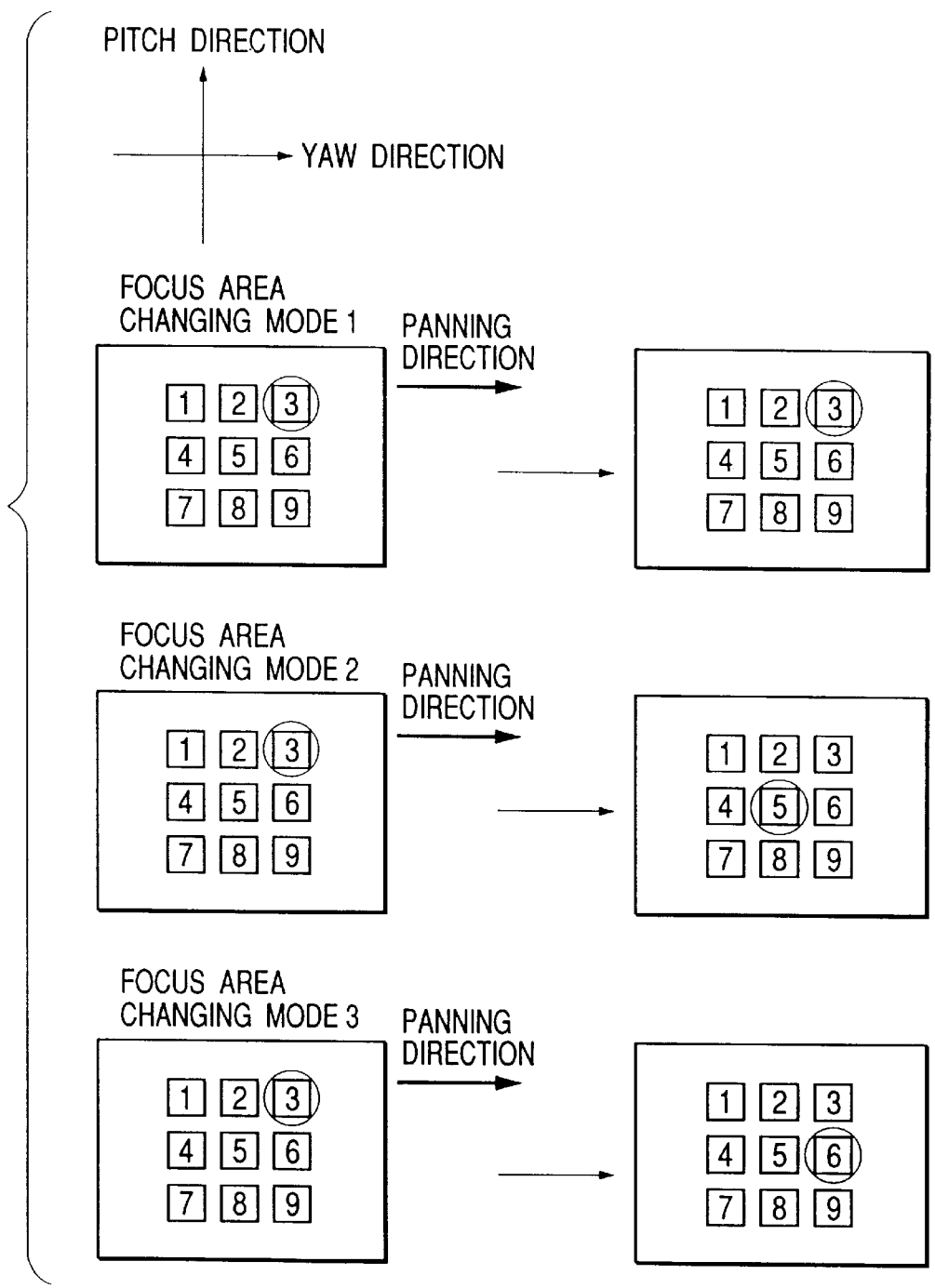
FIG. 3 shows diagrams for illustrating the states of changing a focus area in the focus area changing modes 1 to 3 of a camera according to a first embodiment of the present invention.

Now, an explanation will be given respectively of the above-described focus changing modes with reference to FIG. 3. The focus area changing mode 1 is a mode in which the focus area is not changed upon panning the camera. Furthermore, the focus area changing mode 2 is a mode suitable for beginners who are not accustomed to the panning operation of the camera and designed to change the position of the focus area to the central focus area at the time of panning the camera. Still furthermore, the focus area changing mode 3 is a mode suitable for seniors and designed to change the position of the focus area to the focus area preset through a switch, not shown, by a photographer at the time of panning the camera.

Figure 4:
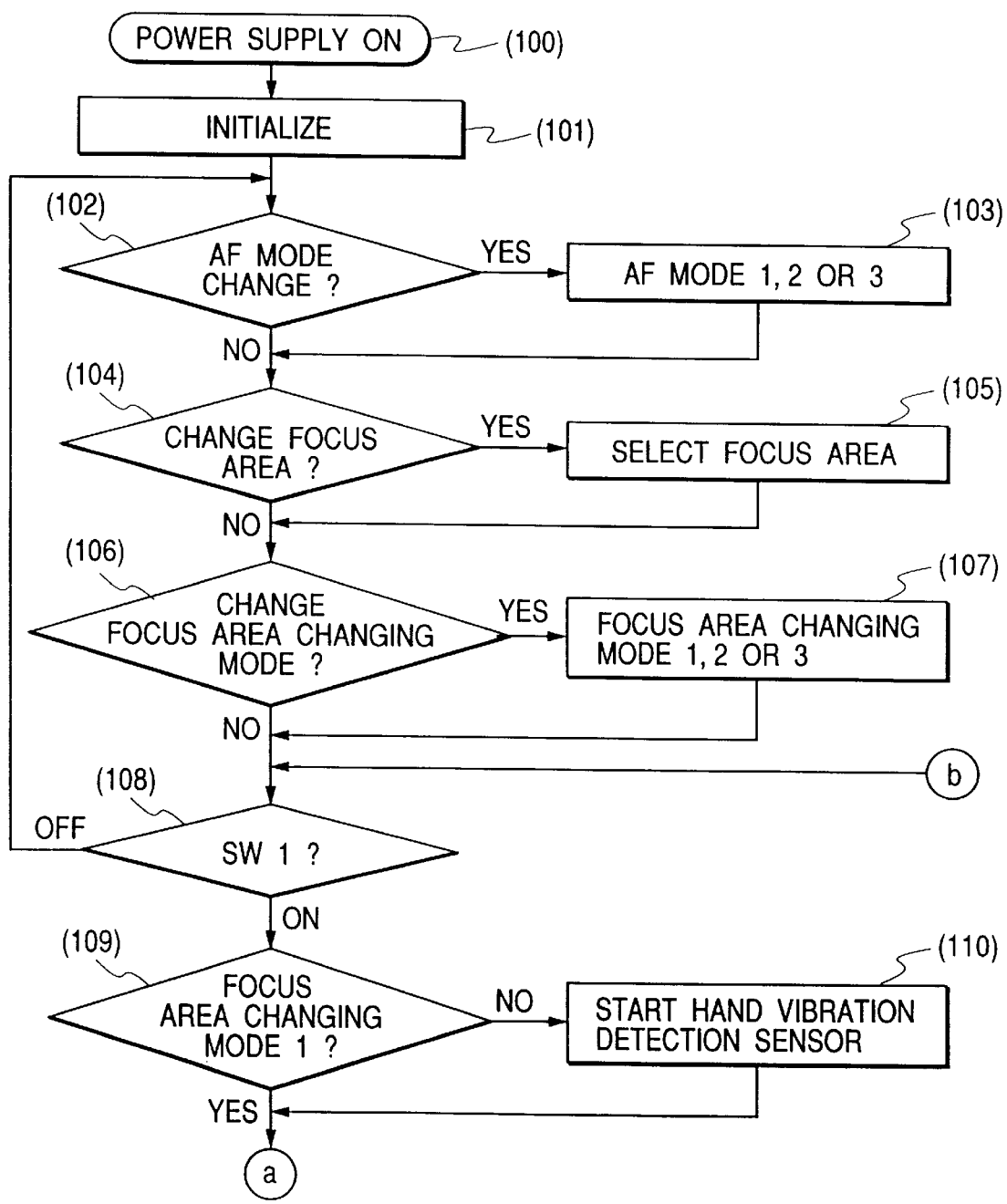
FIG. 4 is a flowchart showing a part of the operation of the camera according to the first embodiment of the present invention.
Figure 5:
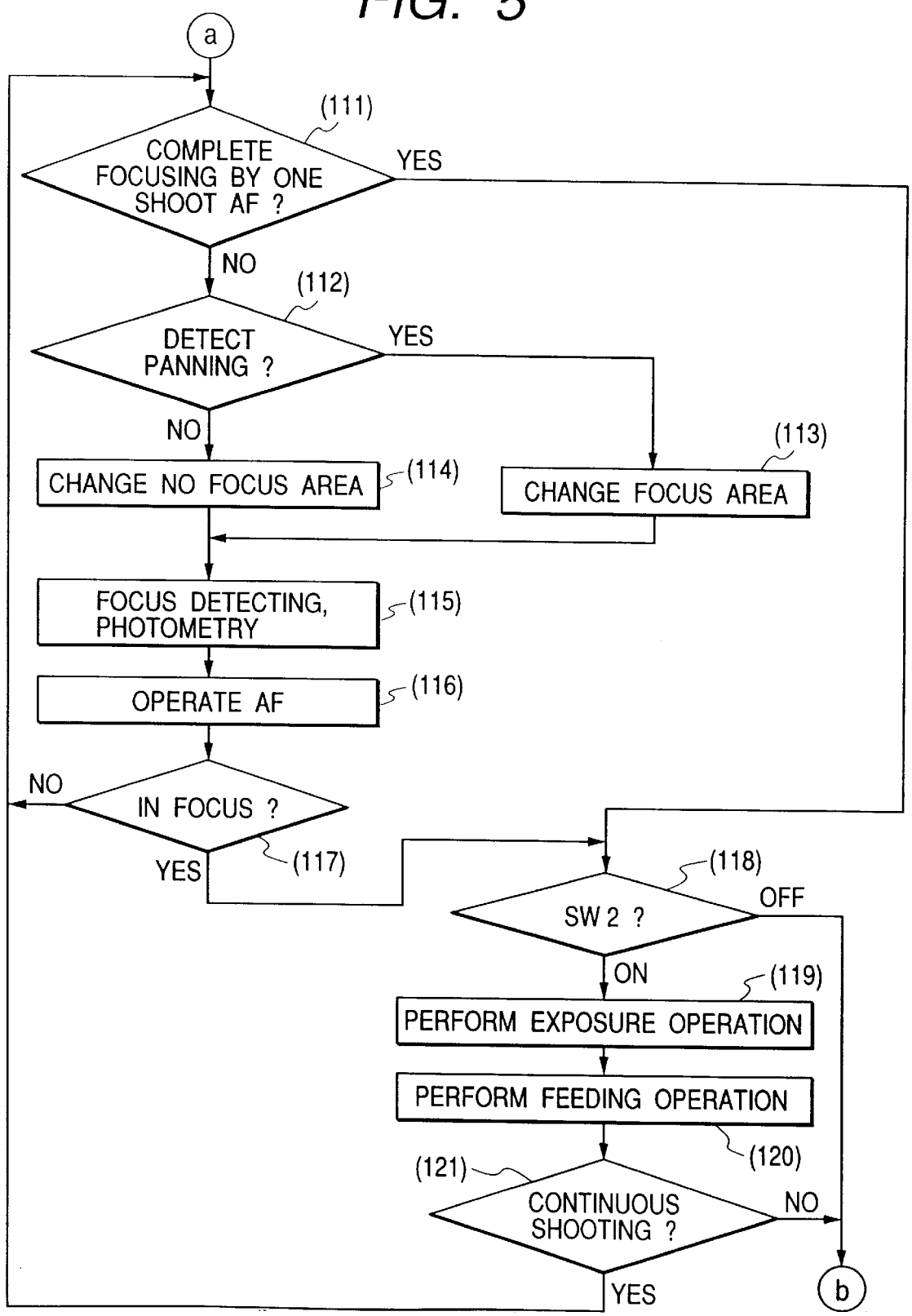
FIG. 5 is a flowchart showing the continuation of the operation in FIG. 4.

The operations of the camera main body CMR and the lens LNS having the above-stated constructions will be described by referring to the flowcharts of FIGS. 4 and 5.

In step 100, when the system power supply of the camera is turned on, the procedure advances to step 101 to initialize the camera and the lens and advance to step 102. In step 102, when the switch SWAF is not pressed in order to change the presently selected AF mode (one-shoot AF, namely, the AF mode 1, servo AF, namely, the AF mode 2, and AI servo AF, namely, the AF mode 3), the procedure immediately proceeds to step 104. However, it is decided whether or not the switch SWAF is pushed. When the switch SWAF is pushed, the procedure advances to step 103. In step 103, the selected AF mode of the AF modes 1, 2 and 3 is set and the procedure advances to step 104.

In step 104, it is decided whether or not the switch SWP is pushed in order to change the focus area, and when the switch SWP is not pushed, the procedure immediately moves to step 106. However, when the switch SWP is pushed, the procedure advances to step 105. In step 105, the position of the focus area is changed in accordance with the number of times of pushing of the switch SWP and the procedure advances to step 106. Then, in step 106, it is decided whether or not the switch SWMOD is pushed in order to change the focus area changing mode. When the switch SWMOD is not pushed, the procedure rapidly proceeds to step 108. However, when the switch is pushed, the procedure advances to step 107. In step 107, the selected focus area changing mode of the focus area changing modes 1, 2 and 3 is set and the procedure moves to step 108.

In step 108, it is decided whether the switch SW1 is turned on. When the switch SW1 the procedure returns to step 102 to repeat similar operations. Furthermore, when the switch SW1 is turned on, the procedure advances to step 109. In step 109, it is decided whether or not the presently set focus area changing mode is "focus area changing mode 1" for not changing the focus area. When it is "focus area changing mode 1", the procedure advances to step 111 shown in FIG. 5. However, when the presently set focus area changing mode is "focus area changing mode 2" for changing the focus area to the central focus area or "focus area changing mode 3" for changing the focus area to an arbitrarily set focus area, the procedure proceeds to step 110 to operate the hand vibration detection sensor GR for detecting the vibration of the camera. After that, the procedure advances to step 111 shown in FIG. 5.

In step 111, it is decided whether or not the focus is completely taken in one-shoot AF. When the focus is completely taken in one-shoot AF, the procedure quickly advances to step 118. However, when the focus is not completely taken in one-shoot AF or the mode is not one-shoot AF, that is to say, in the case of servo AF, or AI servo AF, the procedure proceeds to step 112 to decide whether or not panning operation of the camera is performed based on the output of the hand vibration detection sensor GR. As a result, when it is possible to decide that the panning operation is being performed, the procedure moves to step 113. In step 113, the focus area selecting method is changed so as to correspond to the focus area changing mode which is set as explained in FIG. 3, and it warns the photographer of the change by brightening the focus area so that he can recognize it. Then the procedure moves to step 115. On the other hand, when it is impossible to decide that a panning operation is being performed or the hand vibration detection sensor GR does not operate, the procedure advances to step 114. In step 114, the focus area is not changed and the procedure proceeds to step 115.

In step 115, the focus detection device AFSNS and the photometry device AESNS are driven to perform the focus detection and photometry operations for the position of the selected focus area. Then, in a next step 116, the focusing motor FMTR or the focus encoder ENCF is driven to carry out an AF operation. In a next step 117, it is decided whether or not a focused state has been obtained. When a focused state has not been obtained, the procedure returns to step 111 to repeat operations similar to the above-described operations. Subsequently, when it is decided that the focused state has been realized, the procedure moves to step 118.

In step 118, it is decided whether or not switch SW2 is turned. When switch SW2 is kept turned off, the procedure returns to step 108 shown in FIG. 4. Furthermore, when switch SW2 is turned on, the procedure advances to step 119 to perform a known exposure operation by driving the shutter SH or the like and a film feeding operation by driving the feeding device DR in a subsequent step 120. Then, in step 121, it is decided whether or not a continuous shooting mode is achieved. When a continuous shooting mode is achieved, the procedure returns to step 111. On the contrary, when a continuous shooting or photographing mode is not obtained, the procedure returns to step 108 shown in FIG. 4.

As stated above, the beginners who are not accustomed to the operation of a camera can change the position of the focus area selected when a panning operation is performed to a position at which they can easily follow the object to be photographed. Furthermore, experts who are accustomed to the operation of a camera can change the position of the focus area upon panning the camera so as to reflect faithfully the intention of the photographer depending on a peculiar method or preference in the panning operation or the photographed state, etc.

Besides, in a camera by which the focus area can be automatically selected upon photographing, the method for selecting a focus area can be changed so that the selection of the focus area permits the camera operation of the photographer to be better reflected depending on the panning operation.

As is apparent from the above description, the camera according to the first embodiment of the present invention does not always require an image blur correcting function and may be constructed so as to have only a hand vibration detection sensor GR.

(Second Embodiment)

According to a second embodiment of the present invention, a camera is provided with which an operation considering the state of a switch SWIS capable of selecting a blur prevention mode can be performed, in addition to the above-mentioned first embodiment. A control method for controlling an image blur correcting drive system upon photographing can be selected (selection of a blur prevention mode) by the above switch SWIS.

The blur prevention modes include a "non-blur prevention mode", a "blur prevention mode 1" for controlling blur prevention which is appropriate to ordinary photography by holding the camera and a "blur prevention mode 2" for changing the blur prevention control to control suitable for panning upon detection of the panning operation to change the image blur correcting characteristic. The "blur prevention mode 2" is the same as the "blur prevention mode 1" in ordinary photographic work. However, it does not perform blur prevention control in the direction of panning upon detection of a panning operation. It holds the lens at the center and performs blur prevention control in directions intersecting at right angles to suppress hand vibration.

When the "blur prevention mode 1" is selected, a panning operation is rarely carried out. Hence, the focus area is not changed when a panning operation is detected according to a setting. When "blur prevention mode 2" is selected, a panning operation can be easily performed, so that the focus area is changed at the time of detecting the panning operation. Whether or not the focus area is changed when a panning operation is detected in the respective blur prevention modes can be determined by operating a switch (not shown) depending on the intention of the photographer. When "blur prevention mode 1" is selected, the focus area can be changed upon detection of the panning operation of the camera. Furthermore, when the "blur prevention mode 2" is selected, it is also possible to change no focus area at the time of detection of panning.

Figure 6:
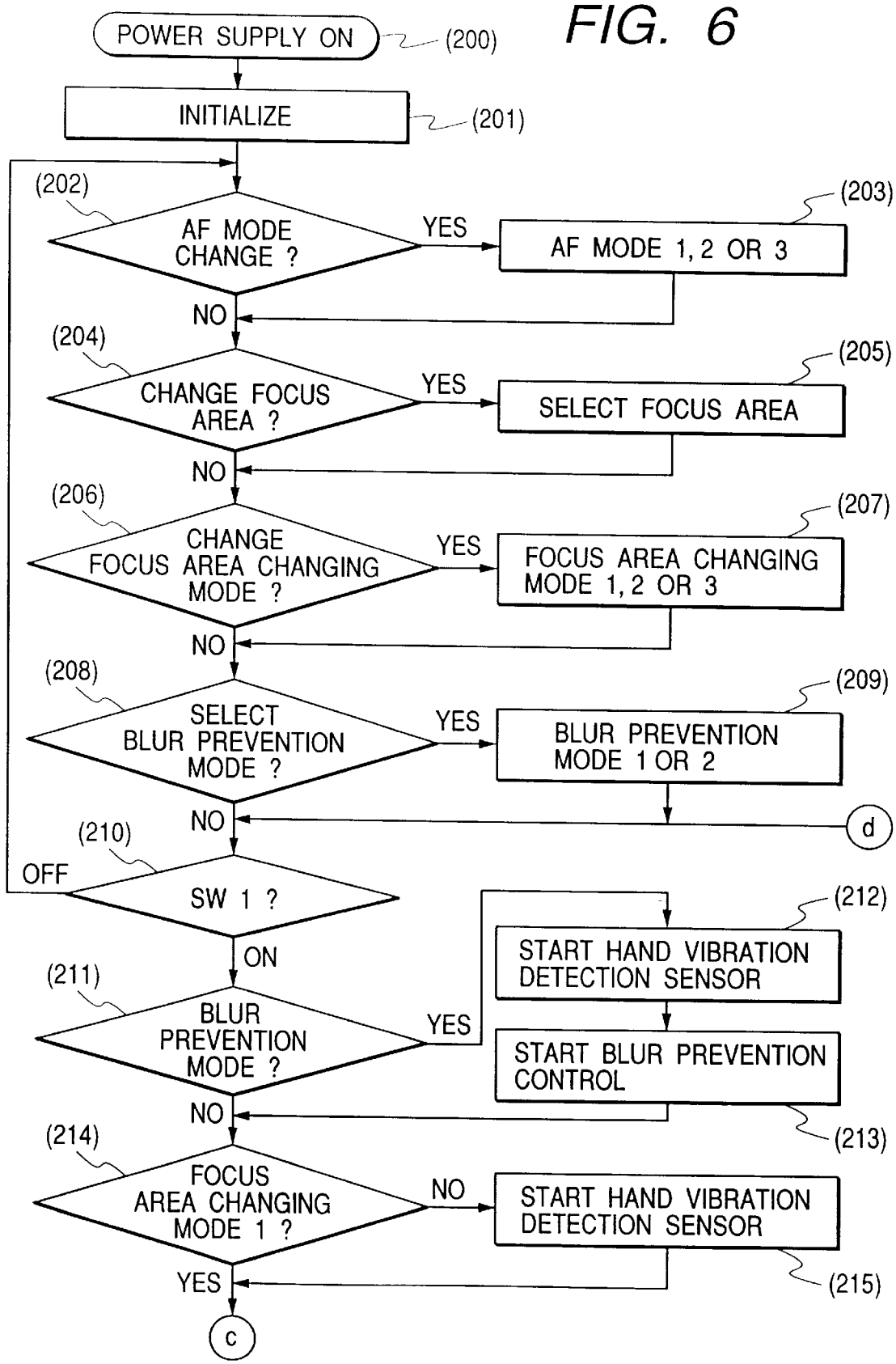
FIG. 6 is a flowchart showing a part of the operation of a camera according to a second embodiment of the present invention.
Figure 7:
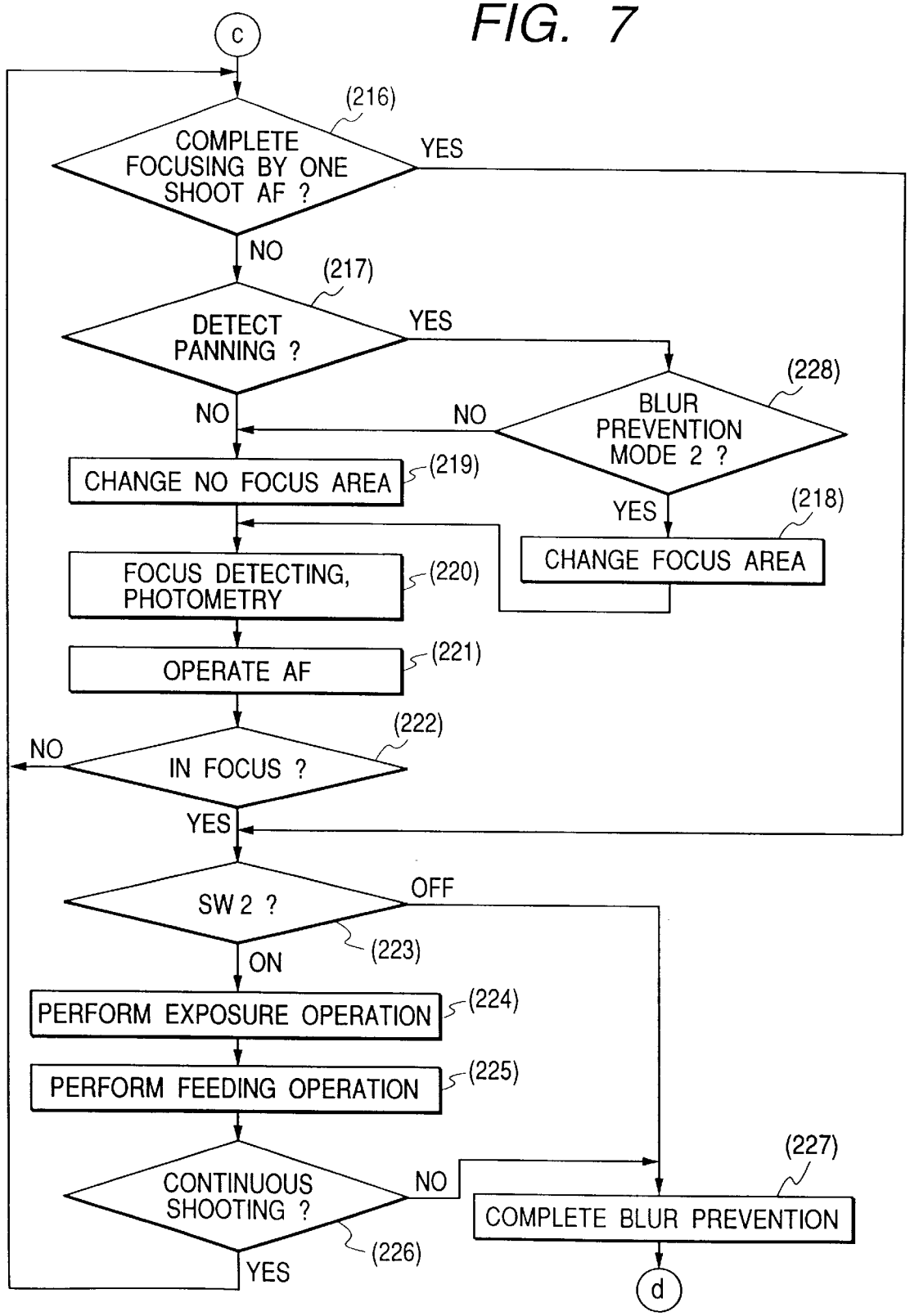
FIG. 7 is a flowchart showing the continuation of the operation of FIG. 6.

Now, the operations of the camera main body CMR and the lens LNS according to the second embodiment of the present invention will be described hereinafter with reference to the flowcharts of FIGS. 6 and 7.

When the system power supply of the camera is turned on in step 200, the procedure advances to step 201 to initialize the camera and the lens and the procedure then advances to step 202. In step 202, when the switch SWAF is not pushed in order to change the currently selected AF mode, the procedure immediately proceeds to step 204. However, it is decided whether or not the switch SWAF is pushed. When the switch is pushed, the procedure advances to step 203 to set an AF mode selected among AF modes 1, 2 and 3 and the procedure advances to step 204.

In step 204, it is decided whether or not the switch SWP is pushed in order to change the focus area. When the switch is not pressed, the procedure quickly advances to step 206. However, when the switch SWP is pressed, the procedure advances to step 205 to change the position of the focus area depending on the number of times of pushing operation of the switch SWP and the procedure moves to step 206. Then, in step 206, it is decided whether or not the switch SWMOD is pushed in order to change the focus area changing mode. When the switch SWMOD is not pushed, the procedure rapidly advances to step 208. However, when the switch is pushed, the procedure advances to step 207 to set the focus area changing mode selected among the focus area changing modes 1, 2 and 3 and the procedure moves to step 208.

In step 208, it is decided whether or not the switch SWIS for selecting the blur prevention mode is pushed. When the switch SWIS is not pushed, the procedure immediately proceeds to step 210. However, when the switch SWIS is pushed, the procedure advances to step 209 to set the selected blur prevention mode 1 or 2 and the procedure advances to step 210. In step 210, it is decided whether or not the switch SW1 is turned on. When the switch SW1 is not turned on, the procedure returns to step 202 to repeat similar operations to those described above. When the switch SW1 is turned on, the procedure advances to step 211 to decide whether or not the blur prevention mode is selected. When the blur prevention mode is not selected, the procedure rapidly advances to step 214. However, when "blur prevention mode 1" or "blur prevention mode 2" is selected, the procedure proceeds to step 212 to actuate the hand vibration detection sensor GR. Then, in a next step 213, the second group of lenses L2 is shifted through the actuator IACT based on the output obtained from the hand vibration detection sensor to start blur prevention control, and the procedure advances to step 214.

In step 214, it is decided whether or not the currently set focus area changing mode is "focus area changing mode 1" for not changing the focus area. When it is "focus area changing mode 1", the procedure advances to step 216 shown in FIG. 7. However, when the currently set focus area changing mode is "focus area changing mode 2" for changing the focus area to the central focus area or "focus area changing mode 3" for changing the focus area to an arbitrarily set focus area, the procedure advances to step 215 to actuate the hand vibration detection sensor GR for detecting the vibration of the camera (when it is already actuated, the procedure immediately shifts to the next step) and the procedure advances to step 216 shown in FIG. 7.

In step 216, it is decided whether or not a complete focus is taken at the time of one-shoot AF. When a complete focus is taken at the time of one-shoot AF, the procedure quickly advances to step 223. However, when a complete focus is not taken at the time of one-shoot AF or the mode is not one-shoot AF, that is to say, at the time of the servo AF or the AI servo AF, the procedure proceeds to step 217 to decide whether a panning operation of the camera is being carried out based on the output of the hand vibration detection sensor GR. As a result, when it is possible to decide that a panning operation of the camera is being performed, the procedure advances to step 228 to decide whether "blur prevention mode 2" is selected or not. If "blur prevention mode 1" is selected, the procedure proceeds to step 219 because it is deemed that the photographer does not intend to pan the camera even when a panning operation is detected. Furthermore, if "blur prevention mode 2" is selected, the procedure advances to step 218 to change the focus area selecting method so as to correspond to the focus area changing mode set as explained in reference to FIG. 3 and warn the photographer of the change by brightening the focus area so that he will recognize it. The procedure then proceeds to step 220. On the other hand, when a panning operation cannot be discriminated or the hand vibration detection sensor GR does not operate, the procedure advances to step 219. In step 219, the focus area is not changed and the procedure advances to step 220.

In step 220, the focus detector or focus detecting device AFSNS and the photometry device AESNS are driven to perform the focus detecting and photometry operations for the position of the focus area selected. Then, in a next step 221, the focusing motor FMTR or the focus encoder ENCF are driven to perform the AF operation. In a next step 222, it is decided whether or not a focused state is obtained. When a focused state is not obtained, the procedure returns to step 216 to repeat operations similar to those mentioned above. After that, when a focused state is discriminated, the procedure advances to step 223.

In step 223, it is decided whether or not the switch SW2 is turned on. If the switch SW2 is turned off, the procedure moves to step 227 to finish blur prevention control and returns to step 210 shown in FIG. 6. When the switch SW2 is turned on, the procedure advances to step 224 to drive the shutter SH or the like and perform a known exposure operation. In a subsequent step 225, the feeding device or feeder DR is driven to feed the film. Then, in step 226, it is determined whether or not a continuous shooting mode is achieved. When a continuous shooting mode is achieved, the procedure advances to step 216. On the other hand, when a continuous shooting mode is not obtained, the procedure advances to the above-described step 227 to finish blur prevention control and returns to step 210 shown in FIG. 6.

According to the second embodiment of the invention, since the blur preventing function can be operated even upon panning the camera, a more accurate panning operation and selection of focus area can be realized.

(Third Embodiment)

According to a third embodiment of the present invention, a camera is provided which is equipped with focus area changing modes 4 and 5, in addition to the above-mentioned first embodiment.

Here, the "focus area changing mode 4" is a mode for automatically changing the focus area at the time of panning the camera to change the focus area to a focus area located at the central row in the direction parallel to the direction of panning so that an object to be photographed can be easily followed. In other words, as illustrated in FIG. 8A, when the camera is panned in the yaw direction, the selecting method is changed so that a focus detecting operation is carried out at the three focus areas 4, 5 and 6 of the nine focus areas. Then, the focus area with the nearest distance measured among the three focus areas is automatically selected and the AF is driven based on the focus detecting information to adjust the focus.

Furthermore, as illustrated in FIG. 8B, when the camera is panned in the pitch direction, the selecting method is changed so that the focus detecting operation is performed at three focus areas 2, 5 and 8 of the nine focus areas. Then, the focus area in which the object capable of being in focus at the nearest distance is located is automatically selected from among the three focus areas and the AF is driven based on the focus detecting information to adjust the focus. Furthermore, as illustrated in FIG. 8C, when the camera is panned slantingly, the selecting method is changed so that the focus detecting operation is performed at three focus areas 3, 5 and 7 of the nine focus areas. Then, the focus area in which the object capable of being in focus at the nearest distance is located is automatically selected from among the three focus areas and the AF is driven based on the focus detecting information to adjust the focus. Otherwise, the focus area may not be shifted to the central position and the focus areas 1, 2 and 3 or 3, 6 and 9 may also be selected including the sensors of the original focus areas.

"Focus area changing mode 5" is a mode for automatically changing the focus area when the camera is panned to change the focus area to the focus area located at the central row in the direction perpendicular to the panning direction so as to readily follow an object to be photographed. Specifically, as shown in FIG. 9A, when the camera is panned in the yaw direction, the selecting method is changed so that focus detection is carried out at three focus areas 2, 5 and 8 of the nine focus areas. Then, the focus area in which the object capable of being in focus at the nearest distance is located is selected automatically from among the three focus areas and the AF is driven based on the focus detecting information to adjust the focus.

Furthermore, as shown in FIG. 9B, when the camera is panned in the pitch direction, the selecting method is changed so that focus detection is performed at three focus areas 4, 5 and 6 of the nine focus areas. Thus, the focus area in which the object capable of being in focus at the nearest distance is located is selected automatically from among the three focus areas and the AF is driven based on the focus detecting information to adjust the focus. In addition, as illustrated in FIG. 9C, when the camera is panned slantingly, the selecting method is changed so that focus detection is performed at three focus areas 1, 5 and 9 of the nine focus areas. Thus, the focus area in which the object capable of being in focus at the nearest distance is located is selected automatically from among the three focus areas and the AF is driven based on the focus detecting information to adjust the focus. Otherwise, the focus area including the focus areas before the panning operation of the camera can be selected, such as 1, 2 and 3 or 3, 6 and 9.

"Focus area changing mode 4" and "Focus area changing mode 5" change the method for selecting the focus area relative to the same direction as the panning direction or the direction perpendicular to the panning direction based on the difference in vibration of the camera which is generated depending on the feature or preference of the panning operation or photographing state.

Figure 10:
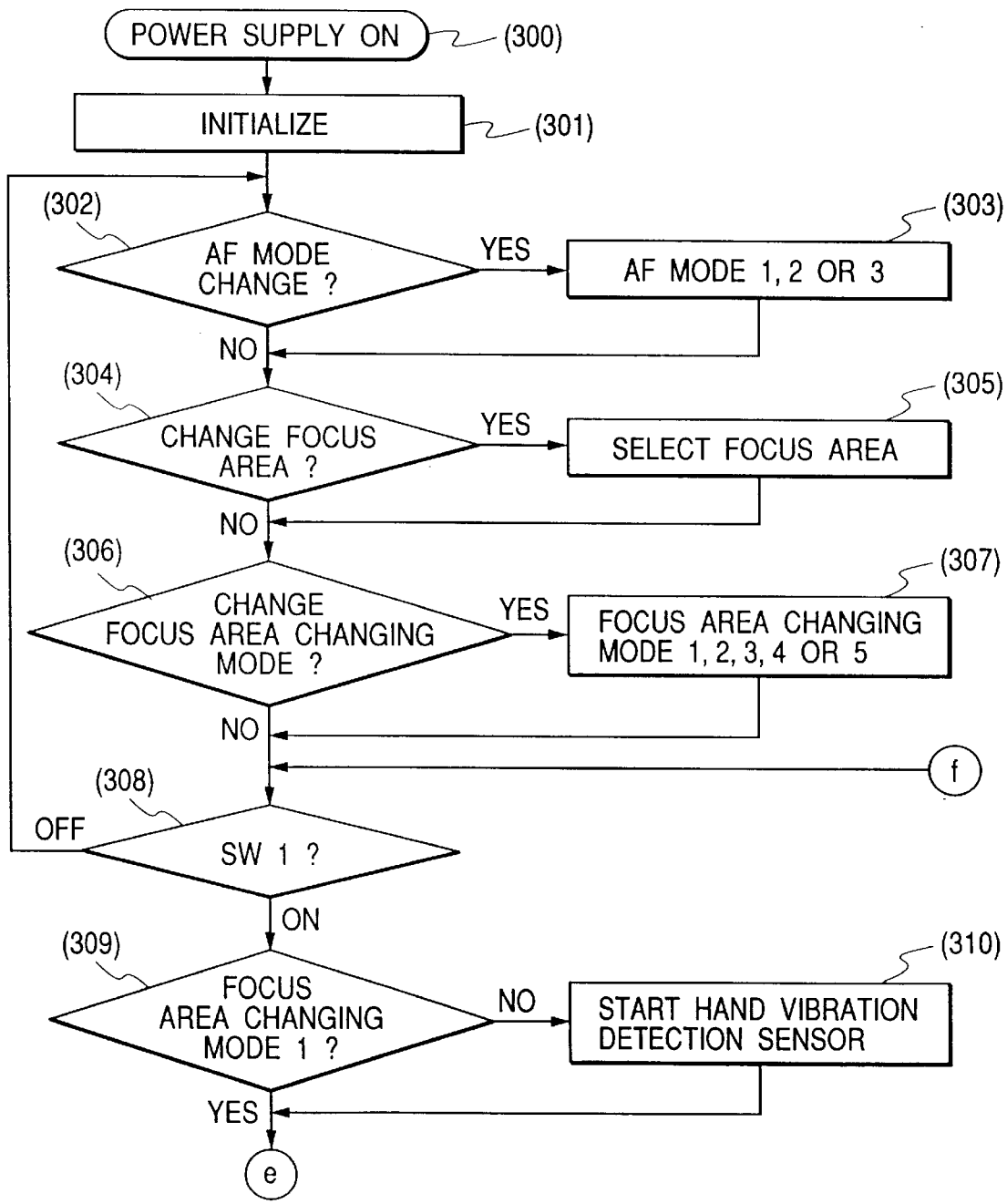
FIG. 10 is a flowchart showing a part of the operation of the camera according to the third embodiment of the present invention.
Figure 11:
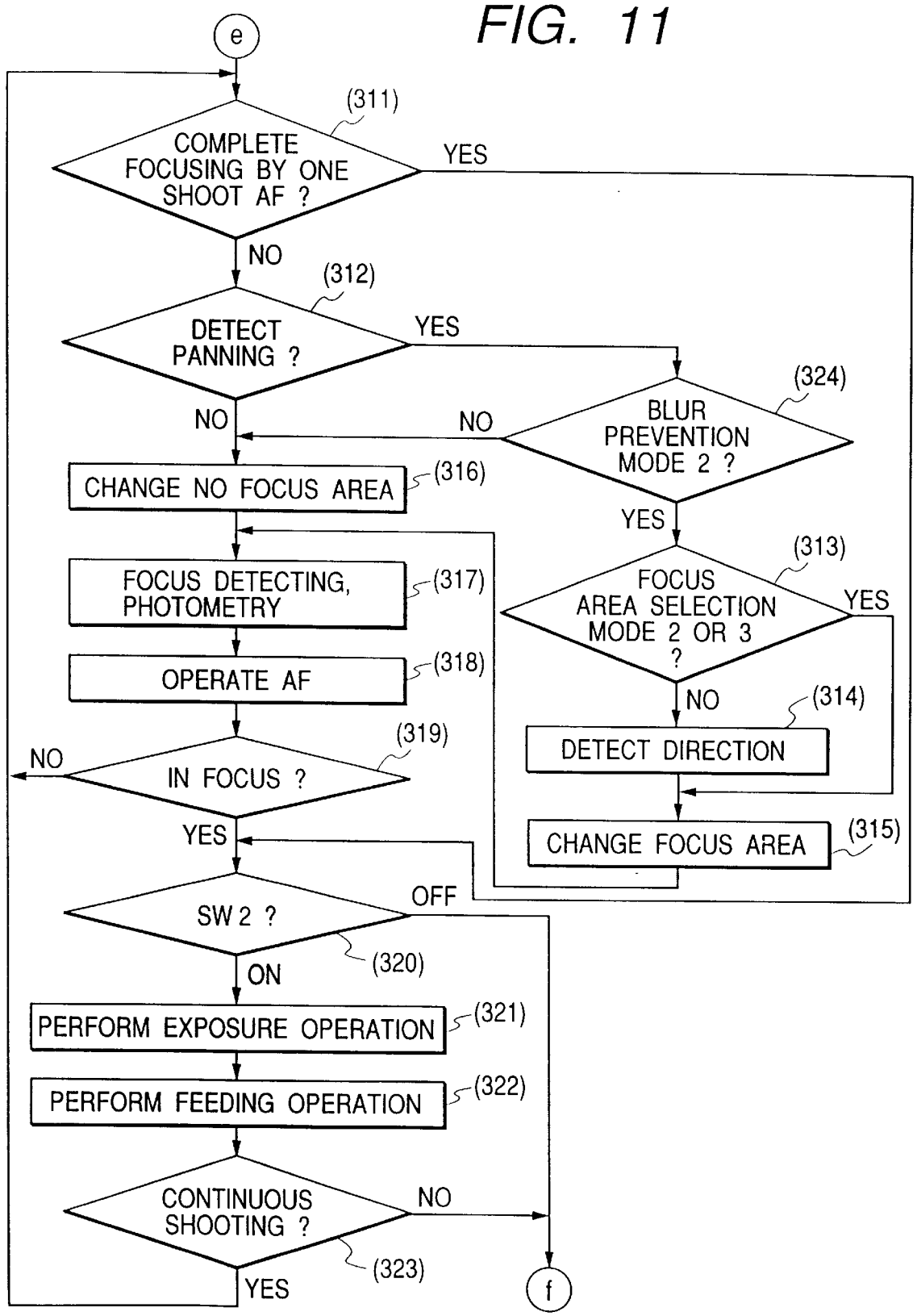
FIG. 11 is a flowchart showing the continuation of the operation of the camera shown in FIG. 10.

Now, the operations of the camera main body CMR and the lens LNS according to the third embodiment of the present invention will be described below by referring to the flowcharts of FIGS. 10 and 11.

In step 300, when the system power supply of the camera is turned on, the procedure advances to step 301 to initialize the camera and the lens and the procedure proceeds to step 302. In step 302, it decided whether or not the switch SWAF is pushed in order to change the currently selected AF mode. When the switch SWAF is not pushed, the procedure quickly advances to step 304. However, when the switch is pushed, the procedure advances to step 303 to set an AF mode selected from among AF modes 1, 2 and 3 and the procedure advances to step 304.

In step 304, it is decided whether or not the switch SWP is pushed in order to change the focus area. When the switch SWP is not pushed, the procedure advances rapidly to step 306. However, when the switch is pushed, the procedure moves to step 305 to change the position of the focus area in accordance with the number of times of the pushing of the switch SWP, and the procedure advances to step 306. Then, in step 306, it is decided whether or not the switch SWMOD is pushed in order to change the focus area changing mode. When the switch SWMOD is not pushed, the procedure immediately proceeds to step 308. However, when the switch is pushed, the procedure advances to step 307 to set the focus area changing mode selected from among focus area changing modes 1, 2, 3, 4 and 5. Then, the procedure advances to step 308.

Figure 8:
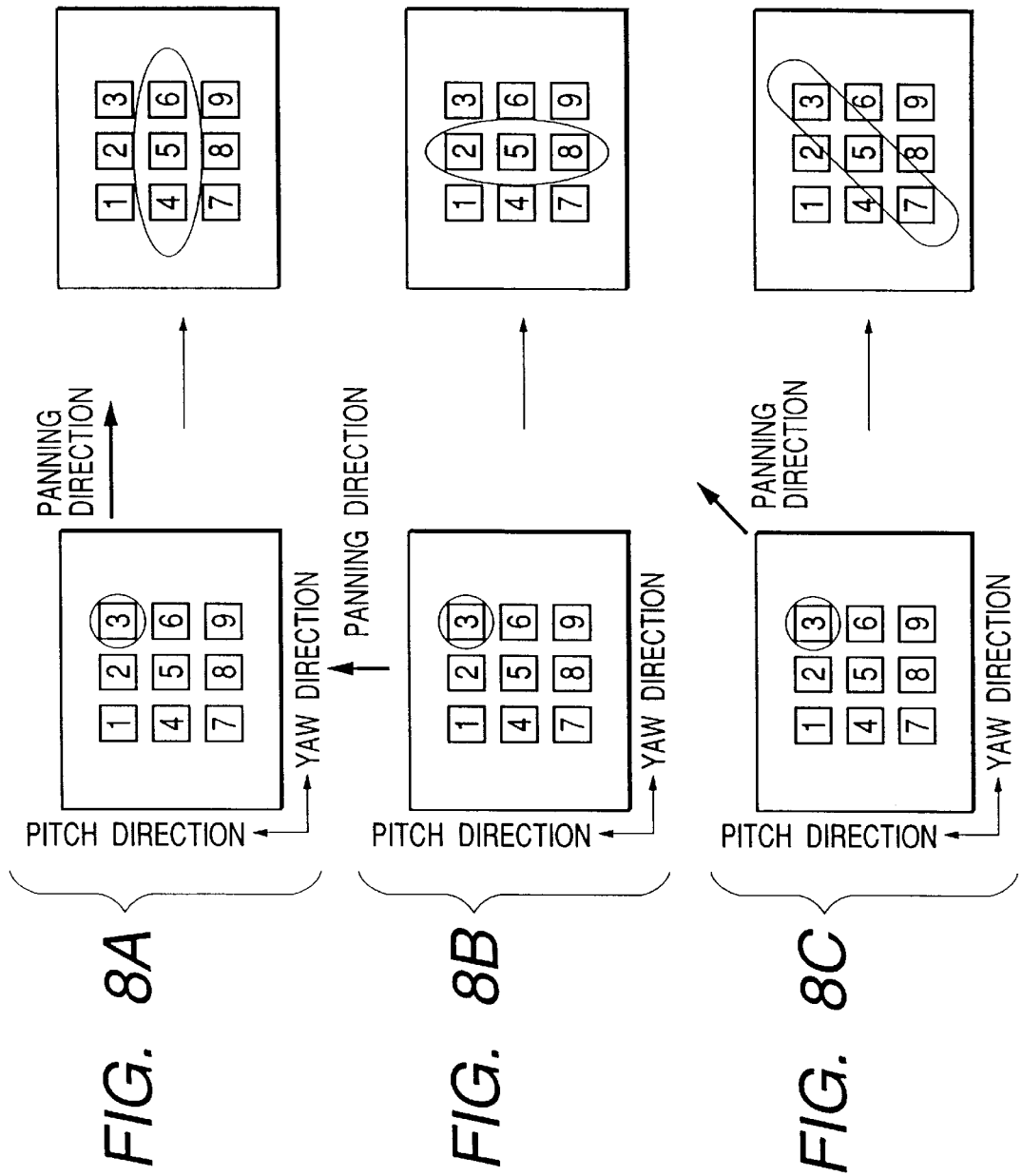
FIGS. 8A, 8B and 8C show the states of focus area change in the focus area changing mode 4 of a camera according to a third embodiment of the present invention.
Figure 9:
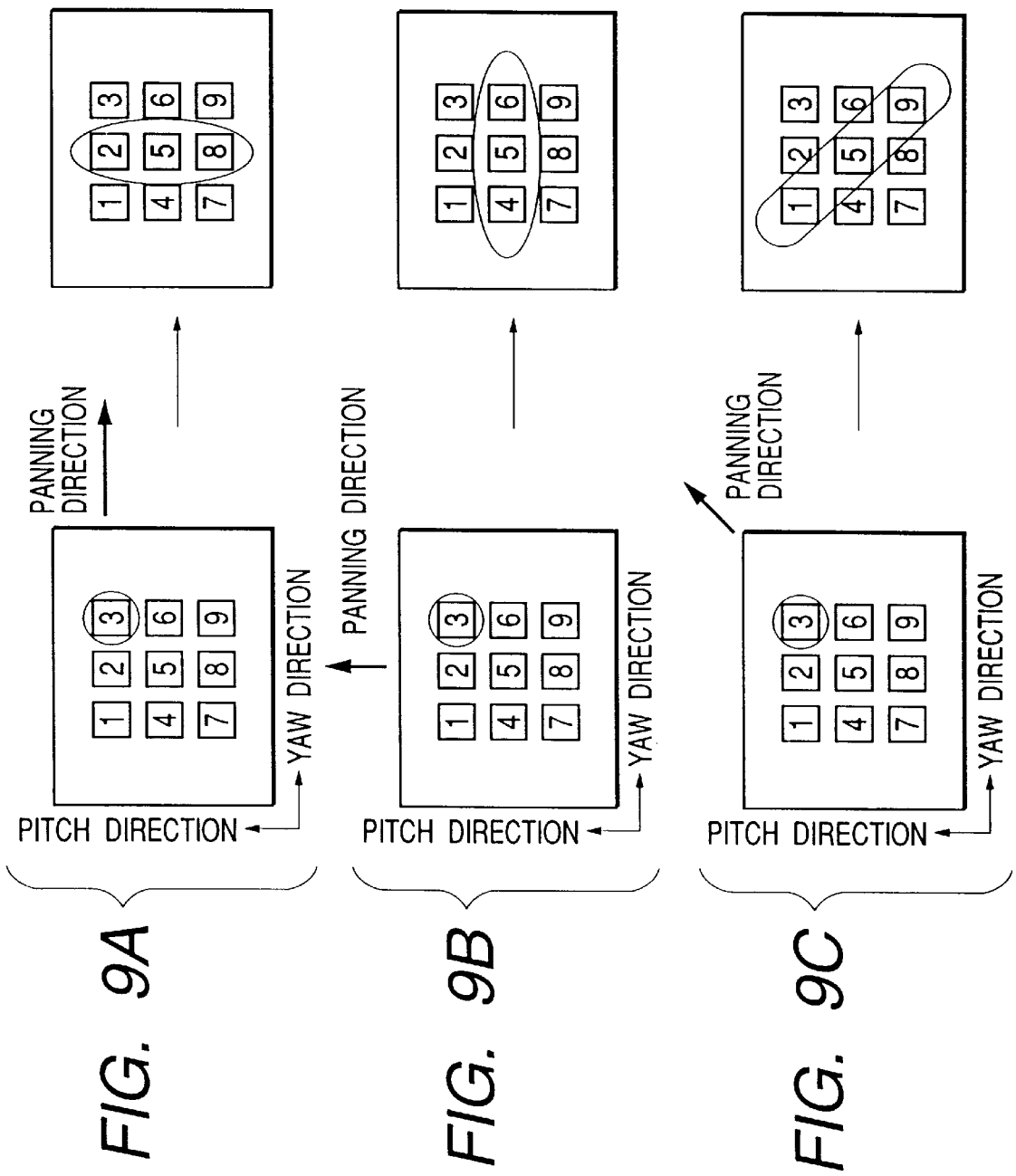
FIGS. 9A, 9B and 9C show diagrams showing the states of focus area change in the focus area changing mode 5 of the camera according to the third embodiment of the present invention.

In step 308, it is decided whether or not the switch SW1 is turned. When the switch SW1 is not turned on, the procedure returns to step 302 to repeat operations the same as described above. Furthermore, when switch SW1 is turned on, the procedure proceeds to step 309. In step 309, it is decided whether or not the presently set focus area changing mode is "focus area changing mode 1" for not changing the focus area. When it is "focus area changing mode 1", the procedure advances to step 311 shown in FIG. 11. However, when the presently set focus area changing mode is "focus area changing mode 2" for changing the focus area to the central focus area, "focus area changing mode 3" for changing the focus area to an arbitrarily set focus area, "focus area changing mode 4" or "focus area changing mode 5", which are illustrated in FIGS. 8 and 9, the procedure advances to step 310 to actuate the hand vibration detection sensor GR for detecting the vibration of the camera and then, the procedure advances to step 311 shown in FIG. 11.

In step 311, it is decided whether or not the focus is completely taken at the time of one-shoot AF. When the focus is completely taken at the time of one-shoot AF, the procedure immediately advances to step 320. However, when the focus is not completely taken at the time of one-shoot AF or the mode is not one-shoot AF, that is to say, at the time of servo AF or AI servo AF, the procedure advances to step 312. In step 312, it is decided whether or not the panning operation of the camera is performed based on the output of the hand vibration detection sensor GR. Consequently, when it is possible to decide that the panning operation is carried out, the procedure advances to step 324 to decide whether or not the "blur prevention mode 2" is selected. If "blur prevention mode 1" is selected, the procedure advances to step 316 because it can be regarded that the photographer does not intend to pan the camera even when a panning operation is detected. When "blur prevention mode 2" is selected, the procedure advances to step 313 to judge which focus area changing mode is selected. If it is decided that "blur prevention mode 2" or "blur prevention mode 3" is set, the procedure immediately proceeds to step 315. However, if it is decided that "focus area changing mode 4" or "focus area changing mode 5" is set, the procedure advances to step 314 to detect the panning direction and the procedure advances to step 315.

In step 315, the focus area selecting method is changed so as to correspond to the set focus area changing mode to warn a photographer of the change so that he will recognize it by brightening the focus area. Then, the procedure proceeds to step 317.

Additionally, in step 312, when it is impossible to discriminate the panning operation or when the hand vibration detection sensor GR does not operate, the procedure advances to step 316 to not change the focus area, and then moves to step 317.

In step 317, the focus detector or focus detecting device AFSNS and the photometry device AESNS are driven to perform the focus detecting and photometry operations of the position of the selected focus area. Then, in a next step 318, the focus motor FMTR or the focusing encoder ENCF are driven to carry out an AF action. In a next step 319, it is decided whether or not a focused state is obtained. When a focused state is not obtained, the procedure returns to step 311 to repeat operations the same as those mentioned above.

After that, when it is judged that a focused state is obtained, the procedure advances to step 320.

In step 320, it is decided whether or not the switch SW2 is turned on. When switch SW2 is kept turned off, the procedure returns to step 308 shown in FIG. 10. When the switch SW2 is turned on, the procedure advances to step 321 to drive the shutter SH or the like and perform a known exposure operation. In subsequent step 322, the feeding device or feeder DR is driven to feed the film. Then, in step 323, it is decided whether or not a continuous shooting mode is achieved. When a continuous shooting mode is achieved, the procedure returns to step 311. On the other hand, when a continuous shooting or photographing mode is not achieved, the procedure returns to step 308 shown in FIG. 10.

As described above, according to the camera of the invention, a method for selecting the focus area in the direction which is the same as the panning direction of the camera or perpendicular to the panning direction can be changed so that the intention of the photographer is faithfully reflected depending on habit or preference or photographing condition at the time of panning the camera. Therefore, the selection of the focus area permits the intention of the photographer to be better reflected.

(Fourth Embodiment)

According to a fourth embodiment of the present invention, a camera is provided which performs an operation by considering the state of a switch SWV for selecting a speed determination mode, in addition to the third embodiment.

The above-described switch SWV is a selecting switch for determining whether or not the focus area is changed based on panning speed. A mode (speed determination mode 1) for always changing the focus area when a panning operation is discriminated and a mode (speed determination mode 2) for changing the focus area only when the panning speed is not lower than a predetermined speed even if a panning operation is discriminated can be selected by the above-described switch SWV.

Figures 12A, 12B, 12C:
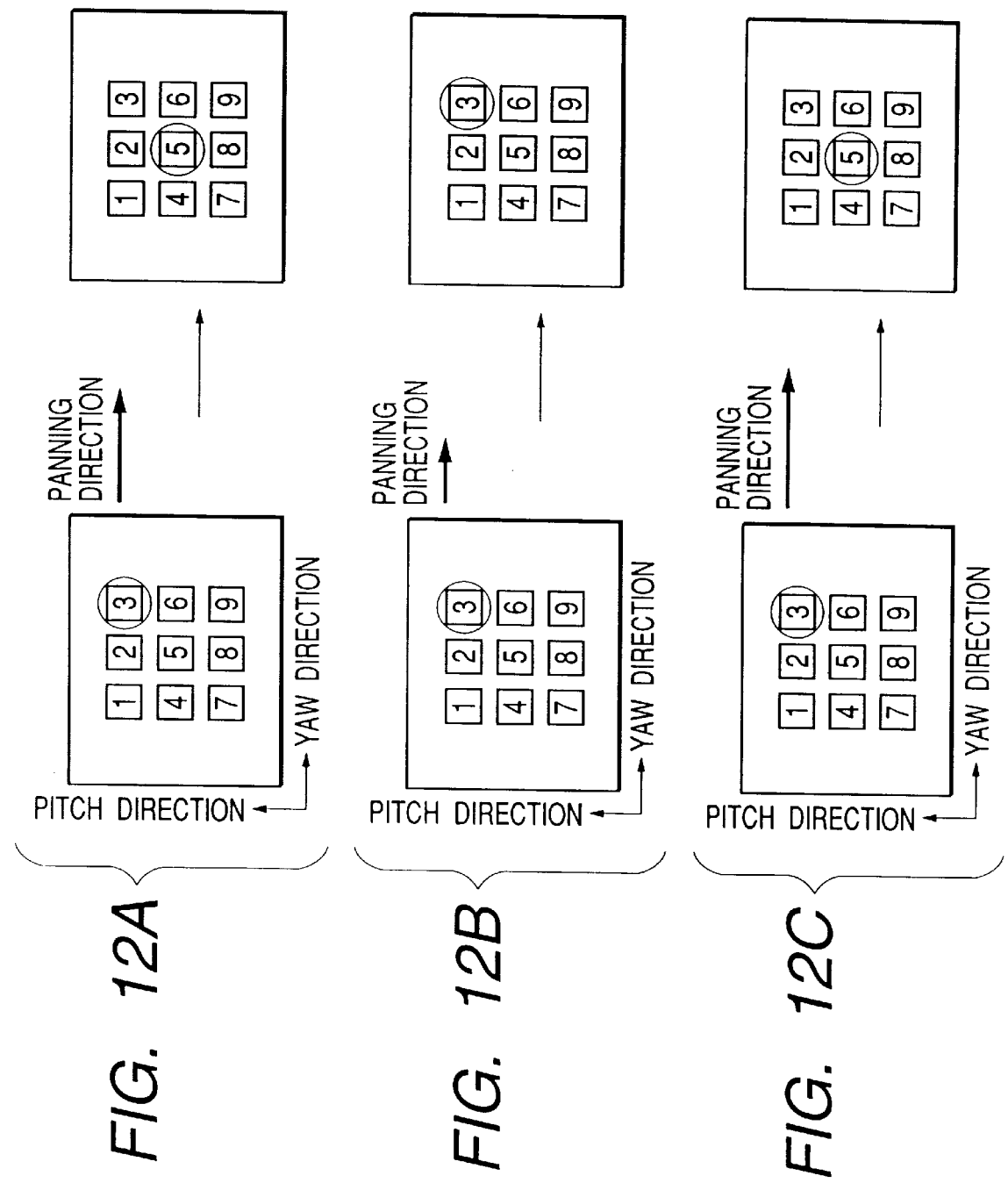
FIGS. 12A, 12B and 12C show diagrams for illustrating the states of focus area change in speed determination modes 1 and 2 of a camera according to a fourth embodiment of the present invention.

When the panning operation is performed at very low speed, a running shoot or photographing is significantly easy. On the contrary, when the panning speed is high, a running shoot is difficult. Therefore, even in a panning operation, the effect of changing the focus area is higher at the time of high panning speed than that at low panning speed. Accordingly, as illustrated in FIG. 12A, in "speed determination mode 1", the focus area is changed at the time of the panning operation. As illustrated in FIG. 12B, in "speed determination mode 2", the focus area is not changed even if a panning operation at a speed lower than a predetermined speed can be recognized. As illustrated in FIG. 12C, the focus area is changed only at a speed not lower than the predetermined speed. In this connection, the predetermined speed can be set to an arbitrary speed by a photographer who employs a setting switch (not shown).

A method for selecting a focus area at the time of panning the camera can be set by combining the "focus area changing modes 1 to 5" which have already been described in the third embodiment with "speed determination modes 1 and 2".

Figure 13:
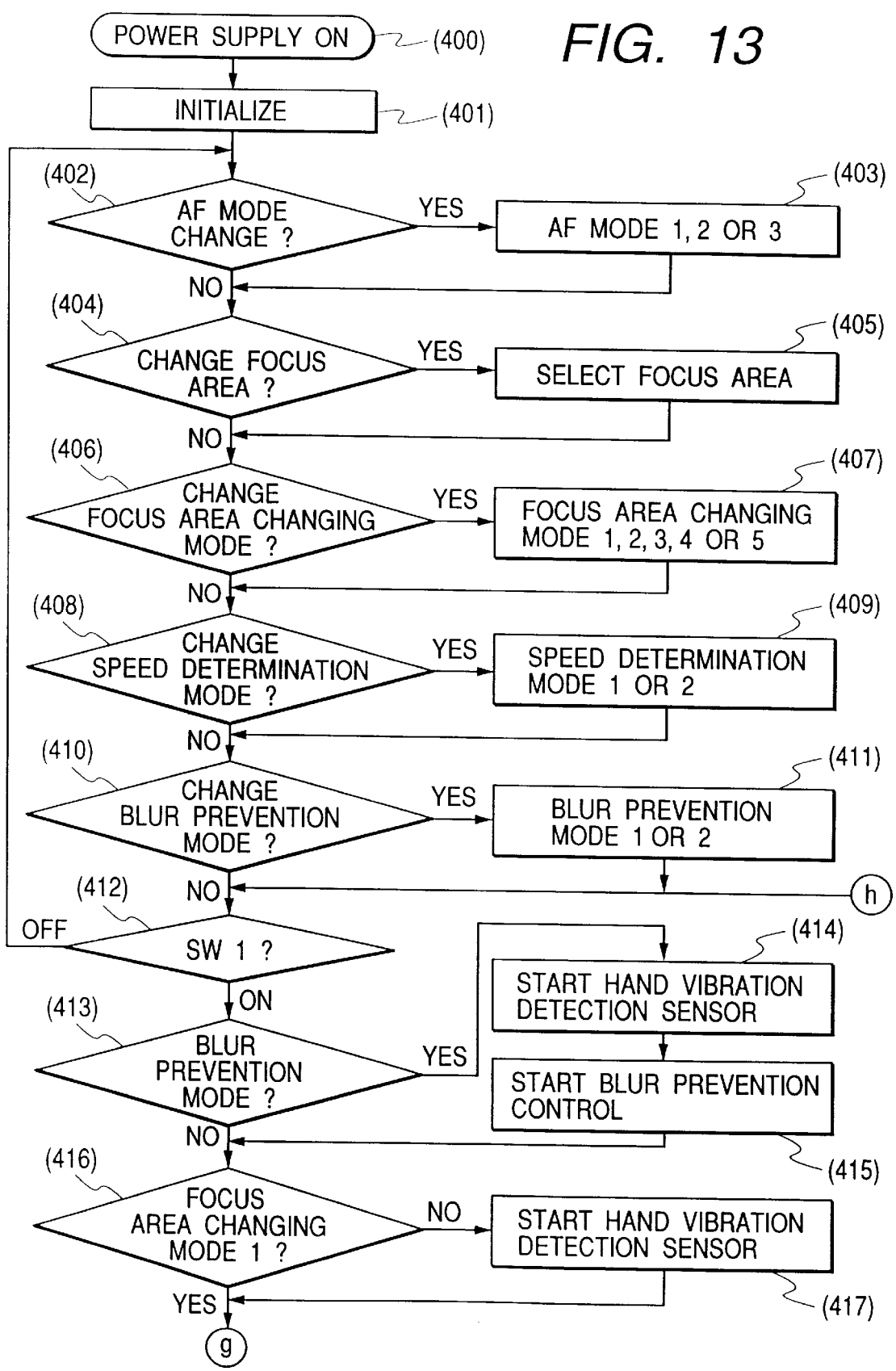
FIG. 13 is a flowchart showing a part of the operation of the camera according to the fourth embodiment of the present invention.
Figure 14:
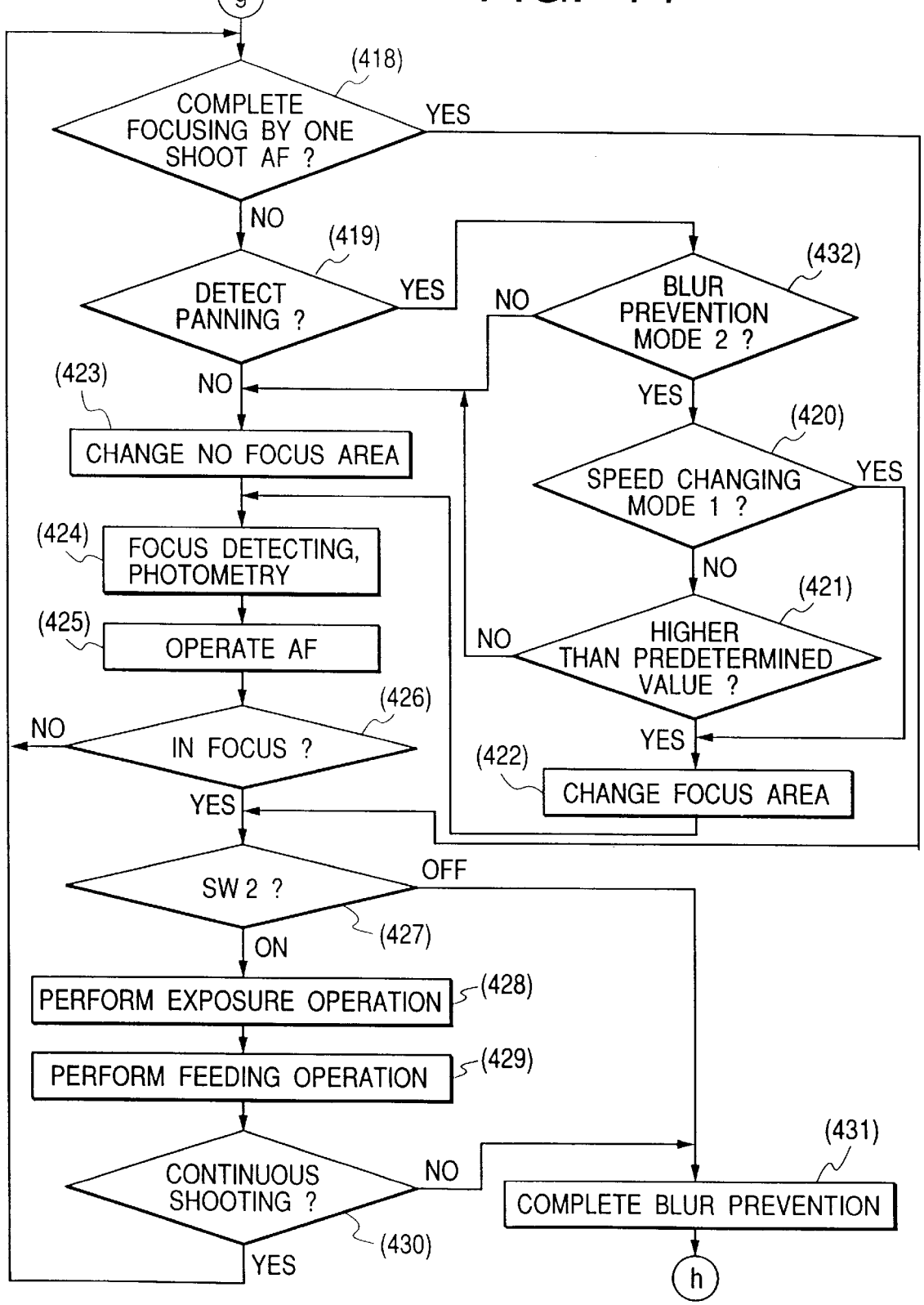
FIG. 14 is a flowchart showing the continuation of the operation of the camera shown in FIG. 13.

Now, an explanation will be given of the operations of the camera main body CMR and the lens LNS according to the fourth embodiment of the present invention by employing the flowcharts of FIGS. 13 and 14.

In step 400, when the system power supply of the camera is turned on, the procedure advances to step 401 to initialize the camera and the lens, and the procedure advances to step 402. In step 402, it is judged whether or not the switch SWAF is pushed in order to change the currently selected AF mode. When the switch SWA is not pushed, the procedure immediately proceeds to step 404. However, when the switch is pushed, the procedure advances to step 403 to set an AF mode selected from among AF modes 1, 2, and 3 and then, moves to step 404.

In step 404, it is judged whether or not the switch SWP is pushed in order to change the focus area. When the switch SWP is not pushed, the procedure quickly moves to step 406. However, when the switch SWP is pushed, the procedure advances to step 405 to change the position of the focus area in accordance with the number of times the switch SWP is pushed, and it then moves to step 406. Then, in step 406, it is decided whether or not the switch SWMOD is pushed in order to change the focus area changing mode. When the switch SWMOD is not pushed, the procedure immediately proceeds to step 408. However, when the switch is pushed, the procedure moves to step 407 to set the focus area changing mode selected from among the focus area changing modes 1, 2, 3, 4 and 5, and then it advances to step 408.whether or not t is judged whether or not the switch SWV for selecting the speed determination mode is pushed. When the switch SWV is not pushed, the procedure immediately advances to step 410. However, when the switch is pushed, the procedure advances to step 409 to set a speed determination mode selected from among the speed determination modes 1 and 2, and then it advances to step 410.

In step 410, it is decided whether or not the switch SWIS for selecting the blur prevention mode is pushed. When the switch SWIS is not pushed, the procedure immediately advances to step 412. However, when the switch is pushed, the procedure shifts to step 411 to set a blur prevention mode selected from among the blur prevention modes 1 and 2, and then, it advances to step 412. In step 412, it is decided whether or not the switch SW1 is turned on. When the switch SW1 is not turned on, the procedure returns to step 402 to repeat operations similar to those described above. When the switch SW1 is turned on, the procedure advances to step 413 to decide whether the blur prevention mode is selected. If the blur prevention mode is not selected, the procedure immediately advances to 416. However, if "blur prevention mode 1" or "blur prevention mode 2" is selected, the procedure advances to step 414 to actuate the hand vibration detection sensor GR. Then, in a next step 415, the second group of lenses L2 are shifted through the actuator IACT based on the output obtained from the hand vibration detection sensor to start blur prevention control. The procedure then advances to step 416.

In step 416, it is decided whether or not the currently set focus area changing mode is "focus area changing mode 1" for not changing the focus area. When it is "focus area changing mode 1", the procedure advances to step 418 shown in FIG. 14. However, when it is "focus area changing mode 2" for changing the focus area to the central focus area, "focus area changing mode 3" for changing the focus area to an arbitrarily set focus area, "focus area changing mode 4" or "focus area changing mode 5" shown in FIGS. 8 and 9, the procedure proceeds to step 417 to actuate the hand vibration detection sensor GR for detecting the vibration of the camera (when the hand vibration detection sensor is already operating, the procedure directly shifts to the next step). Thereafter, the procedure advances to step 418 shown in FIG. 14.

In step 418, it is decided whether or not the focus is completely taken at the time of one-shoot AF. When the focus is completely taken at the time of one-shoot AF, the procedure quickly advances to step 427. However, when the focus is not taken at the time of one-shoot AF or the mode is not one-shoot AF, in other words, at the time of servo AF or AI servo AF, the procedure advances to step 419 to decide whether or not a panning operation of the camera is being performed based on the output of the hand vibration detection sensor GR. As a result, when it is possible to decide that a panning operation is being performed, the procedure advances to step 432 to decide whether or not "blur prevention mode 2" is selected. If "blur prevention mode 1" is selected, the procedure advances to step 423 because it is regarded that the photographer does not intend to pan the camera even when a panning operation is detected. If "blur prevention mode 2" is selected, the procedure advances to step 420 to examine the speed changing mode. When it is judged that "speed changing mode 1" is set, the procedure advances to step 422 to change the focus area selecting method to correspond to the setting of the focus area changing mode and warn the photographer of the change, so that he can recognize the change, by brightening the focus area. It then moves to step 424. In addition, in step 420, when it is judged that "speed changing mode 2" is set, the procedure advances to step 421 to decide whether the panning speed is not lower than a predetermined value. When the panning speed is not lower than the predetermined value, the procedure proceeds to step 422 to change the method for selecting the focus area to correspond to the setting of the focus area changing mode and to warn the photographer of the change so he will to recognize it by brightening the focus area, as mentioned above, and then moves to step 424. On the other hand, in step 421, when it is decided that the panning speed is lower than the predetermined value, the procedure advances to step 423 which will be described below.

Additionally, in step 419, when it is impossible to discriminate the panning operation or when the hand vibration detection sensor GR does not operate, the procedure advances to step 423 to not change the focus area and then moves to step 424.

In step 424, the focus detecting device AFSNS and the photometry device AESNS are driven to perform the focus detecting and photometrical operations at the position of the selected focus area. Then, in a next step 425, the focusing motor FMTR or the focus encoder ENCF are driven to carry out the AF operation. In a next step 426, it is decided whether or not a focused state is obtained. When a focused state is not obtained, the procedure returns to step 418 to repeat operations the same as stated above. After that, when it is recognized that a focused focalized state is obtained, the procedure advances to step 427.

In step 427, it is decided whether or not the switch SW2 is turned on. When the switch SW2 is turned off, the procedure advances to step 431 to complete blur prevention control and returns to step 412 shown in FIG. 13. When the switch SW2 is turned on, the procedure advances to step 428 to drive the shutter SH or the like and perform a known exposure operation. In a subsequent step 429, the feeding device DR is driven to feed the film. Then, in step 430, it is decided whether or not a continuous shooting mode is obtained. When a continuous shooting mode is obtained, the procedure advances to step 418. On the other hand, when a continuous shooting or photographing mode is not obtained, the procedure moves to step 431 to complete the blur prevention control and then returns to step 412 shown in FIG. 13.

As explained in the foregoing, the focus area selecting method can be changed depending on the panning speed of the camera. It is possible to not change the focus area at low panning speed and to change the focus area at high panning speed. Therefore, the camera work of the photographer can be for further improved.

(Fifth Embodiment)

According to a fifth embodiment of the present invention, a camera is provided which can select a "speed determination mode 3", in addition to the above-described fourth embodiment.

Figure 15:
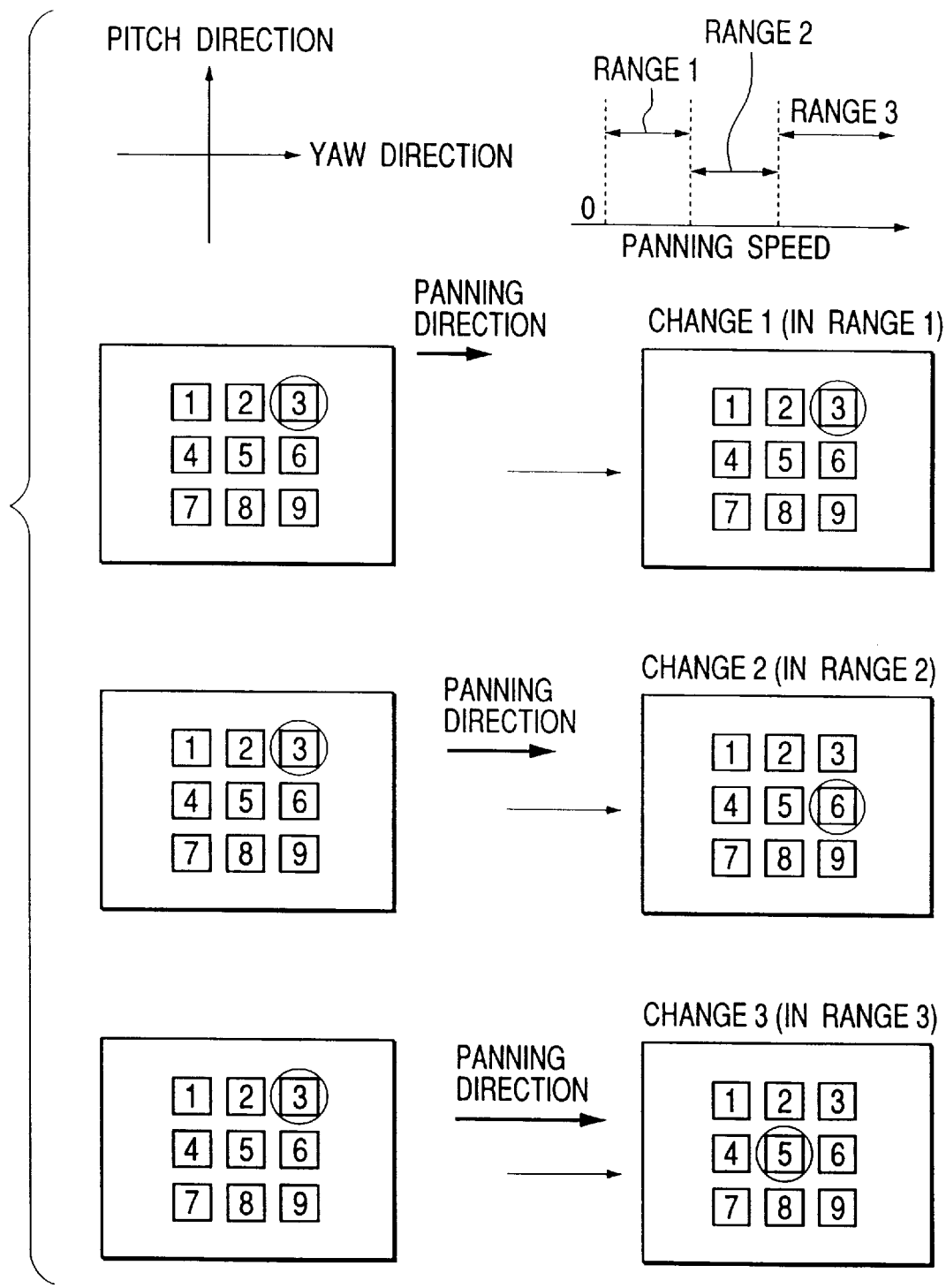
FIG. 15 shows a diagram for illustrating the states of focus area change in the speed determination mode 3 of a camera according to a fifth embodiment of the present invention.

As illustrated in FIG. 15, the "speed determination mode 3" is a mode for changing the position of the focus area selected in accordance with the panning speed of the camera and for changing the focus detecting position to a focus area corresponding to each range when the panning speed is located within predetermined speed ranges 1 to 3.

More specifically, as illustrated in FIG. 15, when the panning speed is located within "range 1", a focus area 3 is set to be selected (see change 1). When the panning speed is located within the "range 2", a focus area 6 is set to be selected (see change 2). When the panning speed is located within the "range 3", a focus area 5 is set to be selected (see change 3). The speed ranges can be set by a setting means (not shown). The position of the focus area to be changed in each range can also be set by the setting means (not shown). Accordingly, the focus area corresponding to the panning speed can be properly selected.

Figure 16:
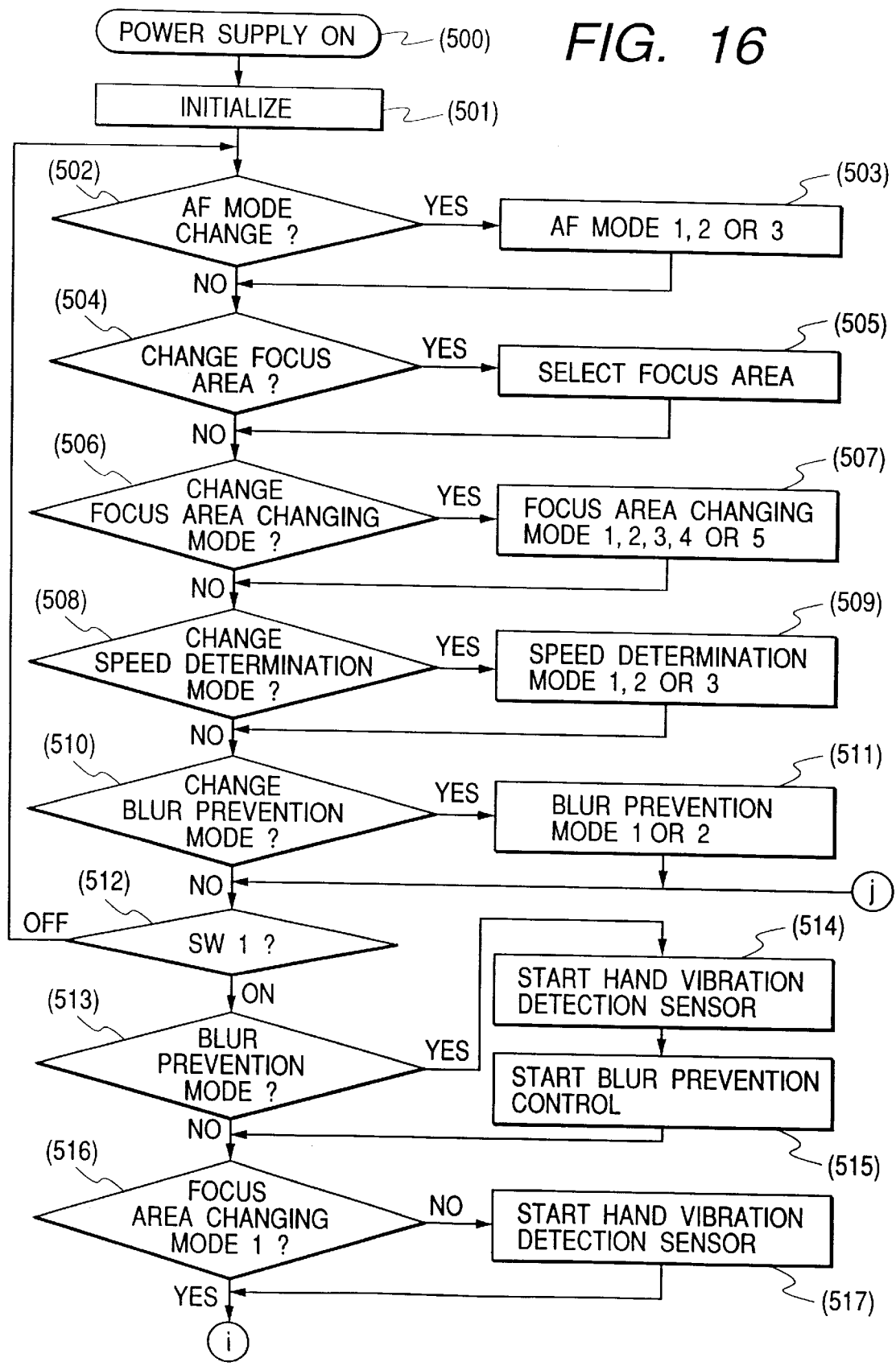
FIG. 16 is a flowchart showing a part of the operation of the camera according to the fifth embodiment of the present invention.
Figure 17B:
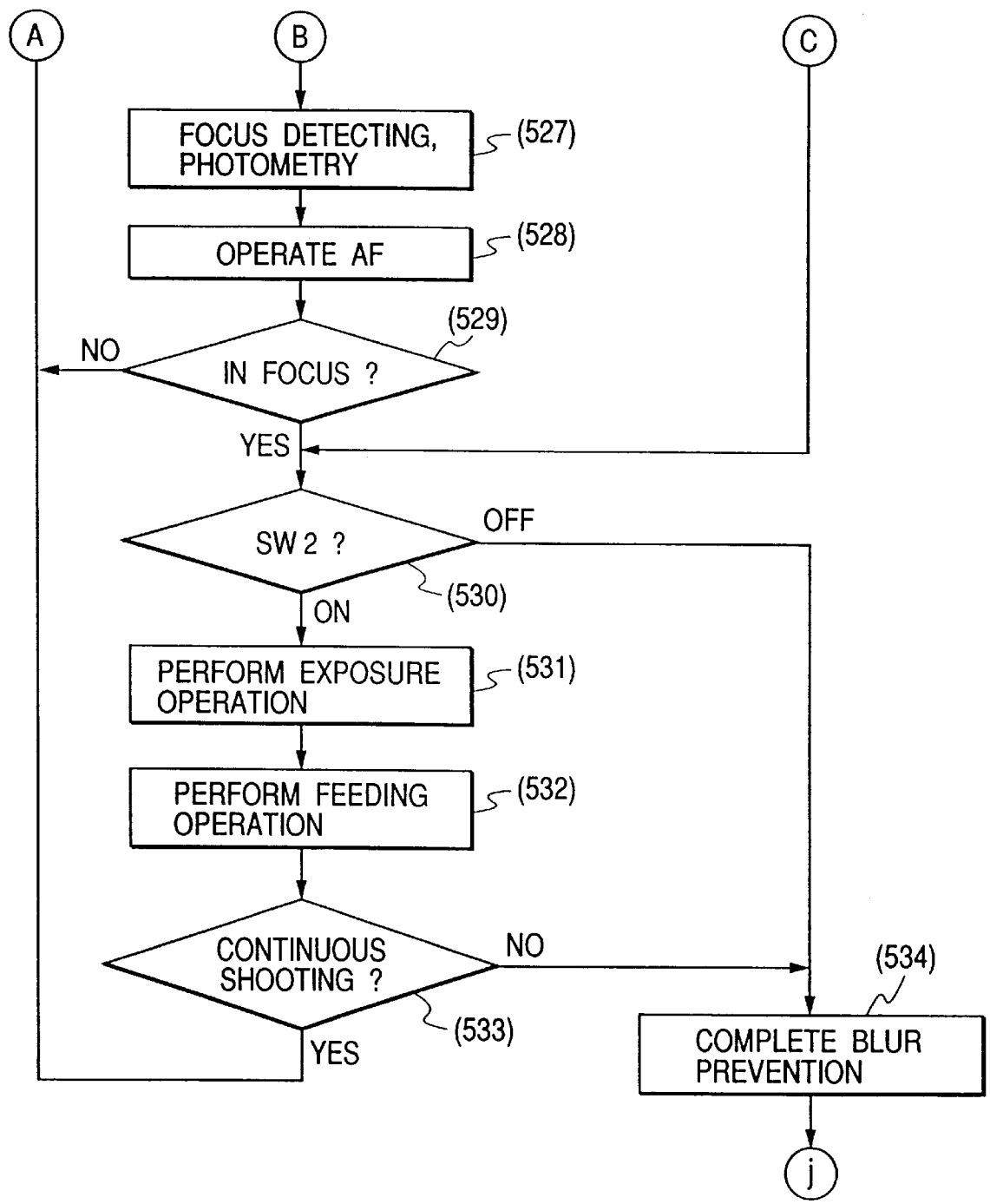
FIG. 17 which is comprised of FIGS. 17A and 17B is a flowchart showing the continuation of the operation of the camera shown in FIG. 16.

Now, the operations of the camera main body CMR and the lens LNS according to the fifth embodiment of the camera of the present invention will be explained using the flowcharts of FIGS. 16, 17A and 17B.

In step 500, when the system power supply of the camera is turned on, the procedure advances to step 501 to initialize the camera and lens, and then it moves to step 502. In step 502, it is decided whether or not the switch SWAF is pressed in order to change the presently selected AF mode. When the switch SWAF is not pressed, the procedure immediately advances to step 504. However, when the switch is pressed, the procedure advances to step 503 to set an AF mode selected from among AF modes 1, 2 and 3 and then, moves to step 504.

In step 504, it is decided whether or not the switch SWP is pushed in order to change the focus area. When the switch SWP is not pushed, the procedure quickly advances to step 506. However, when the switch is pushed, the procedure advances to step 505 to change the position of the focus area based on the number of times of pushing of the switch, and then moves to step 506. Then, in step 506, it is decided whether or not the switch SWMOD is pushed in order to change the focus area changing mode. When the switch SWMOD is not pushed, the procedure rapidly advances to step 50B. However, when the switch is pushed, the procedure shifts to step 507 to set a focus area changing mode selected from among focus area changing modes 1, 2, 3, 4 and 5, and then, moves to step 508. In step 508, it is decided whether or not the switch SWV for selecting the speed determination mode is pushed. When the switch SWV is not pushed, the procedure immediately advances to step 510. However, when the switch SWV is pushed, the procedure moves to step 509 to set a speed determination mode selected from among the speed determination modes 1, 2 and 3, and then, moves to step 510.

In step 510, it is decided whether the switch SWIS for selecting the blur prevention mode is pushed. When the switch SWIS is not pushed, the procedure immediately advances to step 512. However, when the switch is pushed, the procedure advances to step 511 to set a blur prevention mode selected from among the blur prevention modes 1 and 2, and then moves to step 512. In step 512, it is decided whether or not the switch SW1 is turned on. When the switch SW1 is not turned on, the procedure returns to step 502 to repeat operations similar to those mentioned above. When the switch SW1 is turned on, the procedure advances to step 513 to decide whether the blur prevention mode is selected or not. If the blur prevention mode is not selected, the procedure will rapidly advance to step 516. However, if "blur prevention mode 1" or "blur prevention mode 2" is selected, the procedure will advance to step 514 to actuate the hand vibration detection sensor GR. Then, in a next step 515, the second group of lenses L2 are shifted through the actuator IACT based on the output obtained from the hand vibration detection sensor to start blur prevention control, the procedure will then advance to step 516.

In step 516, it is decided whether or not currently set focus area changing mode is "focus area changing mode 1" for not changing the focus area. When it is "focus area changing mode 1", the procedure advances to step 518 shown in FIG. 17A. However, when it is "focus area changing mode 2" for changing the focus area to the central focus area, "focus area changing mode 3" for changing the focus area to an arbitrarily set focus area, and "focus area changing mode 4" or "focus area changing mode 5" which are shown in FIGS. 8A to 8C and 9A to 9C, the procedure advances to step 517 to actuate the hand vibration detection sensor GR for detecting the vibration of the camera (when the hand vibration detection sensor is already operating, the procedure directly shifts to the next step). After that, the procedure advances to step 518 shown in FIG. 17A.

In step 518, it is decided whether or not the focus is completely taken at the time of one-shoot AF. When the focus is completely taken at the time of one-shoot AF, the procedure immediately advances to step 530. However, when the focus is not completely taken at the time of one-shoot AF or the mode is not one-shoot AF or the mode is not one-shoot AF, that is to say, at the time of servo AF or at the time of AI servo AF, the procedure advances to step 519 to decide whether or not panning operation of the camera is performed based on the output of the hand vibration detection sensor GR. As a result, when it is possible to decide that panning operation is being carried out, the procedure advances to step 535 to decide whether "blur prevention mode 2" is selected or not. If "blur prevention mode 1" is selected, the procedure advances to step 526 because it is regarded that the photographer does not intend to pan the camera even when a panning operation is detected. If "blur prevention mode 2" is selected, the procedure advances to step 520 to decide whether the panning speed is situated within the "range 1" or not. When the panning speed is situated within the "range 1", the procedure advances to step 521 to change the position of the focus area to "change 1" shown in FIG. 15, and then moves to step 527. In step 520, when it is decided that the panning speed is located outside the "range 1", the procedure advances to step 522 to decide whether the panning speed is located within "range 2" or not. When the panning speed is located within "range 2", the procedure moves to step 523 to change the position of the focus area to the "change 2" shown in FIG. 15, and then moves to step 527. In step 522, when it is decided that the panning speed is located outside "ranges 1 and 2", the procedure advances to step 524 to decide whether the panning speed is located within "range 3" or not. When it is decided that the panning speed is located within "range 3", the procedure proceeds to step 525 to change the position of the focus area to "change 3" shown in FIG. 15 and then moves to step 527. Additionally, in step 524, when it is decided that the panning speed is not located within "ranges 1 to 3", the focus area is not changed and the procedure advances to step 527. In step 519, when it is impossible to discriminate a panning operation or when the hand vibration detection sensor GR does not operate, the procedure advances to step 526 to not change the focus area and then moves to step 527.

In step 527, the focus detecting device AFSNS or photometry device AESNS are driven to perform the focus detecting and photometrical operations at the position of the focus area. Then, in a next step 528, the focusing motor FMTR or focus encoder ENCF is driven to perform the AF operation. In a next step 529, it is decided whether or not a focused state is achieved. When a focused state is not achieved, the procedure returns to step 518 to repeat operations similar to those mentioned above. Thereafter, when it is decided that a focused state is obtained, the procedure advances to step 530.

In step 530, it is decided whether or not switch SW2 is turned on. When the switch SW2 is turned off, the procedure advances to step 534 to finish blur prevention control, and then returns to step 512 shown in FIG. 16. When the switch SW2 is turned on, the procedure advances to step 531 to drive the shutter SH or the like and carry out a known exposure operation. In a next step 532, the feeder or feeding device DR is driven to feed the film. Then, in step 533, it is decided whether or not a continuous shooting mode is realized. When a continuous shooting mode is realized, the procedure moves to step 518. On the other hand, when the continuous shooting or photographing mode is not realized, the procedure advances to step 534 to finish the blur prevention control, and then returns to step 512 shown in FIG. 16.

As stated above, according to the fifth embodiment of the invention, the focus area selecting method can be varied depending on the panning speed of the camera and the focus area can be changed to an optimum position depending on the panning speed of the camera. Therefore, the intention of the photographer can be more clearly expressed and the camera can be more easily handled by him.

(Sixth Embodiment)

According to a sixth embodiment of the present invention, a camera is provided which can change the focus area by detecting the panning operation as illustrated in the first to fifth embodiments and is further equipped with a function for detecting the completion of the panning operation and returning the focus area to a predetermined position upon detection of the completion of panning.

FIGS. 18A and 18B show diagrams for showing the conditions of the focus area. Referring to the drawing, the focus area is changed to a focus area 5 situated at a predetermined position upon detection of a panning operation, as illustrated in FIG. 18A. When the completion of the panning operation is detected, the focus area is returned to an initial focus area 3, as illustrated in FIG. 18B. This function can be set by operating a switch (not shown) of the camera. When this function is turned on, initialization is performed so that the focus area is returned to the position of the focus area before panning upon detection of the completion of the panning operation. Furthermore, the focus area can be changed to an arbitrary position by a selecting means (not shown) after completion of the panning operation. When it is not important to determine the position of the focus area after panning, the central position may be previously selected as the position of the focus area.

Figure 19:
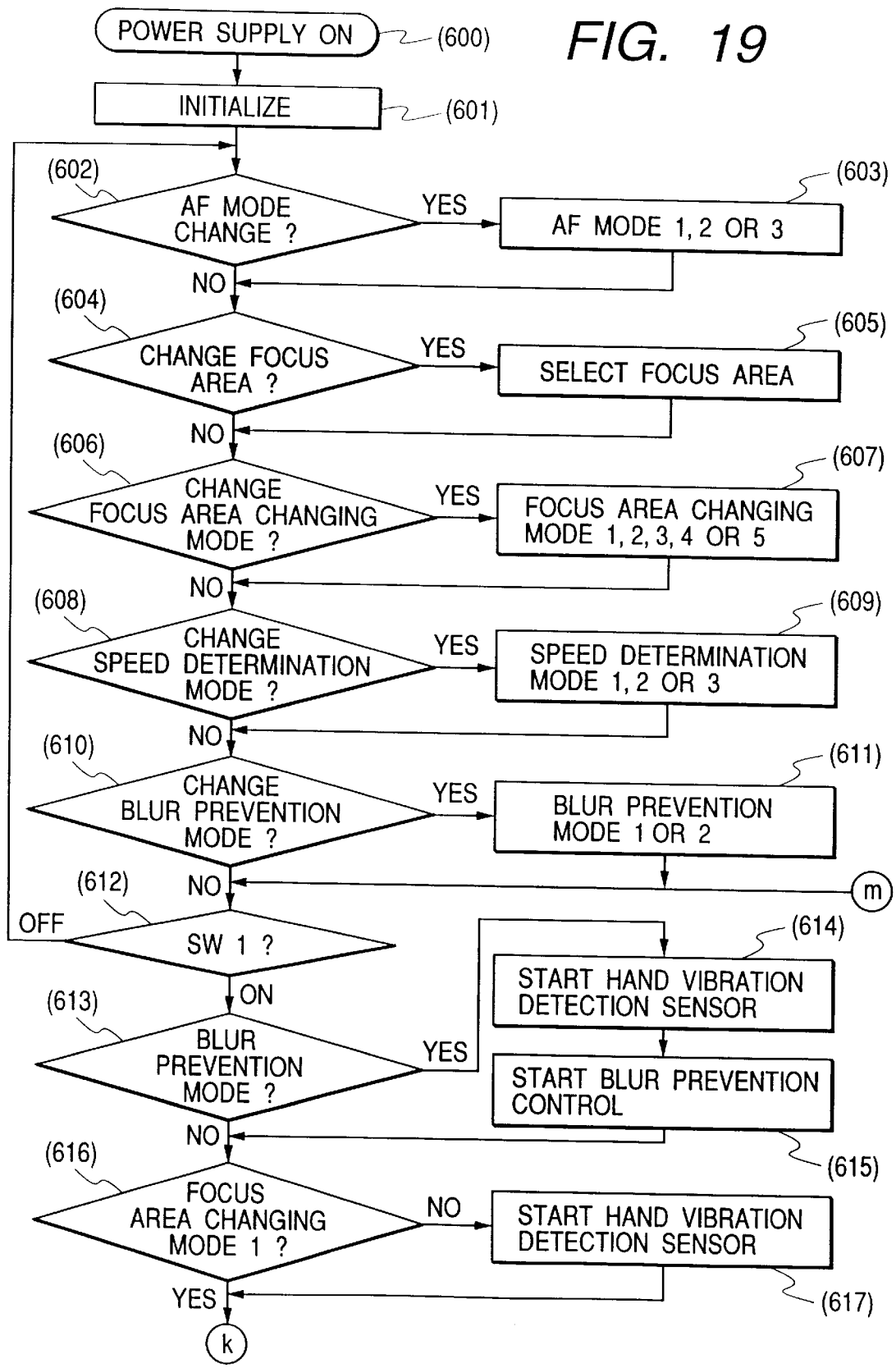
FIG. 19 is a flowchart showing a part of the operation of the camera according to the sixth embodiment of the present invention.
Figure 20:
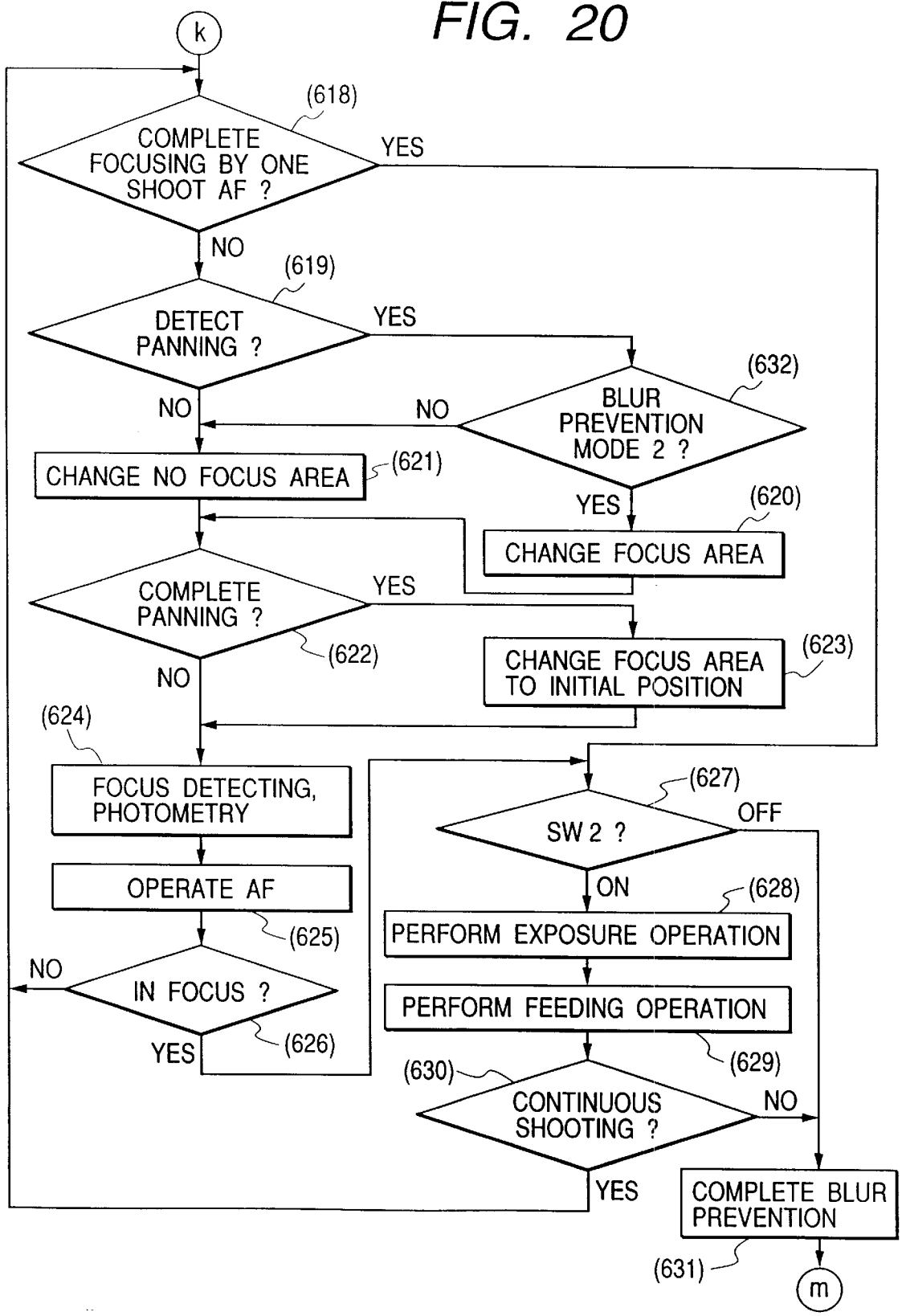
FIG. 20 is a flowchart showing the continuation of the operation of the camera shown in FIG. 19.

Now, the operations of the camera main body CMR and the lens LNS according to the sixth embodiment of the camera of the present invention will be described hereinafter by using the flowcharts of FIGS. 19 and 20.

In step 600, when the system power supply of the camera is turned on, the procedure advances to step 601 to initialize the camera and the lens, and then moves to step 602. In step 602, it is decided whether or not the switch SWAF is pushed in order to change the presently selected AF mode. When the switch SWAF is not pressed, the procedure immediately advances to step 604. However, when the switch is pressed, the procedure advances to step 603 to set an AF mode selected from among the AF modes 1, 2 and 3 and then moves to step 604.

In step 604, it is decided whether or not switch SWP is pushed in order to change the focus area. When the switch SWP is not pushed, the procedure quickly advances to step 606. However, when the switch is pushed, the procedure advances to step 605 to change the position of the focus area based on the number of times of pushing of the switch SWP, and then moves to step 606. Then, in step 606, it is decided whether or not the switch SWMOD is pushed in order to change the focus area changing mode. When the switch SWMOD is not pushed, the procedure rapidly advances to step 608. However, when the switch is pushed, the procedure shifts to step 607 to set a focus area changing mode selected from among the focus area changing modes 1, 2, 3, 4 and 5, and then moves to step 608. In step 608, it is decided whether or not the switch SWV for selecting the speed determination mode is pushed. When the switch SWV is not pushed, the procedure immediately advances to step 610. However, when the switch SWV is pushed, the procedure moves to step 609 to set a speed determination mode selected from among the speed determination modes 1, 2 and 3, and then moves to step 610.

In step 610, it is decided whether or not the switch SWIS for selecting the blur prevention mode is pushed. When the switch SWIS is not pushed, the procedure immediately advances to step 612. However, when the switch is pushed, the procedure advances to step 611 to set a blur prevention mode selected from among the blur prevention modes 1 and 2, and then moves to step 612. In step 612, it is decided whether or not the switch SW1 is turned on. When the switch SW1 is not turned on, the procedure returns to step 602 to repeat operations similar to those mentioned above. When the switch SW1 is turned on, the procedure advances to step 613 to decide whether or not the blur prevention mode is selected. If the blur prevention mode is not selected, the procedure will rapidly advance to step 616. However, if "blur prevention mode 1" or "blur prevention mode 2" is selected, the procedure will advance to step 614 to actuate the hand vibration detection sensor GR. Then, in a next step 615, the second group of lenses L2 are shifted through the actuator IACT based on the output obtained from the hand vibration detection sensor to start the blur prevention control. The procedure will then advance to step 616.

In step 616, it is decided whether or not a currently set focus area changing mode is the "focus area changing mode 1" for not changing focus area. When it is "focus area changing mode 1", the procedure advances to step 618 shown in FIG. 20. However, when it is "focus area changing mode 2" for changing the focus area to the central focus area, "focus area changing mode 3" for changing the focus area to an arbitrarily set focus area, or "focus area changing mode 4" or "focus area changing mode 5" which are shown in FIGS. 8A to 8C and 9A to 9C, the procedure advances to step 617 to actuate the hand vibration detection sensor GR for detecting the vibration of the camera (when the hand vibration detection sensor is already operating, the procedure directly shifts to the next step). After that, the procedure advances to step 618 shown in FIG. 20.

In step 618, it is decided whether or not the focus is completely taken at the time of one-shoot AF. When the focus is completely taken at the time of one-shoot AF, the procedure immediately advances to step 627. However, when the focus is not completely taken at the time of one-shoot AF or the mode is not one-shoot AF, that is to say, at the time of servo AF or at the time of AI servo AF, the procedure advances to step 619 to decide whether or not a panning operation of the camera is being performed based on the output of the hand vibration detection sensor GR. As a result, when it is possible to decide that a panning operation is being carried out, the procedure advances to step 632 to decide whether "blur prevention mode 2" is selected or not. If "blur prevention mode 1" is selected, the procedure advances to step 621 because it is regarded that the photographer does not intend to pan the camera even when a panning operation is detected. If "blur prevention mode 2" is selected, the procedure advances to step 620 to change the position of the focus area to a predetermined position based on the settings of the focus area changing mode and the speed determination mode, and then moves to step 622. When it is impossible to discriminate a panning operation or when the hand vibration detection sensor GR does not operate, the procedure advances to step 621 from step 619 to not change the focus area and then moves to step 622.

In step 622, it is decided whether or not the panning operation is completed. When the panning operation is completed, the procedure advances to step 623 to return the focus area to the position before the panning operation is detected, that is to say, the initial position, and then, moves to step 624. In addition, when it is decided that the panning operation is not finished, the procedure immediately advances to step 624.

In step 624, the focus detecting device AFSNS or the photometry device AESNS is driven to perform the focus detecting and photometrical operations at the position of the selected focus area. Then, in a next step 625, the focusing motor FMTR or the focus encoder ENCF is driven to perform the AF operation. In a next step 626, it is decided whether or not a focused state is achieved. When a focused state is not achieved, the procedure returns to step 618 to repeat the operations similar to those mentioned above. Thereafter, when it is decided that a focused state is obtained, the procedure advances to step 627.

In step 627, it is decided whether or not the switch SW2 is turned. When the switch SW2 is turned off, the procedure advances to step 631 to finish blur prevention control, and then returns to step 612 shown in FIG. 19. Furthermore, when the switch SW2 is turned on, the procedure advances to step 628 to drive the shutter SH or the like and carry out a known exposure operation. In a next step 629, the feeder or feeding device DR is driven to feed the film. Then, in step 630, it is decided whether or not a continuous shooting mode is realized. When the continuous shooting mode is realized, the procedure moves to step 618. On the other hand, when the continuous shooting or photographing mode is not realized, the procedure advances to step 631 to finish blur prevention control, and then returns to step 612 shown in FIG. 19.

As stated above, according to the sixth embodiment of the camera in which the position of the focus area is changed based on the detection of a panning operation, when the panning operation is completed, the focus area can be returned to the initial position. Accordingly, the camera operation can be more readily controlled when the panning operation of the camera shifts to a stationary state.

(Seventh Embodiment)

According to the sixth embodiment of the camera of the invention, the focus area is returned to the position of the focus area before panning when the completion of a panning operation is detected. As compared therewith, according to a seventh embodiment of the invention, when it is not significant to determine the position of the focus area after the panning operation, the focus area changed is maintained as it is (for instance, the central position is maintained as it is). In this case, needless to say, the position of the focus area to be changed after the completion of the panning operation may be maintained at the changed position of the focus area by a selecting means (not shown) or may be changed to the initial position (the position of the focus area before the panning operation) as described in the sixth embodiment.

Figure 21:
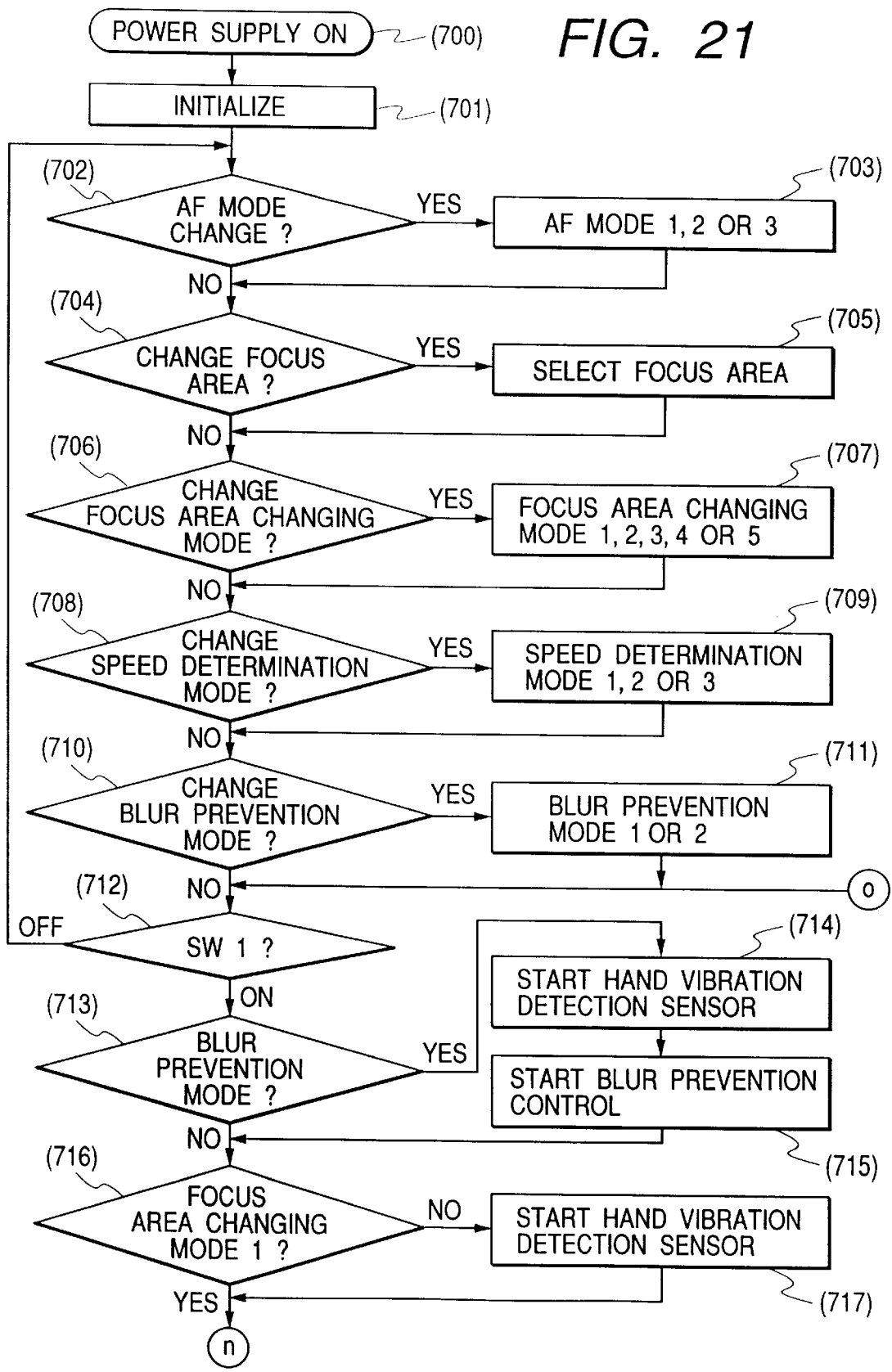
FIG. 21 is a flowchart showing a part of the operation of the camera according to a seventh embodiment of the present invention.
Figure 22:
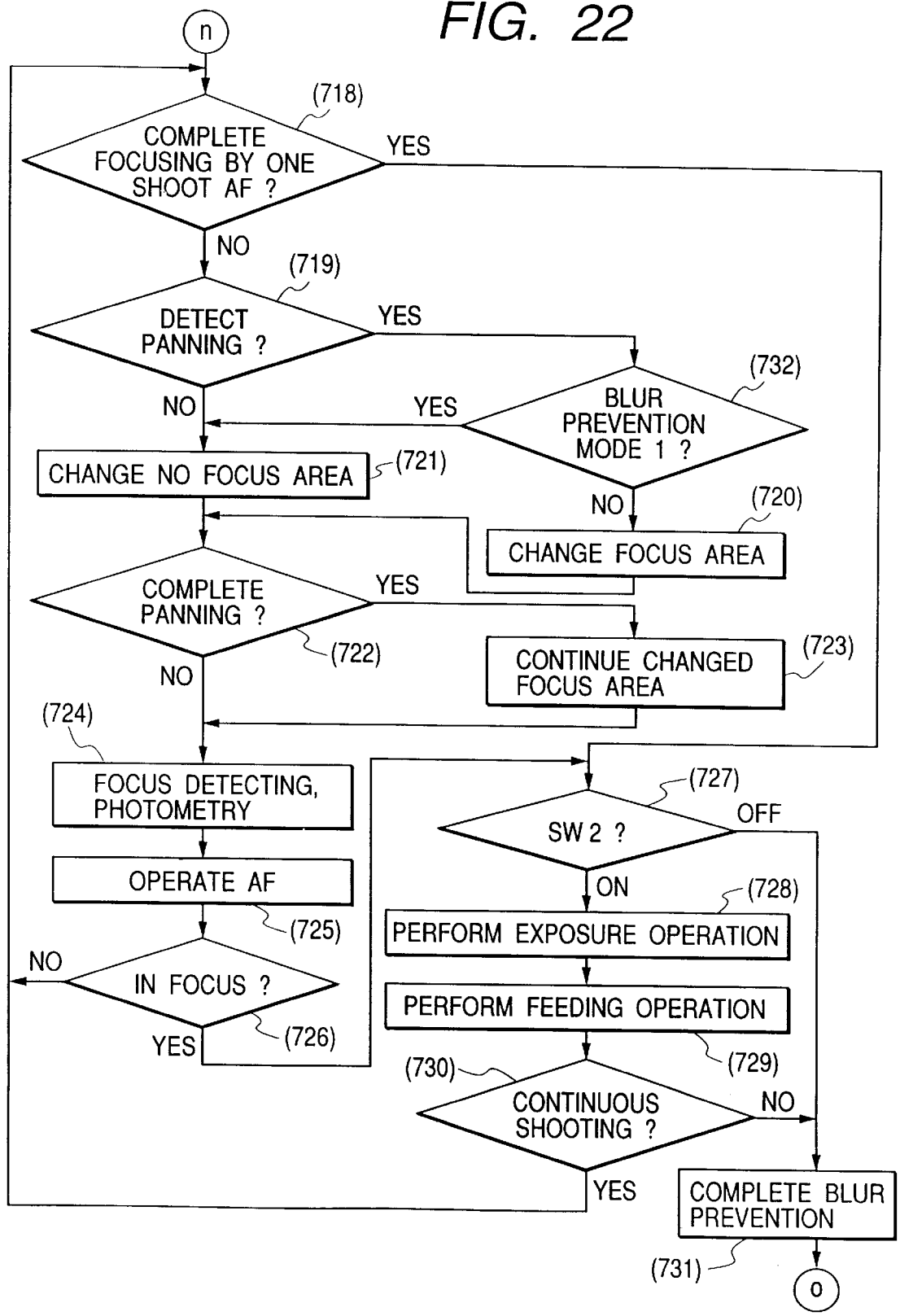
FIG. 22 is a flowchart showing the continuation of the operation of the camera shown in FIG. 21.

Now, the operations of the camera main body CMR and the lens LNS according to the seventh embodiment of the camera of the present invention will be explained using the flowcharts of FIGS. 21 and 22.

In step 700, when the system power supply of the camera is turned on, the procedure advances to step 701 to initialize the camera and lens, and then moves to step 702. In step 702, it is decided whether or not the switch SWAF is pressed in order to change the presently selected AF mode. When the switch SWAF is not pressed, the procedure immediately advances to step 704. However, when the switch is pressed, the procedure advances to step 703 to set an AF mode selected from among the AF modes 1, 2 and 3 and then, moves to step 704.

In step 704, it is decided whether or not the switch SWP is pushed in order to change the focus area. When the switch SWP is not pushed, the procedure quickly advances to step 706. However, when the switch is pushed, the procedure advances to step 705 to change the position of the focus area based on the number of times of pushing of the switch SWP, and then moves to step 706. Then, in step 706, it is decided whether or not the switch SWMOD is pushed in order to change the focus area changing mode. When the switch SWMOD is not pushed, the procedure rapidly advances to step 708. However, when the switch is pushed, the procedure shifts to step 707 to set a focus area changing mode selected from among the focus area changing modes 1, 2, 3, 4 and 5, and then moves to step 708. In step 708, it is decided whether or not the switch SWV for selecting the speed determination mode is pushed. When the switch SWV is not pushed, the procedure immediately advances to step 710. However, when the switch SWV is pushed, the procedure moves to step 709 to set a speed determination mode selected from among the speed determination modes 1, 2 and 3, and then moves to step 710.

In step 710, it is decided whether or not the switch SWIS for selecting the blur prevention mode is pushed. When the switch SWIS is not pushed, the procedure immediately advances to step 712. However, when the switch is pushed, the procedure advances to step 711 to set a blur prevention mode selected from among the blur prevention modes 1 and 2, and then moves to step 712. In step 712, it is decided whether or not the switch SW1 is turned on. When the switch SW1 is not turned on, the procedure returns to step 702 to repeat the operations similar to those mentioned above. When switch SW1 is turned on, the procedure advances to step 713 to decide whether the blur prevention mode is selected or not. If the blur prevention mode is not selected, the procedure will rapidly advance to step 716. However, if "blur prevention mode 1" or "blur prevention mode 2" is selected, the procedure will advance to step 714 to actuate the hand vibration detection sensor GR. Then, in a next step 715, the second group of lenses L2 is shifted through the actuator IACT based on the output obtained from the hand vibration detection sensor to start blur prevention control, and then the procedure will advance to step 716.

In step 716, it is decided whether or not the currently set focus area changing mode is "focus area changing mode 1" for not changing the focus area. When it is "focus area changing mode 1", the procedure advances to step 718 shown in FIG. 22. However, when it is "focus area changing mode 2" for changing the focus area to the central focus area, "focus area changing mode 3" for changing the focus area to an arbitrarily set focus area, or "focus area changing mode 4" or "focus area changing mode 5" which are shown in FIGS. 8A to 8C and 9A to 9C, the procedure advances to step 717 to actuate the hand vibration detection sensor GR for detecting the vibration of the camera (when the hand vibration detection sensor is already operating, the procedure directly shifts to the next step). After that, the procedure advances to step 718 shown in FIG. 22.

In step 718, it is decided whether or not the focus is completely taken at the time of one-shoot AF. When the focus is completely taken at the time of one-shoot AF, the procedure immediately advances to step 727. However, when the focus is not completely taken at the time of one-shoot AF or the mode is not one-shoot AF, that is to say, at the time of servo AF or at the time of AI servo AF, the procedure advances to step 719 to decide whether or not a panning operation of the camera is being performed based on the output of the hand vibration detection sensor GR. As a result, when it is possible to decide that a panning operation is being carried out, the procedure advances to step 732 to decide whether "blur prevention mode 2" is selected or not. If "blur prevention mode 1" is selected, the procedure advances to step 721 because it is regarded that the photographer does not intend to pan the camera even when a panning operation is detected. If "blur prevention mode 2" is selected, the procedure advances to step 720 to change the position of the focus area to a predetermined position based on the settings of the focus area changing mode and the speed determination mode, and then moves to step 722. When it is impossible to discriminate a panning operation or when the hand vibration detection sensor GR does not operate, the procedure advances to step 721 from step 719 to not change the focus area, and then moves to step 722.

In step 722, it is decided whether or not the panning operation is completed. When the panning operation is completed, the procedure advances to step 723 to move to step 724 while the changed focus area is held at the position. Furthermore, when it is decided that the panning operation is not completed, the procedure quickly advances to step 724.

In step 724, the focus detecting device AFSNS and the photometry device AESNS are driven to perform the focus detecting and photometrical operations at the position of the selected focus area. Then, in a next step 725, the focusing motor FMTR or the focus encoder ENCF is driven to perform the AF operation. In a next step 726, it is decided whether or not a focused state is achieved. When a focused state is not achieved, the procedure returns to step 718 to repeat operations similar to those mentioned above. Thereafter, when it is decided that a focused state is obtained, the procedure advances to step 727.

In step 727, it is decided whether or not the switch SW2 is turned on. When the switch SW2 is turned off, the procedure advances to step 731 to finish the blur prevention control, and then returns to step 712 shown in FIG. 21. When the switch SW2 is turned on, the procedure advances to step 728 to drive the shutter SH or the like and carry out a known exposure operation. In a next step 729, the feeder or feeding device DR is driven to feed the film. Then, in step 730, it is decided whether or not a continuous shooting mode is realized. When a continuous shooting mode is realized, the procedure moves to step 718. On the other hand, when a continuous shooting or photographing mode is not realized, the procedure advances to step 731 to finish blur prevention control, and then returns to step 712 shown in FIG. 21.

As described above, according to the seventh embodiment of the camera of the invention in which the position of the focus area is changed based on the detection of a panning operation, the focus area is held at the position after changing even after the panning operation is finished. Therefore, a photographer can continuously follow a main object to be photographed which is located at, for example, the central position of the focus area changed upon panning operation. Accordingly, beginners can handle this camera without difficulty.

(Modified Example)

Although the present invention is applied to the camera by way of various kinds of embodiments, needless to say, the invention is not limited to the camera and may be also applied to other optical devices.

Furthermore, although the focus areas are exemplified as a plurality of ranges, it goes without saying that the focus areas may be ranges for directly detecting distance information.

Furthermore, needless to say, the number of the focus areas may not be limited to 9 as shown in FIG. 2 or the like and may be larger or smaller than 9.

Besides, it should be noted that the camera of the present invention may be constituted by combining the above-mentioned embodiments or the technical features thereof.

(Eighth Embodiment)

Figure 23:
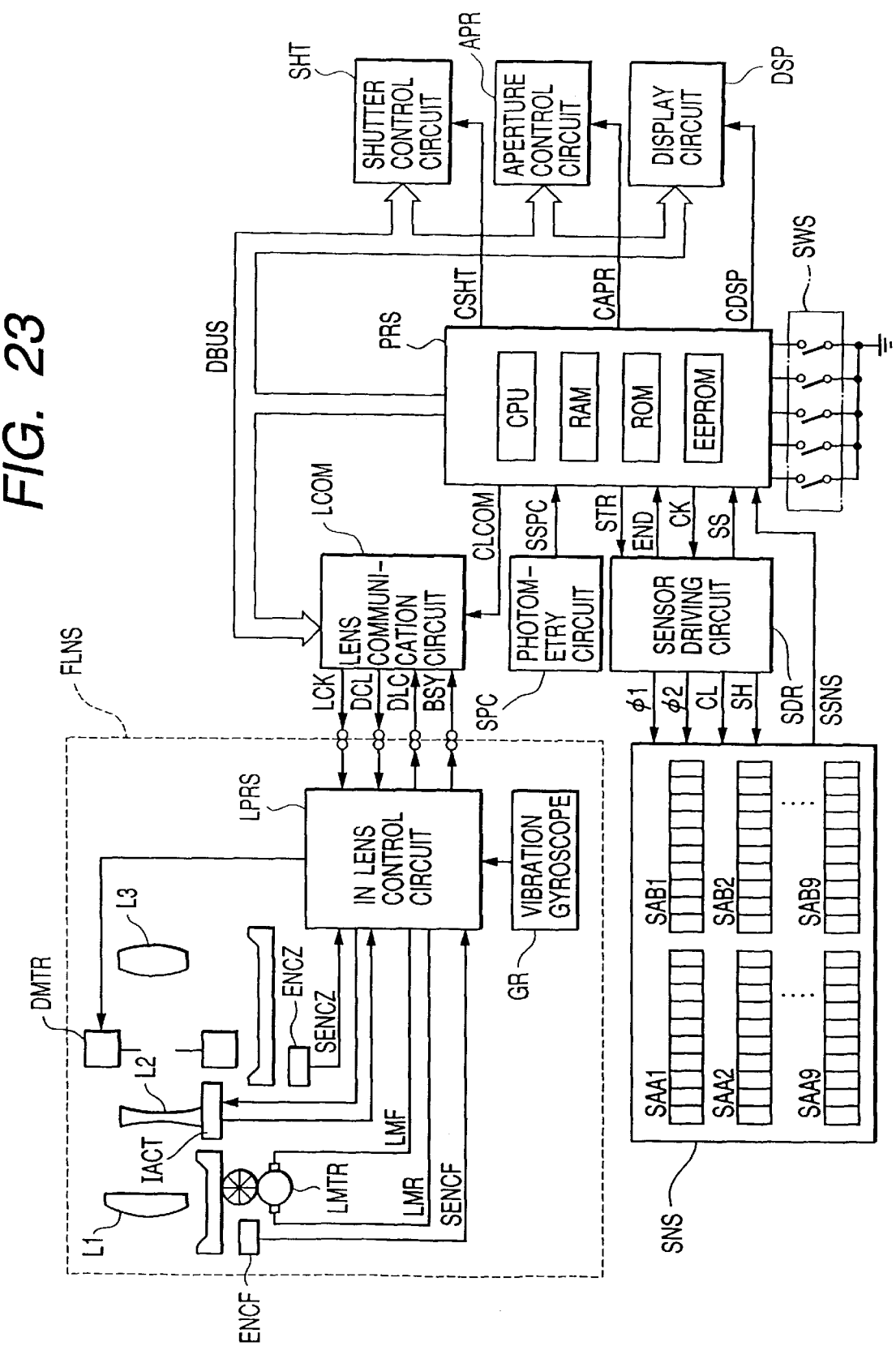
FIG. 23 is a block diagram showing the schematic construction of an automatic focusing camera according to an eighth embodiment of the present invention.

FIG. 23 is a block diagram showing the schematic constitution of an automatic focus camera according to an eighth embodiment of the present invention.

In FIG. 23, PRS designates a control circuit for a camera and is a one-chip microcomputer including, for instance, a CPU (central processing unit), a RAM, a ROM, an EEPROM (electric erasable programmable ROM) and input and output ports, etc. In the ROM and the EEPROM, a sequence of software for controlling the camera including various kinds of correction data and parameters is stored. DBUS designates a data bus. SHT is a shutter control circuit for receiving data inputted through the data bus DBUS and controlling the travel of a shutter leading and trailing curtain (not shown) based on the data, while a control signal CSHT is inputted from the control circuit PRS. APR is an aperture control circuit for receiving data inputted through the data bus DBUS and controlling an aperture mechanism not shown based on the data, while a control signal CAPR is inputted. DSP is a display circuit for receiving data through the data bus DBUS and displaying a variety of photographing information based on the data, while a control signal CDSP is inputted. SWS designates a group of switches including a release switch (not shown), a continuous shooting mode switch and a switch for setting a variety of information, etc.

SPC represents a photometry circuit. An analog photometry signal SSPC as the output of the photometry circuit is sent to the control circuit PRS in which the signal SSPC is A/D converted, and the A/D converted signal is used as photometrical data for controlling the shutter control circuit SHT and the aperture control circuit APR.

LCOM is a lens communication circuit for receiving data inputted through the data bus DBUS and performing a serial communication with a lens FLNS side based on the data while a control signal CLCOM is inputted. The lens communication circuit serves to synchronize with a clock signal LCK and to transmit lens driving data DCL to a lens control circuit and serially input lens information DLC at the same time.

The signal DCL inputted to an in-lens control circuit LPRS in synchronization with the signal LCK designates the data of instruction to the lens FLNS sent from the camera. The operation of the lens relative to the instruction is predetermined.

The in-lens control circuit LPRS analyzes the instruction in accordance with a predetermined procedure, carries out a focusing operation, an aperture control and blur prevention operations, etc. and outputs various kinds of operation states of the lens from the signal DLC (information on what extent a focusing optical system has moved, or whether the focusing optical system is located at the nearest end or at the infinite end, how many stages the aperture or diaphragm is restricted, the state of blur prevention operation, etc.) or parameters (F stop number, focal distance, coefficients of the amount of defocusing to the amount of supply etc.).

According to the constitution of the automatic focus camera shown in FIG. 23, an example of a zoom lens is shown. When a focusing instruction is sent from the camera, a motor LMTR for AF is driven in response to signals LMF and LMR based on a driving amount and direction supplied simultaneously to move optical system in the direction of an optical axis. The amount of movement of the optical system is counted by a counter in the in-lens control circuit LPRS by monitoring the pulse signal SENCF of an encoder ENCF. When a predetermined movement of the optical system is completed, or it reaches the nearest end or the infinite end, the in-lens control circuit LPRS itself sets the signals LMF and LMR to "L" to brake the motor LMTR for AF.

Therefore, after the instruction of AF is sent from the camera once, the control circuit PRS in the camera does not need to be involved in the driving of the lens until the driving of the lens is completed. Furthermore, the contents of the counter, or the information of the nearest end and the infinite end can be transmitted to the camera as required.

When the instruction of an aperture control is sent from the camera, a stepping motor DMTR is driven to drive a diaphragm based on the number of stages for restricting the diaphragm or aperture, which is sent simultaneously. The open control of stepping motor DMTR can be performed, so that an encoder for monitoring the operation thereof is not necessary.

ENCZ is an encoder affixed to a zoom optical system and serves to output a signal SENCZ to the in-lens control circuit LPRS to detect a zoom position.

In the in-lens control circuit LPRS are stored the parameters of the lenses at respective zoom positions. A parameter corresponding to a present zoom position is transmitted to the camera upon request from the control circuit PRS of the camera side.

GR is a vibration gyroscope for detecting the angular vibration of the camera in the vertical (pitch) and the horizontal (yaw) direction of the camera and transmits the obtained result to the in-lens control circuit LPRS. IACT is an actuator for correcting image blur and driving in the respective directions a second group of lenses L2 supported by a mechanism not shown so that they can be independently shifted in two dimensional directions on a plane perpendicular to an optical axis for photographing. The second group of lenses are shifted, so that an image formed on an image forming surface is also shifted. Accordingly, the second group of lenses L2 are driven to shift depending on hand vibration information supplied from the vibration gyroscope GR; hence, image blur due to hand vibration can be corrected. Since image blur is corrected independently in the two directions of pitch and yaw, respectively, two sets of the vibration gyroscopes GR and image blur correcting actuators IACT are respectively provided for correcting the pitch and yaw directions.

The panning operation of the camera is detected based on the hand vibration information of the vibration gyroscope GR. Thus, when the image blur correcting function is turned on, the hand vibration and the panning operation are detected by the vibration gyroscope GR. When the image blur correcting function is turned off, an image blur correction driving system is not actuated and only the vibration gyroscope GR is actuated so that the panning operation of the camera can be detected. The vibration gyroscope detects the angular velocity of the vibration of the camera. Accordingly, when an angular velocity of the camera no lower than a predetermined angular velocity value is detected for a time not shorter than a predetermined time in a specific direction, it is decided that a panning operation is being carried out.

SDR is a sensor driving circuit which has nine pairs of sensor rows SAA1 to SAA9 and SAB1 to SAB9 in accordance with respective signals inputted from the control circuit PRS. The numbers of the nine pairs of sensor rows correspond respectively to those of focus areas in the finder of a camera shown in FIG. 24. The focus areas are arranged at positions for detecting images secondarily formed on the respective focus areas.

When an accumulation start signal STR is sent to the sensor driving circuit SDR from the control circuit PRS, the sensor driving circuit SDR outputs a clear signal CL to a line sensor SNS to temporarily clear the charges of all the photoelectric transfer parts of the sensor rows SAA1 to SAA9 and SAB1 to SAB9. Then, the line sensor SNS starts the photoelectric transfer and charge accumulation operations of photoelectric images formed on the sensor rows SAA1 to SAA9 and SAB1 to SAB9 through a secondary image forming lens arranged on a front stage.

The accumulation time of the sensor is controlled by the sensor driving circuit SDR. When the sensor accumulation is finished, the sensor driving circuit SDR outputs a transfer signal SH to the sensor (line sensor SNS) whose accumulation is completed. The charge accumulated in the photoelectric transfer part of the line sensor SNS is transferred to a CCD part. At the same time, the sensor driving circuit SDR outputs an accumulation finish signal END and the identification signal SS of the sensor whose accumulation is completed to the control circuit PRS and waits for the input of a CCD driving clock CK from the control circuit PRS. At the input time of the CCD driving clock CK, the sensor driving circuit SDR generates CCD driving signals $\phi1$ and $\phi2$ and outputs the signals to the line sensor SNS. When the CCD driving signals $\phi1$ and $\phi2$ are inputted to the line sensor, the line sensor SNS outputs an analog image signal SSNS to the control circuit PRS in accordance with the signals.

Thus, the control circuit PRS performs an A/D conversion to the analog image signal SSNS in synchronization with the CCD driving clock CK to store pairs of image signals in predetermined addresses in the RAM. Then, the control circuit PRS performs a correlation calculation from the image signals of the respective sensors to calculate the amount of image shift on the sensor. The amount of image shift is calculated by a well-known calculation method. The calculated result is stored in the predetermined RAM. Then, the control circuit PRS calculates the amount of defocusing on each focus area from the calculated amount of image shift and the optical parameters of a focus detecting secondary optical system and a photographic lens and stores the obtained result in the predetermined RAM. Subsequently, absolute distances to objects located in the respective focus areas are obtained from the respective amounts of defocusing and the positions of the lenses (see (a) and (d) in FIG. 25). When the panning operation of the camera is not detected, evaluation values for selection in the focus areas are calculated (see (c) in FIG. 25) by multiplying the absolute distances as shown in (a) in FIG. 25 obtained from the respective focus areas by coefficients which represent selecting priority in the focus areas (see (b) in FIG. 25). Furthermore, when the panning operation is detected, evaluations values for selection in the focus areas are calculated (see (f) in FIG. 25) by multiplying absolute distances (see (d) in FIG. 25) obtained from the respective focus areas by coefficients which represent selecting priority in the focus areas (see (e) in FIG. 25). The evaluation values for selection in the focus areas are values used for selecting the positions of the focus areas. The focus area whose evaluation value for selection is the minimum is adopted as an object to be shot or photographed.

Therefore, when the values of coefficients for representing the selecting priority are all equal in terms of all points as illustrated in (b) in FIG. 25, a focus area in which an object with a small absolute distance is located such as a focus area marked with a circle in (c) in FIG. 25 is automatically employed in a simple manner. On the other hand, as illustrated in (e) in FIG. 25, the coefficients of the selecting priority become larger from the central parts toward outer parts, so that the focus areas situated in the outer parts are less likely to be selected than those situated in the central parts (see (f) in FIG. 25).

The state of panning of the camera is detected based on the output of the vibration gyroscope GR in the lens side and is successively transmitted to the camera side. Therefore, the camera changes one by one the values of the coefficients for representing the selecting priority which are previously stored in the ROM, based on the change of the panning state, so that the focus area can be properly selected so as to meet the panning state. Additionally, the values of coefficients of the selecting priority may be stored in the ROM in the lens side, or proper coefficients of selecting priority may be successively transmitted to the camera side depending on the state of the lens or the panning state to select the focus area.

Figure 26B:
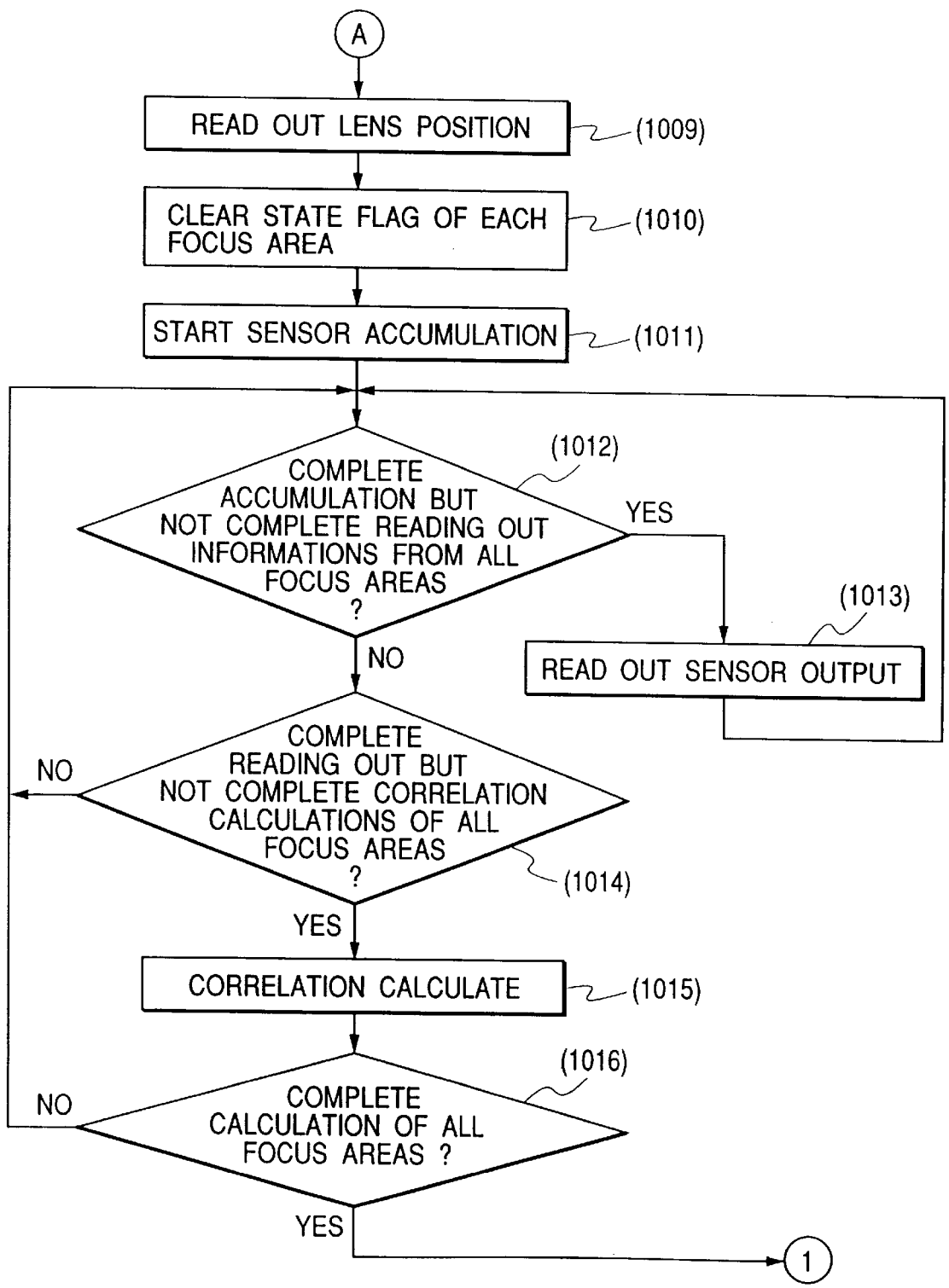
FIG. 26 which is comprised of FIGS. 26A and 26B is flowchart showing a part of the operation of the main parts of the automatic focusing camera according to the eighth embodiment of the present invention.

Now, the operations of the main parts of the camera according to the eighth embodiment of the present invention will be described by employing the flowcharts of FIGS. 26A and 26B.

In step 1001, when the power supply of the camera is turned on, the procedure of the CPU advances to step 1002 to initialize the camera and the lens. In a next step 1003, it is decided whether or not a setting concerning the photographing operation of the camera is changed. When a photographer operates a change switch, the procedure of the CPU advances to step 1004. When the setting is not changed, the procedure proceeds to step 1005. In step 1004, the changed setting state by a photographer is read and the procedure of the CPU moves to step 1005.

In the next step 1005, it is decided whether or not a switch SW1 (not shown) is turned on by the first stroke of a release button in a group of switches SWS. When the switch SW1 is not turned on, the procedure of the CPU returns to step 1003 to perform operations similar to the above described operations. On the other hand, when the switch SW1 is turned on, the procedure of the CPU advances to step 1006 to actuate the vibration gyroscope GR in the lens side and start the detection of the panning state of the camera. In next step 1007, it is decided whether or not a first focus detecting calculation is performed. When the first focus detecting calculation is performed, the procedure of the CPU advances to step 1008. When the first focus detecting calculation is not executed, the procedure moves to step 1009. In step 1008, a communication with the lens is performed so as to input the information of the lens to the control circuit PRS. That is to say, information such as the focal distance from the lens, the nearest distance, a sensitivity factor, comb-type pitch, etc. is read and the procedure advances to step 1009.

In step 1009, the present absolute position of the lens is read and the procedure of the CPU proceeds to step 1010. In step 1009, when there is no information on the absolute position of the lens, the movement of the lens at an initial position upon start of AF, or the movement of the lens from the nearest end is stored in a predetermined memory, or the lens is butted to the infinite end at a suitable time such as at the time of turning on the power. The movement of the lens after that is stored in the predetermined memory, so that the present position of the lens can be obtained. In the next step 1010, the state flag of each focus area is cleared to perform an initialization and the procedure of the CPU advances to step 1011. In the nine focus areas 1 to 9 (see FIG. 24) are respectively provided accumulation completion flags I1 to I9, reading completion flags R1 to R9, calculation completion flags C1 to C9 and reliability flags T1 to T9 showing that calculation is impossible and the reliability of the calculated result is low.

In the next step 1011, the control signal is supplied to the line sensor SNS to start the accumulation of the output of the sensor. When the accumulation of the output of the sensor is finished, an interruption command is sent from the sensor driving circuit SDR to carry out interruption processing. When an interruption command is sent, the accumulation completion flag I corresponding to the sensor whose accumulation is completed is set up to show that the accumulation is completed. Then, in the next step 1012, it is decided whether or not there is a focus area whose accumulation is completed but reading is not completed. When there is a focus area whose accumulation is completed but reading is not completed, the procedure advances to step 1013. When these conditions are not satisfied, the procedure advances to step 1014. In step 1013, the output of the sensor is read. A read-out clock is sent to the line sensor SNS and sequentially A/D converted to read out data after the A/D conversion. The A/D converted data undergoes a correction calculation and the corrected and calculated data is stored in the predetermined RAM. Then, the reading completion flag R corresponding to the focus area in which the reading of the data is completed is set up and the procedure of the CPU returns to step 1012.

In step 1014, it is decided whether or not there is data whose reading by the sensor is completed and whose correlation calculation is completed. When there is data whose reading is completed but whose correlation calculation is not finished, the CPU procedure advances to step 1015. However, when such data does not exist, the procedure returns to step 1012. In step 1015, the correlation calculation is carried out to calculate the amount of image shift on the sensor. The amount of image shift is calculated in accordance with a known method. The calculated result is stored in the predetermined RAM. When the correlation calculation is completed, the calculation completion flag C corresponding to the focus area in which the correlation calculation is finished is set up. Furthermore, when the correlation complection is carried out, and the calculation is impossible or the calculated result is not sufficiently reliable such as if it lacks enough contrast to be relied on, the reliability flag T corresponding to the focus area in which the calculation cannot be done or produce a satisfactory result is also set up. Then, in step 1016, it is decided whether or not the calculations of all focus areas are completed. When all the calculation completion flags C are set up, the procedure advances to step 1017 shown in FIG. 27 because the calculations of the nine focus areas are completed. When there is a focus area in which the calculation is not finished, the procedure returns to step 1012.

Figure 27:
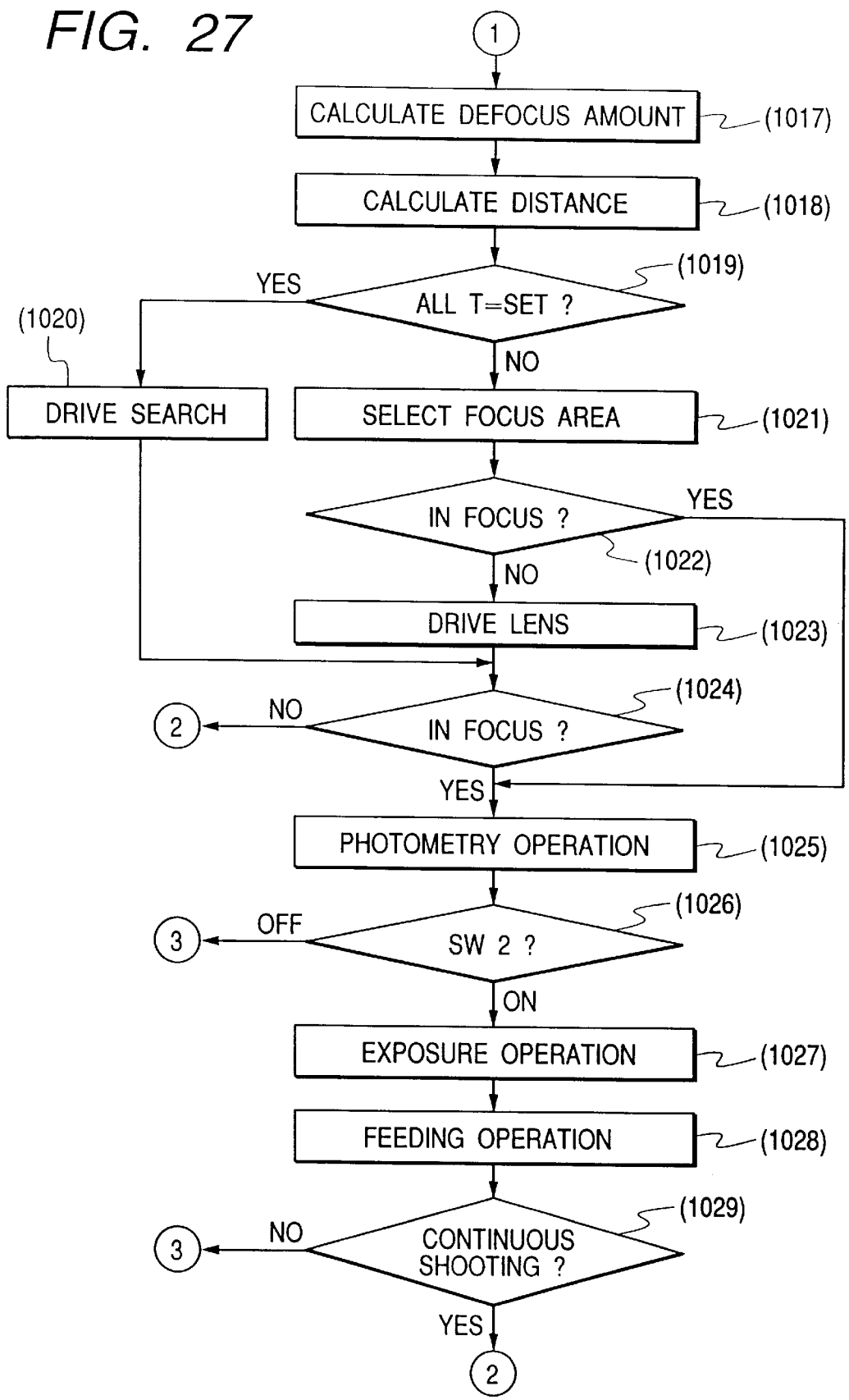
FIG. 27 is a flowchart showing the continuation of the operation of the main parts of the camera shown in FIGS. 26A and 26B.

In step 1017 shown in FIG. 27, the defocus amount of the lens is obtained from the amount of image shift obtained in step 1015. The relation between the amount of image shift and the defocus amount is determined by the optical parameters of the focus detecting secondary optical system and the photographing lens. It is assumed that the defocus amounts DF (1) to DF (9) respectively correspond to the focus areas 1 to 9. In this case, however, the focus area on which the reliability flag T is set up is to be neglected. In the next step 1018, absolute distances AD (1) to AD (9) focally detected in the respective focus areas are gained based on the defocus amounts DF (1) to DF (9) obtained in step 1017 and the position of the lens stored in step 1009. However, in this case, the focus area with the reliability flag T set on is to be neglected.

In the next step 1019, it is decided whether or not the reliability flags T are set up on all the focus areas. When they are set up on the focus areas, the CPU procedure advances to step 1020. When the reliability flags T are not set up on the focus areas, the procedure moves to step 1021. In step 1020, since the reliability flags T are set up on all the focus areas, the lens is driven to the infinite side (in what is called a search operation) and the procedure advances to step 1024.

Furthermore, when the CPU procedure advances to step 1021, the focus area for performing a focusing operation is automatically selected. This automatic selection of the focus area will be described in detail by referring to FIG. 28. In the next step 1022, it is decided whether or not the selected focus area is in focus. When it is in focus, the procedure advances to step 1025. When it is not in focus, the procedure advances to step 1023. In step 1023, the amount of driving of the lens is calculated, lens communication is performed and lens driving is controlled. Then, in the next step 1024, it is decided whether or not the focus area is in focus. When it is in focus, the procedure moves to step 1025. When it is not in focus, the procedure returns to step 1006 in FIG. 26A.

In the next step 1025, a photometrical operation is carried out. In the next step 1026, it is decided whether or not the switch SW2 (not shown) is turned on by the second stroke of a release button. When the switch SW2 is turned on, the CPU procedure advances to step 1027. When the switch SW2 is not turned on, the procedure moves to step 1005 shown in FIG. 26A. In step 1027, a shutter control circuit SHT is driven to perform the exposure operation. In the next step 1028, a film feeding operation is carried out. In the subsequent step 1029, it is decided whether a continuous shooting mode is performed in this photographing operation. When the continuous shooting mode is carried out, the CPU procedure returns to step 1006 shown in FIG. 26A. When the continuous shooting mode is not carried out, the procedure returns to step 1005 shown in FIG. 26A.

Figure 28:
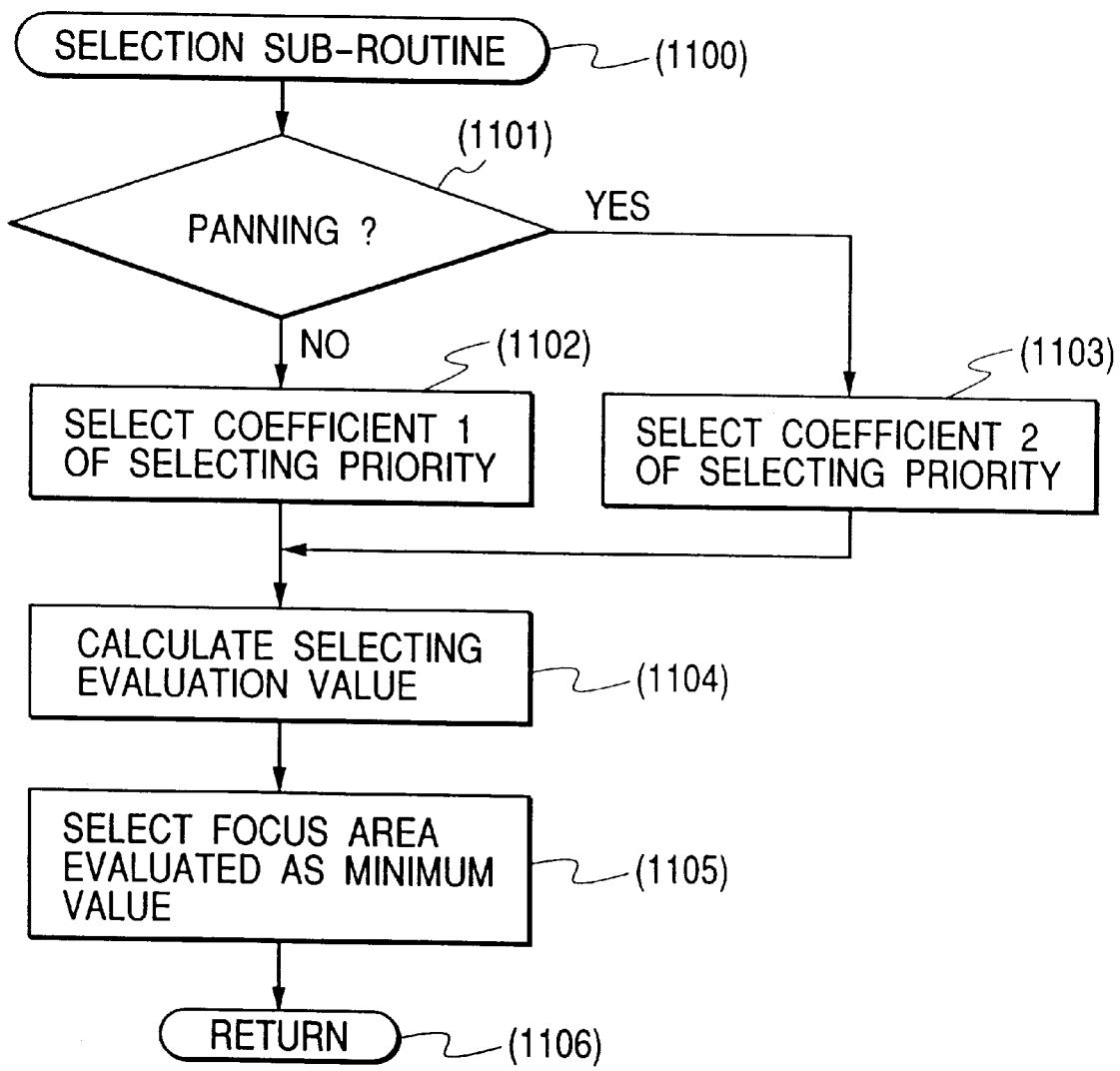
FIG. 28 is a flowchart showing the operation of the automatic focusing camera according to the eighth embodiment of the present invention upon automatic selection of a focus detecting point.

Now, an operation for automatically selecting the focus area which is executed in step 1021 in FIG. 27 will be explained referring to the flowchart of FIG. 28.

The automatic selection of the focus area is a subroutine work. The procedure for automatic selection of the focus area is started from step 1101 via step 1100 in FIG. 28.

Initially, in step 1101, it is decided whether or not an angular velocity no lower than a predetermined speed is detected for a time no shorter than a predetermined time based on angular velocity information obtained from the vibration gyroscope GR, and then, a panning operation is detected. In step 1101, if the panning operation of the camera is not detected, the procedure advances to step 1102 to select the coefficients 1 of selecting priority in the focus areas shown in (b) in FIG. 25, and the procedure advances to step 1104. On the other hand, when the panning operation is detected, the procedure advances from step 1101 to step 1103 to select the coefficients 2 of selecting priority in the focus areas shown in (e) in FIG. 25 and the procedure advances to step 1104. As described before, in the case of the coefficients 1 of selecting priority in the focus areas, all the focus areas can be easily selected in the same manner. In the case of coefficients 2 of selecting priority in the focus areas, the coefficients located in the central parts are small and the evaluation values for selection in the focus area are also small as a result of calculation.

FIG. 29 is a diagram showing distance data obtained in each of the focus areas in a metric representation. In step 1104, the evaluation values for selection in the focus areas are calculated by multiplying the distance data shown in FIG. 29 by the coefficients of selecting priority in the focus areas, and the procedure advances to step 1105. In step 1105, the focus area of a minimum value among the evaluation values for selection in the focus areas is selected. For instance, with the distance information as shown in (a) or (d) in FIG. 25, the focus area marked with a circle as illustrated in (c) or (f) in FIG. 25 is selected. Then, the procedure advances to step 1106 to return the subroutine and returns to the main routine.

According to the eighth embodiment of the invention described above, when the panning operation of the camera is carried out, the coefficients corresponding to the respective distance information obtained in the plurality of focus areas are changed (as compared with the case in which the panning operation is not carried out) and the evaluation values for selection are changed so that the focus areas located in the central parts can be readily selected. Accordingly, even at the time of a stationary state or a panning state, a more appropriate focus area can be easily selected depending on individual photographing states and the photographing operation can be more smoothly carried out.

(Ninth Embodiment)

Figure 30:
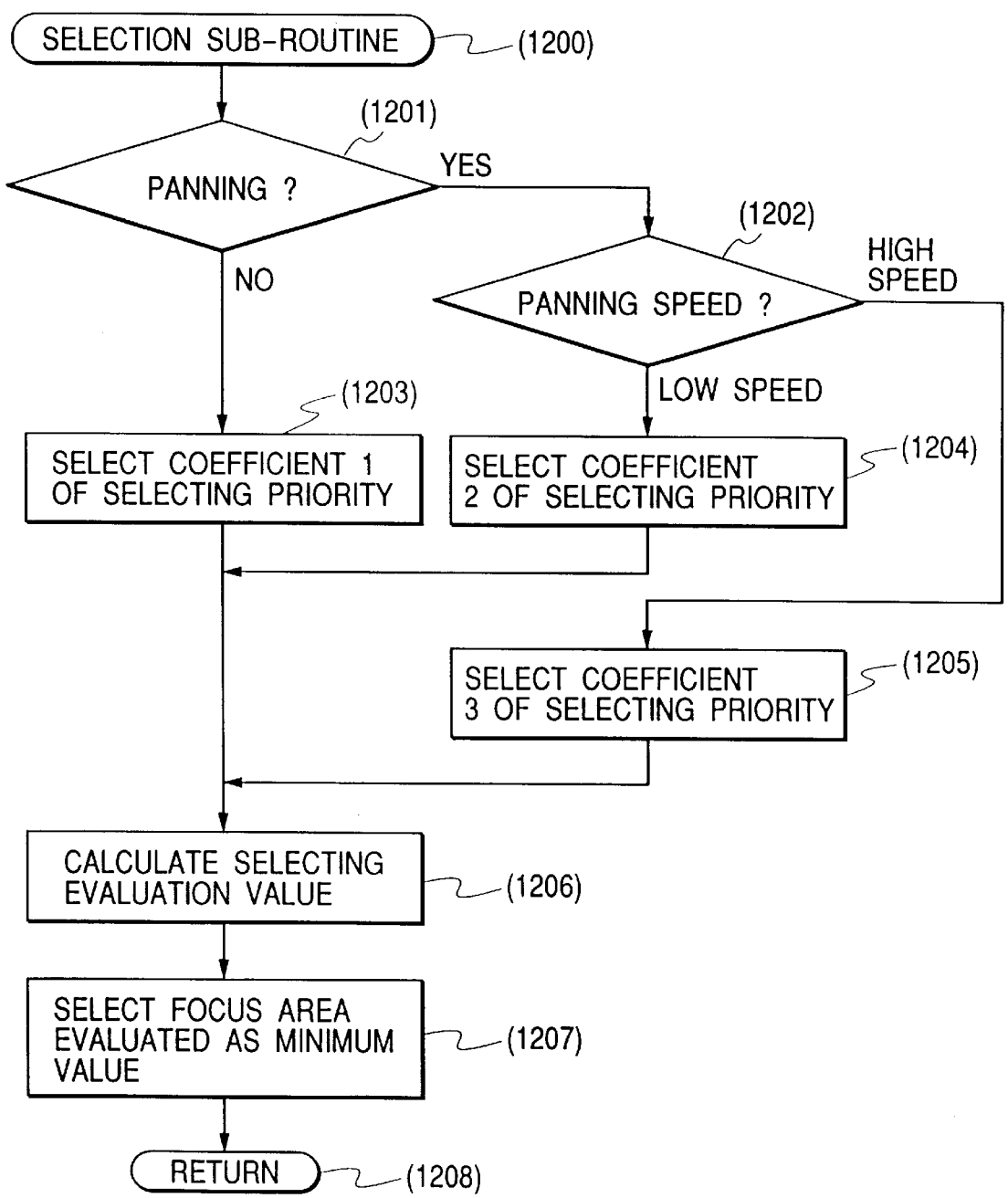
FIG. 30 is a flowchart showing the operation of an automatic focusing camera according to a ninth embodiment of the present invention upon automatic selection of a focus detecting point.

FIG. 30 is a flowchart showing an operation for automatically selecting the focus area according to a ninth embodiment of the present invention. Since the electric constitution of the camera or a main routine are the same as those of the above-mentioned eighth embodiment, an explanation thereof will be omitted.

When a subroutine is called, an operation is started from step 1201 via step 1200. Initially, in step 1201, it is decided whether or not an angular velocity no lower than a predetermined speed is detected for a time no shorter than a predetermined time based on angular velocity information obtained from the vibration gyroscope GR, and then, a panning operation is detected. In step 1201, when the panning operation of the camera is not detected, the procedure advances to step 1203 to select the coefficients 1 of selecting priority in the focus areas shown in (b) in FIG. 31, and the procedure advances to step 1206. When the coefficients 1 of selecting priority in the focus areas are selected, all the focus area can be similarly selected with easy. As the panning speed increases, the evaluation values for selection in the focus areas located in the central parts become smaller as a result of calculation.

On the other hand, when a panning operation is detected, the procedure advances to step 1202 to decide whether the panning speed is high or low. When the panning speed is low (lower than a reference speed), the procedure advances to step 1204 to select the coefficients 2 of selecting priority in the focus areas shown in (e) in FIG. 31 and the procedure advances to step 1206. When the panning speed is high (no lower than a reference speed), the procedure advances to step 1205 to select the coefficients 3 of selecting priority in the focus areas shown in (h) in FIG. 31 and then, proceeds to step 1206.

In step 1206, the evaluation values for selection in the focus areas in (c), (f) or (i) in FIG. 31 are calculated by multiplying distance data shown in (a), (d) and (g) in FIG. 31 by any of the coefficients 1 to 3 of selecting priority in the focus areas, and then, the procedure advances to step 1207. Then, in step 1207, the focus area of a minimum value is selected from among the evaluation values for selection in the focus areas. For instance, with the distance information as shown in (a), (d) or (g) in FIG. 31, the focus area marked with a circle as illustrated in (c), (f) or (i) in FIG. 31 is selected. Then, the procedure advances to step 1208 to return the subroutine and returns to the main routine.

According to the ninth embodiment of the invention described above, the coefficients corresponding to the respective distance information obtained depending on the state of the panning velocity of the camera are changed and the evaluation values for selection are changed so that the focus areas located in the central parts can be readily selected. Accordingly, even when the state of panning operation change successively is changed, a more appropriate focus area can be easily selected depending on individual photographing states and the photographing operation can be carried out more smoothly.

(Tenth Embodiment)

Figure 32:
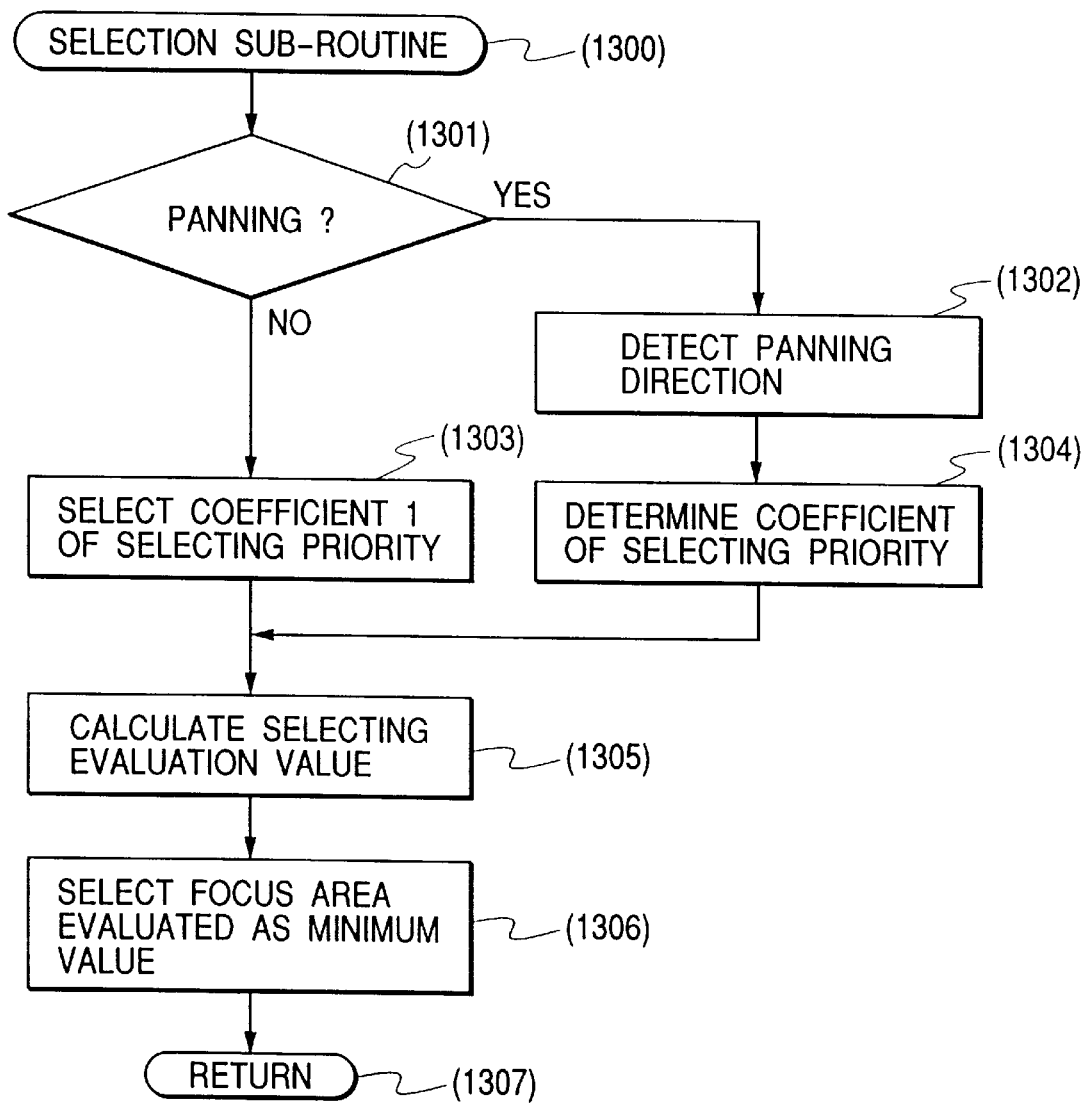
FIG. 32 is a flowchart showing the operation of an automatic focusing camera according to a tenth embodiment of the present invention upon automatic selection of a focus detecting point.

FIG. 32 is a flowchart showing an operation for automatic selection of the focus area according to a tenth embodiment of the present invention. The electric construction of the camera and main routine are equal to those of the above-mentioned eighth embodiment, and therefore, a detailed explanation thereof will be omitted.

When a subroutine is called, an operation is started from step 1301 through step 1300. Initially, in step 1301, it is decided whether or not an angular velocity no lower than a predetermined speed is detected for a time no shorter than a predetermined time based on angular velocity information obtained from the vibration gyroscope GR, and then, a panning operation is detected. In step 1301, the panning operation of the camera is not detected, the procedure advances to step 1303 to select the coefficients 1 of selecting priority in the focus areas shown in (*b*) in FIG. 33, and the procedure advances to step 1305. When the coefficients 1 of selecting priority in the focus areas are selected, all the focus areas can be similarly selected with the same ease. At the time of panning operation of the camera, and the evaluation values for selection in the focus areas in the same direction as the panning direction become smaller as a result of calculation.

On the other hand, when the panning operation is detected, the procedure advances to step 1302 to detect the panning direction and the procedure moves to step 1304. The direction of panning can be detected from the speed directions of two vibration gyroscopes GR. In step 1304, the coefficient of selecting priority in the focus areas nearest to the panning direction (horizontal direction illustrated by arrow marks in FIG. 33) is selected from among the coefficients 2 to 5 of selecting priority in the focus areas shown in (*e*), (*h*), (*k*) and (*n*) in FIG. 33 and the procedure advances to step 1305.

In step 1305, the evaluation values for selection in the focus areas of, for example, (*c*), (*f*), (*i*), (*l*) and (*o*) in FIG. 33 are calculated by multiplying the distance data shown in (*a*), (*d*), (*g*), (*j*) and (*m*) in FIG. 33 by any of the coefficients 1 to 5 of selecting priority in the focus areas and then, the procedure advances to step 1306. Then, in step 1306, the focus area of a minimum value is selected from among the evaluation values for selection in the focus areas. For instance, with the distance information as shown in (*a*), (*d*), (*g*), (*j*) and (*m*) in FIG. 33, the focus areas marked with circles as illustrated in (*c*), (*f*), (*i*), (*l*) and (*o*) in FIG. 33 are selected. Then, the procedure advances to step 1307 to return the subroutine and returns to the main routine.

According to the tenth embodiment of the invention described above, when the panning operation of the camera is carried out, the coefficients corresponding to the respective distance information obtained depending on the state of the panning direction of the camera are changed and the evaluation values for selection are changed so that the focus areas in the panning direction can be readily selected. Accordingly, even when the state of panning changing continuously is changed, a more suitable focus area can be easily selected depending on individual photographing states and the photographing operation can be more smoothly carried out.

(Eleventh Embodiment)

Figure 34:
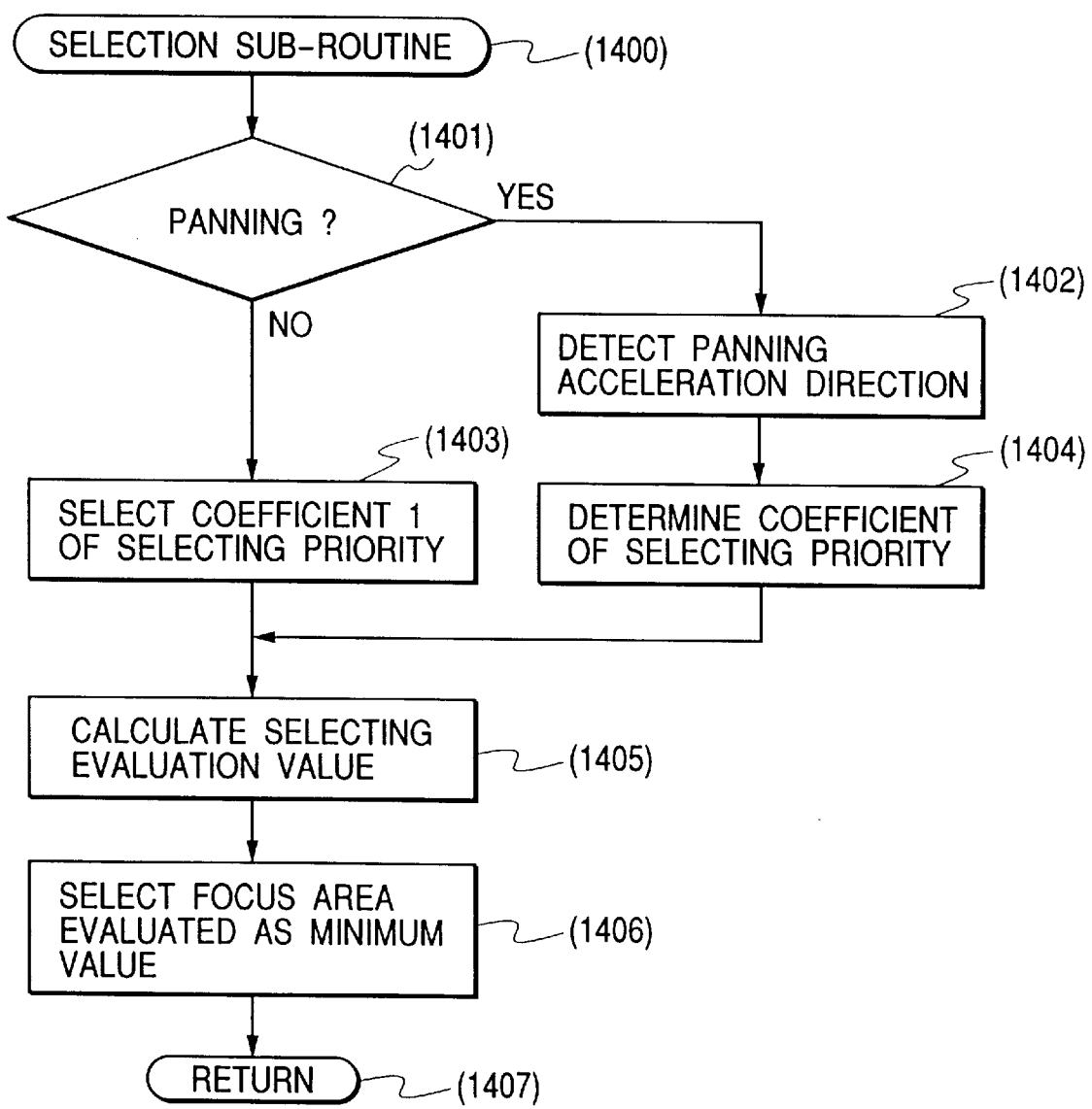
FIG. 34 is a flowchart showing the operation of an automatic focusing camera according to an eleventh embodiment of the present invention upon automatic selection of a focus detecting point.

FIG. 34 is a flowchart showing an operation for automatically selecting the focus areas in the camera according to an eleventh embodiment of the present invention. The electric construction of the camera and a main routine are the same as those of the above-described eighth embodiment, and therefore, an explanation thereof will be omitted for simplicity.

When a subroutine is called, an operation is started from step 1401 via step 1400. Initially, in step 1401, it is decided whether or not an angular velocity no lower than a predetermined speed is detected for a time no shorter than a predetermined time based on angular velocity information obtained from the vibration gyroscope GR, and then, a panning operation is detected. In step 1401, when the panning operation of the camera is not detected, the procedure advances to step 1403 to select the coefficients 1 of selecting priority in the focus areas shown in (*b*) in FIG. 35, and then advances to step 1405. When the coefficients 1 of selecting priority in the focus areas are selected, all the focus areas can be easily selected in the same manner. At the time of panning of the camera, the evaluation values for selection in the focus areas in the same direction as the acceleration direction upon panning operation become smaller as a result of calculation.

On the other hand, when the panning operation is detected, the procedure advances to step 1402 to detect the acceleration direction of the panning operation, and then, the procedure moves to step 1404. The acceleration direction of the panning operation is calculated by differentiating the speeds of two vibration gyroscopes. In the next step 1404, the coefficients of selecting priority nearest to the acceleration directions of panning operation directions shown by arrow marks in FIG. 35) are elected from among the coefficients 2 to 9 of electing priority in the focus areas shown in (*e*), (*h*), (*k*), (*n*), (*q*), (*t*), (*w*), (*z*) in FIG. 35 and the procedure advances to step 1405.

In step 1405, the evaluation values for selection of (*c*), (*f*), (*i*), (*l*), (*o*), (*r*), (*u*), (*x*) and (*aa*) in FIG. 35 are calculated by multiplying distance data shown in (*a*), (*d*), (*g*), (*j*), (*m*), (*p*), (*s*), (*v*), (*y*) in FIG. 35 by any of the coefficients 1 to 9 of selecting priority in the focus areas and then, the procedure moves to step 1406. In step 1406, the focus area with a minimum value is selected from among the evaluation values for selection in the focus areas. For instance, with the distance information shown in (*a*), (*d*), (*g*), (*j*), (*m*), (*p*), (*s*), (*v*) and (*y*) in FIG. 35, the focus areas marked with circles as illustrated in (*c*), (*f*), (*i*), (*l*), (*o*), (*r*), (*u*), (*x*) and (*aa*) in FIG. 35 are selected. Then, the procedure advances to step 1407 to return the subroutine and returns to the main routine.

According to the eleventh embodiment of the camera of the invention, the coefficients corresponding to the respectively obtained distance information depending on the state of acceleration direction upon panning of the camera are changed and the evaluation values for selection in the focus areas are changed so that the focus areas in the acceleration direction upon panning the camera can be readily selected. Accordingly, even when the state of panning changing continuously and successively is changed, a more suitable focus area can be easily chosen based on the acceleration of a photographing device and photographing work can be more smoothly carried out.

(Twelfth Embodiment)

Figure 36:
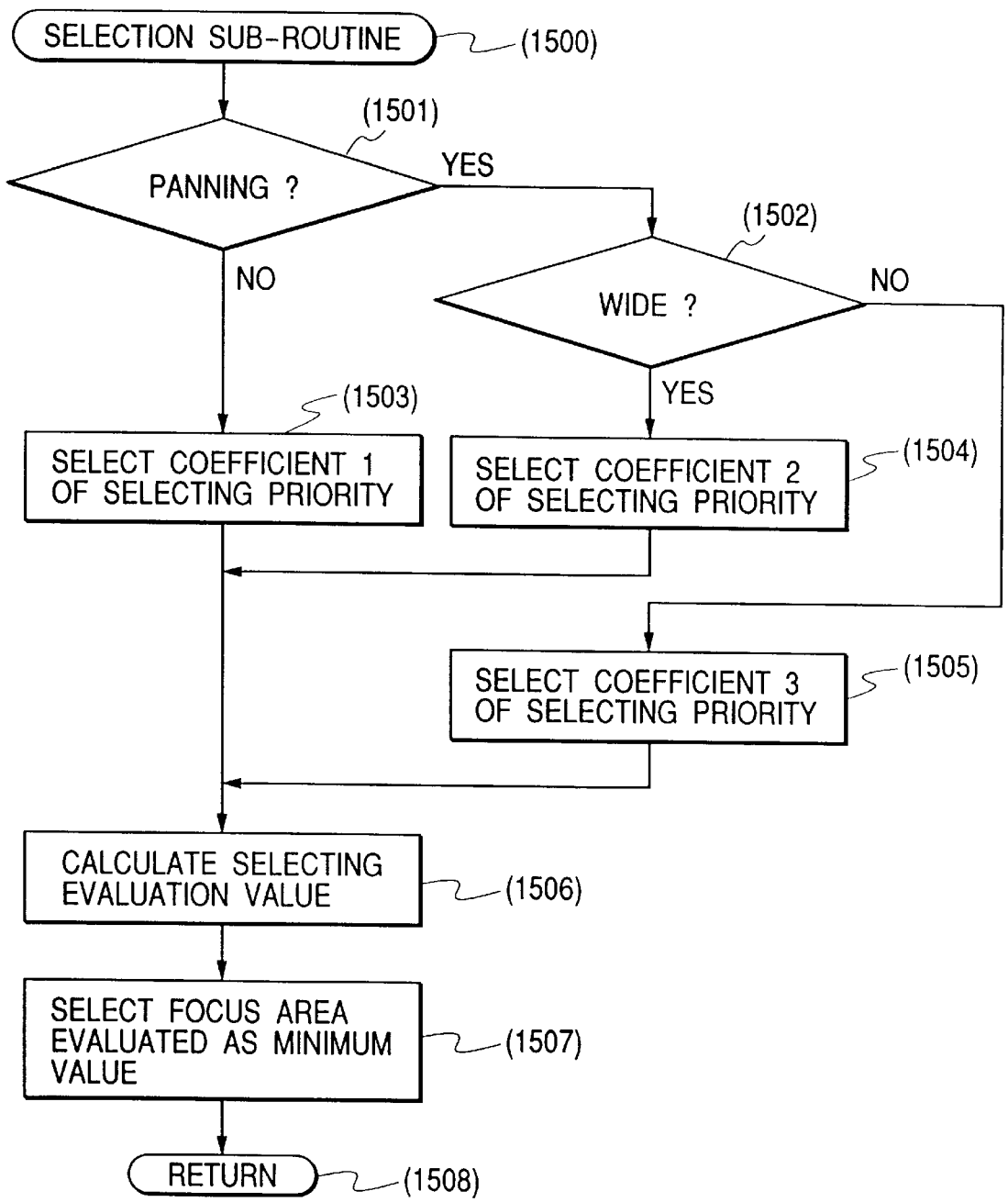
FIG. 36 is a flowchart showing the operation of an automatic focusing camera according to a twelfth embodiment of the present invention at the time of automatic selection of a focus detecting point.

FIG. 36 is a flowchart showing the automatically selecting operation of the focus areas in a twelfth embodiment of the camera of the invention. The electric construction of the camera and main routine are the same as those of the above-mentioned eighth embodiment, so a detailed explanation thereof will be omitted.

When a subroutine is called, an operation is started from step 1501 via step 1500. Initially, in step 1501, it is decided whether or not an angular velocity no lower than a predetermined speed is detected for a time no shorter than a predetermined time based on angular velocity information obtained from the vibration gyroscope GR, and then, a panning operation is detected. In step 1501, when the panning operation of the camera is not detected, the procedure advances to step 1503 to select the coefficients 1 of selecting priority in the focus areas shown in (*b*) in FIG. 37, and the procedure advances to step 1506. When the coefficients 1 of selecting priority in the focus areas are selected, all the focus areas can be selected with the same ease in a similar way. Upon panning operation of the camera, the coefficients are changed so as to meet the focal distance so that the evaluation values for selection in the focus areas can be selected.

On the other hand, when the panning operation of the camera is detected, the procedure advances to step 1502 to detect the zoom position from the zoom encoder ENCZ in the lens, obtain the focal distance of the lens and decide whether the focal distance is located on the wide scope side or the telescopic side areas, when the panning operation is detected by said panning detector. When the focal distance is located in the wide side, the procedure advances to step 1504 to select the coefficients 2 of selecting priority in the focus areas shown in (*e*) in FIG. 37, and then moves to step 1506. When the focal distance is located in the telescopic side, the procedure advances to step 1505 to select the coefficients 3 of selecting priority in the focus areas shown in (*h*) in FIG. 37 and then, moves to step 1506.

In step 1506, the evaluation values for selection in the focus areas shown in (*c*), (*f*) or (*i*) in FIG. 37 are calculated by multiplying the distance data shown in (*a*), (*d*) and (*g*) in FIG. 37 by any of the coefficients 1 to 3 of selecting priority in the focus areas, and then, the procedure advances to step 1507. in step 1507, the focus area with a minimum value is selected among the evaluation values for selection in the focus areas. For example, with distance information as shown in (*a*), (*d*) and (*g*) in FIG. 37, the focus area marked with a circle illustrated in (*c*), (*f*) or (*i*) in FIG. 37 is selected. Then, the procedure advances to step 1508 to return the subroutine and returns to the main routine.

According to the twelfth embodiment of the camera of the invention described above, when the panning operation of the camera is carried out, the coefficients corresponding to the respectively obtained distance information of focus areas are changed based on the focal distance of a photographing system and the evaluation values for selection so that the focus areas suitable for the state of panning can be readily selected. Therefore, the focus areas pertinent to the focal distance can be chosen with easiness upon panning of the camera and a photographing operation can be more smoothly carried out.

(Modifications)

According to the above-described embodiments 8 to 12, although the coefficients of selecting priority in the focus areas are changed depending on the states of panning (a state whether the panning operation is performed or not, panning speed and direction at that time, and the state of acceleration) to change the evaluation values for selection, the present invention is not limited thereto. Needless to say, for instance, a using state in which an object to be photographed or shot is followed on a vehicle, such as a using state in which a main object to be photographed and the camera change relatively to each other-may be detected so that the coefficients of selecting priority in the focus areas and the evaluation values for selection can be changed.

Furthermore, although the above-stated embodiments are applied to the camera, it goes without saying that the present invention is not limited thereto and may be applied to other optical devices.

Furthermore, according to the above embodiments, a plurality of areas are exemplified as the focus areas, it should be noted that areas (focus areas) for detecting distance measurement information may be used.

Figure 24:
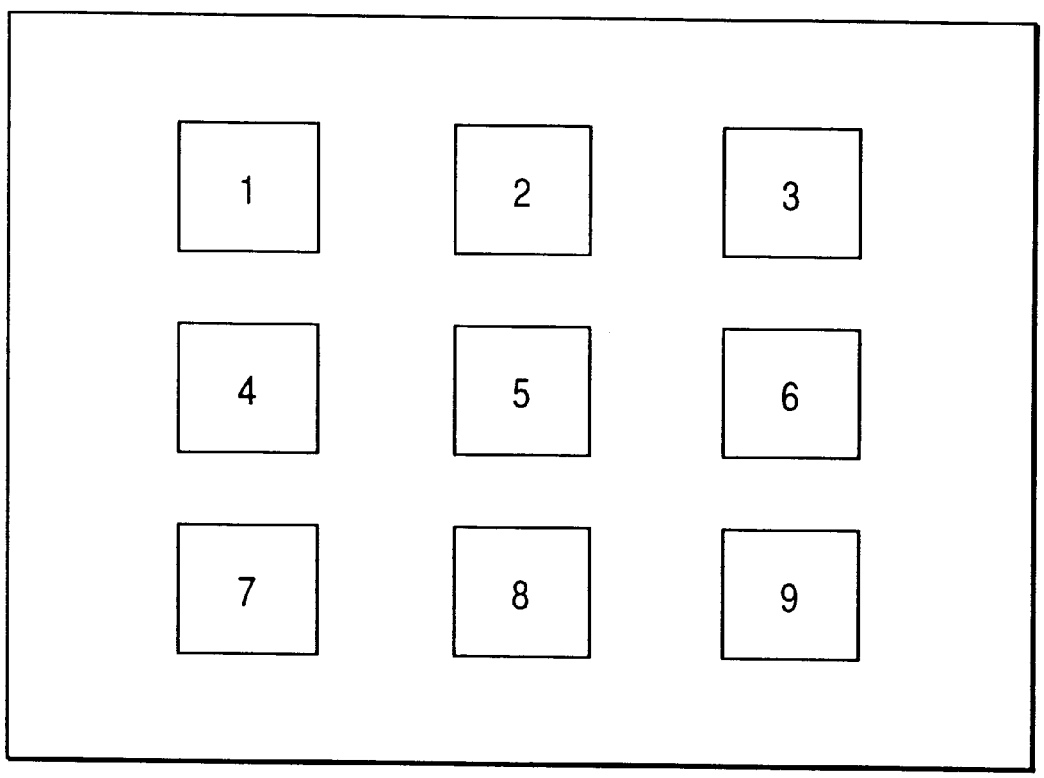
FIG. 24 is a diagram for explaining a focus detecting point provided in the automatic focusing camera according to the eighth embodiment of the present invention.

Furthermore, the number of areas is not limited to nine as illustrated in FIG. 24 or the like and may be not smaller or not larger than nine.

Besides, needless to say, the present invention may be constituted by combining the respective embodiments mentioned above or properly combining the technical components thereof together.

(Thirteenth Embodiment)

Figure 38:
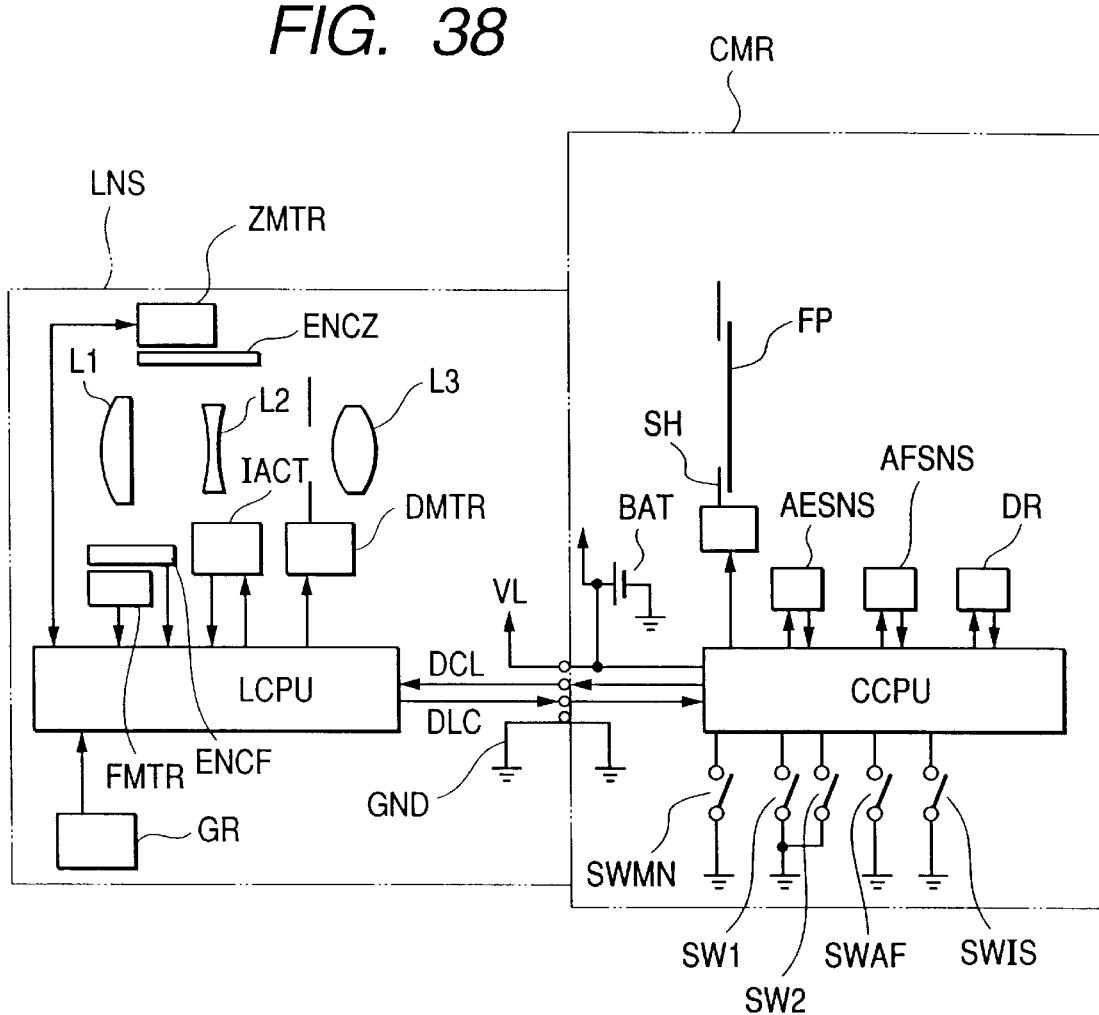
FIG. 38 is a block diagram showing the schematic construction of a camera according to a thirteenth embodiment of the present invention.

FIG. 38 is a block diagram showing the construction of main parts according to a thirteenth embodiment of-the present invention. In FIG. 38, CMR designates a camera main body, and LNS designates a lens detachably attached to the camera main body CMR.

Initially, the camera main body CMR side will be described below. A CCPU is a microcomputer in a camera and a one-chip-microcomputer having ROM, RAM, A/D and D/A converting functions and performs a series of operations including an automatic exposure control (AE), an automatic focus adjustment (AF) and a film winding (drive), etc., in accordance with the sequence program of the camera stored in the ROM.

Accordingly, the microcomputer CCPU in the camera communicates with peripheral circuits in the camera main body CMR and the lens LNS to control the operations of the respective circuits or the lens. Four sets of connecting terminals are provided in a mount part for connecting the camera main body CMR to the lens LNS. BAT represents a power source in a camera and serves to supply power to the respective circuit or an actuator in the camera and also to the lens LNS through a line VL.

DCL is a line for transmitting a signal from the microcomputer CCPU in the camera to a microcomputer LCPU in the lens described below. DLC is a line for transmitting a signal from the microcomputer LCPIJ in the lens to the microcomputer CCPU in the camera. The camera CMR controls the lens LNS through the two lines. Furthermore, respective grounds are connected together through a line GND.

FP designates a photosensitive film or an image forming surface on which an image pick-up element is arranged and a shutter SH comprising a shading vane and a vane driving control part is arranged immediately before the photosensitive film. AESNS represents a photometry device for measuring the luminance or brightness of an object to be shot. AFSEN is a focus detector for detecting the focus state of the image of the object to be shot and DR is a feeder (drive device) for feeding a film or charging the shutter with power.

SWMN is a main switch. When this switch SWMN is turned on, the microcomputer CCPU permits a predetermined program related to a photographing operation to be executed. SW1 and SW2 are switches interlocking with the release button of the camera and are respectively turned on by pressing down the release button not shown to a first stroke position and a second stroke position.

Next, the construction of the lens LNS side will be described below. LCPU designates a microcomputer in the lens which has ROM, RAM, A/D and D/A converting functions similarly to the microcomputer CCPU in the camera and serves to drive and control a focusing motor, a zooming motor, an aperture control motor and an image blur correcting actuator, which will be described later, in accordance with an instruction sent through the signal line DCL from the microcomputer CCPU in the camera.

Furthermore, the various kinds of operating states of the lens or parameters peculiar to the lens are transmitted to the microcomputer CCPU in the camera through the signal line DLC. L1, L2 and L3 designate a first group, a second group and a third group of lenses which are respectively composed of a plurality of lenses. These groups of lenses constitute a photographing optical system equipped with a zooming function. The image of an object to be photographed or shot is formed on the image forming surface FP of the camera main body CMR by the photographing optical system.

FMTR is a focusing motor which performs a focusing operation by moving forward or backward the first group of lenses L1 in the direction of an optical axis. The position of the first group of lenses L1, that is to say, information corresponding to the distance of the object to be photographed is detected by an focus encoder ENCF which transmits the information to the microcomputer LCPU. ZMTR is a zooming motor which serves to perform a zooming operation by moving forward and backward the first and second groups of lenses L1 and L2 with a predetermined relationship by a zoom mechanism not shown. The zooming condition is detected by a zoom encoder ENCZ which transmits the zooming condition to the microcomputer LCPU. DMTR designates a step motor for controlling an aperture or diaphragm.

GR is a hand vibration detection sensor such as a vibration gyroscope which detects angular vibration in the vertical or pitch direction and the horizontal or yaw direction of the camera. The hand vibration detection sensor transmits the detected results to the microcomputer LCPU. IACT designates an actuator which corrects the image blur of the second group of lenses L2 supported by a mechanism not shown and drives these lenses in respective directions so that the second group of lenses can be shifted independently in the two-dimensional directions on a plane perpendicular to the photographing optical axis. The second group of lenses L2 are shifted so that the image formed on the image forming surface FP can be also shifted.

Therefore, the second group of lenses L2 are shifted and driven based on hand vibration information from the hand vibration detection sensor GR, so that the image blur due to the hand vibration can be corrected. In this case, the image blur is corrected independently in the two pitch and yaw directions, so that two sets of hand vibration detection sensors GR and image blur correcting actuators IACT are respectively provided for correcting the pitch and yaw directions.

As for the AF mode of the camera, a one-shoot AF (AF mode 1), a servo AF (AF mode 2), a one-shoot AF2 (AF mode 3) and a servo AF2 (AF mode 4) can be set by a switch SWAF.

The one-shoot AF is an AF mode that AF and AE are started when a switch SW1 is turned on and, once a focus is adjusted, the AF is fixed thereafter. In order to take the focus again, the switch SW1 must be turned on again.

The servo AF is an AF mode for successively and repeatedly performing focus detecting operations while the switch SW1 is turned on, in order to photograph or shoot a moving object.

The one-shoot AF2 is an AF mode that a focus detecting operation is inhibited by judging that it is undesirable to start the focus adjusting operation carelessly, when the vibration speed of the camera is not lower than a predetermined value (when the camera moves seriously) from the information of a vibration sensor upon turning on the switch SW1, or when the vibration acceleration of the camera is not lower than a predetermined value (when the camera suddenly changes a direction) and the operation is started when the speed becomes lower than the predetermined value or the acceleration becomes lower than the predetermined value. Furthermore, the one-shoot AF2 is also an AF mode that the AF is fixed after a first focusing operation is completed.

According to the servo AF2, the AF and the AE are successively and repeatedly carried out after the switch SW1 is turned on and the focusing operation is simultaneously inhibited from being restarted by deciding it to be undesirable to restart the focusing operation carelessly when the vibration speed of the camera is not lower than a predetermined value (a state in which an object to be photographed can be followed with difficulty when the panning speed is too high) from the information of a vibration sensor or when the vibration acceleration of the camera is not lower than a predetermined value (when the camera suddenly turns to a different direction) and restarts the focusing operation again after the vibration speed is lower than the predetermined value and the vibration acceleration is lower than the predetermined value.

When the switch SW1 is turned on, the camera starts an AF drive and an AE corresponding to each of the respective AF modes. At this time, when an image blur correcting switch SWIS is turned on, the correction of the image blur is also started simultaneously. Then, when a switch SW2 is turned on, an exposure operation is performed.

Figure 39:
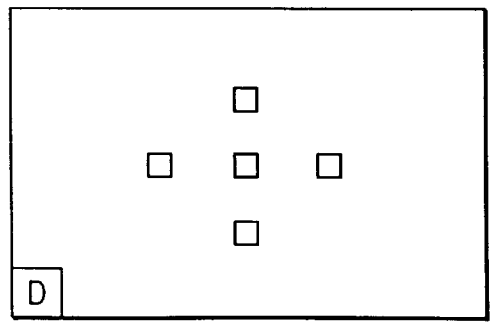
FIG. 39 is a diagram showing the construction of the inner part of the finder of the camera according to the thirteenth embodiment of the present invention.

FIG. 39 shows the inner part of the finder of the camera. Referring to the figure, five focus areas are two-dimensionally arranged. When taking the focus properly, the selected focus area is brightened in the finder so that the photographer can recognize which focus area is in focus. At a left part in a lower part, is provided a display part for showing that a focus detecting operation is inhibited. When "D" is displayed, this indicates that the focus detecting operation is inhibited. When "D" is not displayed, this informs the photographer that the focus detecting operation is not inhibited.

The movement or vibration of the camera is detected in accordance with the hand vibration information from the hand vibration detection sensor GR. Thus, when the image blur correcting function is turned on, the hand vibration detection sensor GR detects the hand vibration and the change of the position of the camera. When the image blur correcting function is turned off, an image blur correction drive system is not actuated and the hand vibration detection sensor GR is only actuated to detect the change of the position of the camera.

The hand vibration detection sensor GR is a vibration gyroscope which serves to detect the angular velocity of the vibration of the camera. Therefore, when the angular velocity not lower than a predetermined angular velocity value is detected for a predetermined time or more in a predetermined direction by the hand vibration detection sensor GR, or when the amount of change of the angular velocity (angular acceleration) of the camera is not lower than a predetermined value, the inhibition of a focus area detecting operation is decided.

Figure 40B:
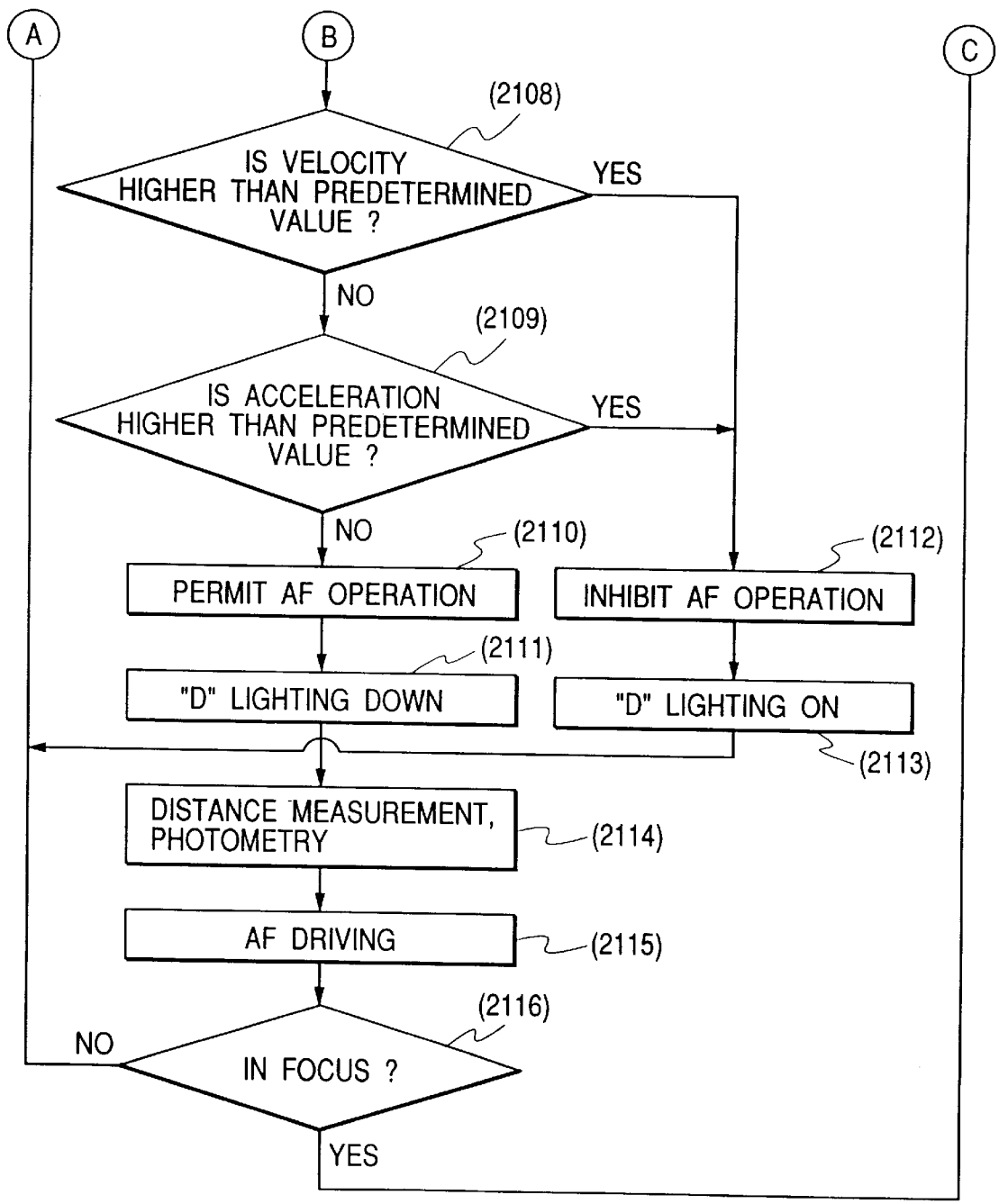
FIG. 40 which is comprised of FIGS. 40A and 40B is a flowchart showing the operation of the camera according to the thirteenth embodiment at the time of one shoot of AF2.

Now, the operation of the one-shoot AF2 will be described by employing the flowchart of FIGS. 40A and 40B. In step 2100, the system power supply of the camera is turned on. In next step 2101, the camera and the lens are initialized and the procedure moves to step 2102. In step 2102, when the switch SWAF for selecting the AF mode is pressed, the procedure advances to step 2103. When the switch is not pressed, the procedure advances to step 2104. In step 2103, the AF mode is selected in accordance with the operation of the AF mode selecting switch SWAF, and the procedure moves to step 2104.

In step 2104, it is decided whether the AF mode 3 is selected or not. When the AF mode 3 is selected, the procedure moves to step 2105. In step 2105, the vibration detection sensor is actuated and the procedure advances to step 2106. In step 2104, when the AF mode 3 is not selected, the procedure advances to step 2106. In step 2106, when the switch SW1 is turned on, the procedure proceeds to step

2107. When the switch SW1 is turned off, the procedure moves to step 2102.

In step 2107, it is decided whether the focus is completely taken once or not at the time of the one-shoot AF mode. When the focus is completely taken, the procedure advances to step 2117. When the focus is not completely taken, the procedure advances to step 2108. In step 2108, it is decided whether the angular velocity of the camera is not lower than a predetermined value or not based on the output of the vibration detection sensor. When the angular velocity is not lower than the predetermined value, the procedure advances to step 2112. When the angular velocity is lower than the predetermined value, the procedure moves to step 2109.

In step 2109, it is decided whether the angular acceleration of the camera is not lower than a predetermined value based on the output of the vibration detection sensor. When the angular acceleration is not lower than the predetermined value, the procedure advances to step 2112. When the angular velocity is lower than the predetermined value, the procedure moves to step 2110. In step 2110, the focus area detecting operation is permitted and the procedure advances to step 2111. In step 2111, the display of "D" showing the inhibition of the focus area detecting operation in the finder is turned off and the procedure advances to step 2114.

In step 2112, the focus area detecting operation is inhibited and the procedure advances to step 2113. In step 2113, the display of "D" showing the inhibition of the focus area detecting operation in the finder is turned on and the procedure advances to step 2107. In step 2114, the focus detecting and photometrical operation is performed based on the selected focus area. In a next step 2115, the AF is driven and the procedure advances to step 2116.

In step 2116, it is decided whether a focalized state is obtained or not. When the focalized state is obtained, the procedure advances to step 2117. When the focalized state is not obtained, the procedure moves to step 2107. In step 2117, it is decided whether the switch SW2 is pushed or not. When the switch SW2 is pushed, the procedure advances to step 2118. When the switch SW2 is not pushed, step moves to step 2106. In step 2118, an exposure operation is carried out. In a next step 2119, a feeding operation is performed and the procedure advances to step 2120. In step 2120, when a photographing operation is carried out at the time of a continuous shooting mode, the procedure moves to step 2107. When the photographing operation is not performed during a continuous shooting mode, the procedure moves to step 2106.

As apparent from the above description, when the position of the camera is greatly changed at the time of the one-shoot AF mode and an accurate focusing operation cannot be expected, the focusing operation is temporarily inhibited so that an object can be prevented from being out of focus seriously or an irrelevant object from being in focus. Furthermore, the inhibition of the focus area detecting operation is shown to the photographer, hence, he can understand the operating state of the camera.

Figure 41B:
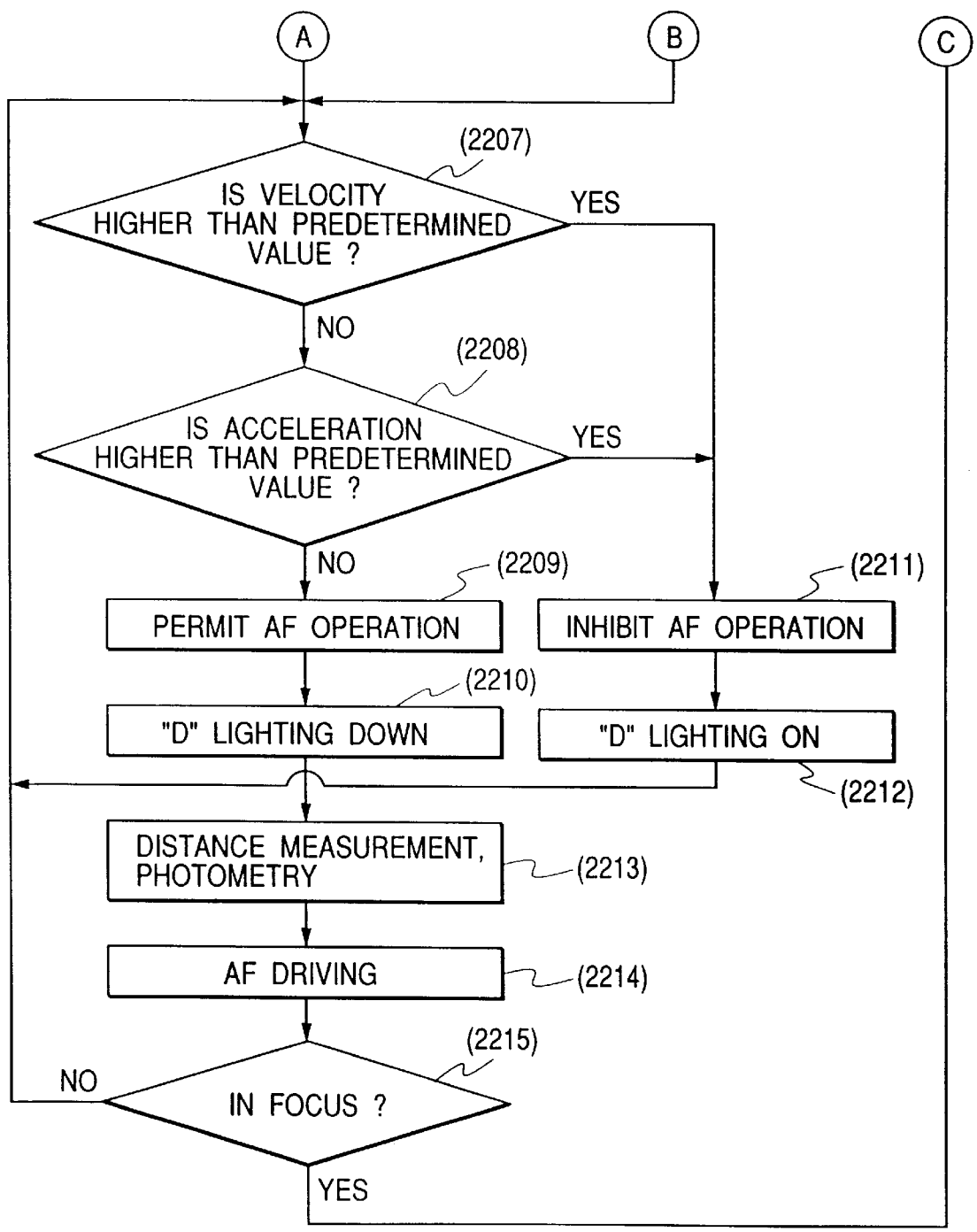
FIG. 41 which is comprised of FIGS. 41A and 41B is a flowchart showing the operation of the camera according to the thirteenth embodiment of the present invention upon servo AF2.

Now, the operation of the servo AF2 will be described by employing the flowchart of FIGS. 41A and 41B. In step 2200, the system power supply of the camera is turned on. In next step 2201, the camera and the lens are initialized and the procedure moves to step 2202. In step 2202, when the switch SWAF for selecting the AF mode is pressed, the procedure advances to step 2203. When the switch is not pressed, the procedure advances to step 2204. In step 2203, the AF mode is selected and the procedure moves to step 2204.

In step 2204, it is decided whether the AF mode 4 is selected or not. When the AF mode 4 is selected, the procedure moves to step 2205. In step 2205, the vibration detection sensor is actuated and the procedure advances to step 2206. In step 2204, when the AF mode 4 is not selected, the procedure advances to step 2206. In step 2206, when the switch SW1 is turned on, the procedure proceeds to step 2207. When the switch SW1 is turned off, the procedure moves to step 2202.

In step 2207, it is decided whether the angular velocity of the camera is not lower than a predetermined value or not based on the output of the vibration detection sensor. When the angular velocity is not lower than the predetermined value, the procedure advances to step 2211. When the angular velocity is lower than the predetermined value, the procedure moves to step 2208. In step 2208, it is decided whether the angular acceleration of the camera is not lower than a predetermined value or not based on the output of the vibration detection sensor. When the angular acceleration is not lower than the predetermined value, the procedure advances to step 2211. When the angular velocity is lower than the predetermined value, the procedure moves to step 2209.

In step 2209, the focus area detecting operation is permitted and the procedure advances to step 2210. In step 2210, the display of "D" showing the inhibition of the focus area detecting operation in the finder is turned off and the procedure advances to step 2213. In step 2211, the focus area detecting operation is inhibited and the procedure advances to step 2212. In step 2212, the display of "D" showing the inhibition of the focus area detecting operation in the finder is turned on and the procedure advances to step 2207.

In step 2213, the focus detecting and photometrical operation is performed based on the position of the selected focus area. In a next step 2214, the AF is driven and the procedure advances to step 2215. In step 2215, it is decided whether a focalized state is obtained or not. When the focalized state is obtained, the procedure advances to step 2216. When the focalized state is not obtained, the procedure moves to step 2207.

In step 2216, it is decided whether the switch SW2 is pushed or not. When the switch is pushed, the procedure advances to step 2217. When the switch SW2 is not pushed, step moves to step 2206. In step 2217, an exposure operation is carried out. In a next step 2118, a feeding operation is performed and the procedure advances to step 2219. In step 2219, when a photographing operation is carried out at the time of a continuous shooting mode, the procedure moves to step 2207. When the photographing operation is not performed during a continuous shooting mode, the procedure moves to step 2206.

As apparent from the above description, when, at the time of the servo AF mode, the photographer cannot follow an object to be photographed, such an object to be photographed such as a background which is not a desired object is prevented from being in focus, when the camera performs the focus area detecting operation as well as the focus adjusting operation at an unexpected timing, so that the object can be followed in an ordinary manner without uneasiness. Furthermore, the inhibition of the focus area detecting operation is given to the photographer, hence, he can understand the operating state of the camera.

It should be noted that the present invention is not limited to the constitutions of the embodiments mentioned above, and the present invention may be applied to any form which can achieve the functions described in the claims or the functions exhibited in the embodiments.

(Modifications)

According to the thirteenth embodiment of the camera of the invention, although the focus detecting operation itself is inhibited, needless to say, may be formed a constitution in which the focus detecting operation is performed but the focus adjusting operation that employs information obtained as a result of the focus detecting operation is not performed.

Furthermore, according to the above-mentioned embodiment, although the vibration gyroscope is used as the vibration detecting means, it goes without saying that the present invention is not limited thereto, and the present invention may be applied to any form for detecting vibration such as an angular acceleration sensor, an angular velocity sensor, a velocity sensor, an angular displacement sensor, a displacement sensor and a method for detecting an image blur itself.

In addition, according to the present embodiment, although the invention is applied to the camera having an image blur correcting function, it should be noted that the present invention does not necessarily need to have such function and may be applied to any form having vibration detecting means such as the vibration gyroscope.

Besides, although the present invention is applied to the camera such as a monocular reflector camera, a lens shutter camera, a video camera, etc., it should be of course that the present invention may be applied to other optical devices, other equipments and a constitution unit. Furthermore, the present invention may be properly constituted of the combination of the respective embodiments or the technical elements thereof together.

What is claimed is:

1. A camera which selects at least any one among a plurality of focus areas and adjusts the focus relative to an object located in the focus area, said camera comprising:
   a) panning detection means for detecting a panning operation; and
   b) focus area selecting means for selecting a specific focus area from said plurality of focus areas based on the detected result of said panning detection means, wherein said specific focus area is a focus area arbitrarily set by a user.

2. A camera according to claim 1, wherein said specific focus area is a focus area located at the central part of said plurality of focus areas.

3. A camera according to claim 1, wherein said panning detection means has a vibration sensor and detects the panning operation from the output of said vibration sensor.

4. A camera which selects at least any one of a plurality of focus areas and adjusts the focus relative to an object located in the focus area, said camera comprising:
   a) panning detection means for detecting a panning operation; and
   b) focus area selecting means for maintaining a focus area selected immediately before the panning operation, when the panning operation is detected by said panning detection means.

5. A camera which selects at least any one of a plurality of focus areas and adjusts the focus relative to an object located in the focus area, said camera comprising:
   a) image stabilizing means for selecting any image stabilizing mode among a plurality of image stabilizing modes;
   b) panning detection means for detecting a panning operation; and
   c) focus area selecting means for maintaining the focus area selected immediately before the panning operation, when a predetermined image stabilizing mode is selected by said image stabilizing means and the panning operation is detected by said panning detection means.

6. A camera which selects at least any one of a plurality of focus areas and adjusts the focus relative to an object located in the focus area, said camera comprising:
   a) panning direction detection means for detecting the direction of panning; and
   b) focus area selecting means for selecting a specific focus area from said plurality of focus areas in accordance with the detected result of said panning direction detection means.

7. A camera according to claim 6, wherein said focus area selecting means selects focus area rows parallel to the panning direction detected by said panning direction detection means from the plurality of focus areas.

8. A camera according to claim 7, wherein said focus area selecting means selects a focus area in which an object capable of being in focus in the nearest distance is located from said focus area rows.

9. A camera according to claim 6, wherein said focus area selecting means selects from the plurality of focus areas the focus area rows parallel to the panning direction detected by said panning direction detection means and located in the central parts of said plurality of focus areas.

10. A camera according to claim 9, wherein said focus area selecting means further selects a focus area in which an object capable of being in focus in the nearest distance from said focus area rows.

11. A camera according to claim 6, wherein said focus area selecting means selects focus area rows intersecting at right angles with the panning direction detected by said panning direction detection means from the plurality of focus areas.

12. A camera according to claim 11, wherein said focus area selecting means further selects a focus area in which an object capable of being in focus in the nearest distance is located from said focus area rows.

13. A camera according to claim 6, wherein said focus area selecting means selects from the plurality of focus areas focus area rows intersecting at right angles with the panning direction detected by said panning direction detection means and located at the central parts of said plurality of focus areas.

14. A camera according to claim 13, wherein said focus area selecting means further selects a focus area in which an object capable of being in focus in the nearest distance is located from said focus area rows.

15. A camera which selects at least any one of a plurality of focus areas and adjusts the focus relative to an object situated in the focus area, said camera comprising:
   a) panning detection means for detecting a panning operation;
   b) panning speed detection means for detecting panning speed when said panning detection means detects the panning operation; and
   c) focus area selecting means for selecting a specific focus area from said plurality of focus areas depending on the panning speed detected by said panning speed detection means.

16. A camera according to claim 15, wherein said focus area selecting means selects a preset focus area when the panning speed detected by said panning speed detection means is not lower than a predetermined value.

17. A camera according to claim 15, wherein said specific focus area is located at the central part of the said plurality of focus areas.

18. A camera according to claim 15, wherein said specific focus area is a focus area arbitrarily set by a user.

19. A camera which selects at least any one of a plurality of focus areas and adjusts the focus relative to an object located in the focus area, said camera comprising:
   a) panning detection means for detecting a panning operation;
   b) panning speed detection means for detecting panning speed when said panning detection means detects the panning operation; and
   c) focus area selecting means for maintaining a focus area selected just before the panning operation when the panning speed detected by said panning speed detection means is not higher than a predetermined value.

20. A camera which selects at least any one of a plurality of focus areas and adjusts the focus relative to an object located in the focus area, said camera comprising:
   a) panning detection means for detecting a panning operation; and
   b) focus area selecting means for changing a focus area selected immediately before the panning operation to a specific focus area, when the panning operation is detected by said panning detection means, and returning the specific focus area to the focus area selected immediately before the panning operation when the panning operation is not detected by said panning detection means.

21. A camera according to claim 20, wherein said specific focus area is located at the central part of said plurality of focus areas.

22. A camera according to claim 20, wherein said specific focus area is a focus area arbitrarily set by a user.

23. A camera which can output information concerning distance to an object in each of a plurality of focus areas and select at least one of the plurality of focus areas based on said information, said camera comprising:
   a) panning detection means for detecting a panning operation; and
   b) focus area selecting means for selecting a specific focus area from the plurality of focus areas based on the information concerning the distance to the object which is outputted for each of said plurality of focus areas and an information of selecting priority preset for each of said plurality of focus areas when the panning operation is detected by said panning detection means.

24. A camera according to claim 23, wherein the information of selecting priority preset for each of said plurality of focus areas is set so as to be easily selected in the central focus area of said plurality of focus areas.

25. A camera according to claim 23, further comprising: a panning speed detection means for detecting panning speed when the panning operation is detected by said panning detection means, wherein the information of selecting priority preset for each of said plurality of focus areas changes depending on the panning speed detected by said panning speed detection means.

26. A camera according to claim 23, further comprising:
   a panning direction detection means for detecting a panning direction when said panning detection means detects the panning operation, wherein the information of selecting priority preset for each of said plurality of focus areas changes depending on the panning direction detected by said panning direction detection means.

27. A camera according to claim 26, wherein the information of selecting priority preset for each of said plurality of focus areas is set in such a manner that a focus area included in focus area rows parallel to the panning direction detected by said panning direction detection means is readily selected among the plurality of focus areas.

28. A camera according to claim 23, further comprising:
   a panning acceleration direction detection means for detecting a panning acceleration direction when said panning detection means detects the panning operation, wherein the information of selecting priority preset for each of said plurality of focus areas changes depending on the panning acceleration direction detected by said panning acceleration direction detection means.

29. A camera according to claim 28, wherein the information of selecting priority preset for each of said plurality of focus areas is set so that a focus area located in the direction the same as the panning acceleration direction detected by said panning acceleration direction detection means is easily selected among the plurality of focus areas.

30. A camera according to claim 23, further comprising:
   a zooming state detection means for detecting the zooming state of a photographing lens, wherein the information of selecting priority preset for each of said plurality of focus areas changes depending on the zooming state of the photographing lens detected by said zooming state detection means.

31. A camera according to claim 30, wherein the information of selecting priority preset for each of said plurality of focus areas is set so that a peripheral focus area can be more readily selected when the zooming state of said photographing lens is in a wide side than when it is in a telescopic side.

32. A camera which adjusts the focus so as to be focused on an object, said camera comprising:
   a) vibration sensor for detecting the vibration of the camera; and
   b) control means for inhibiting a focus adjusting operation based on the output of said vibration sensor.

33. A camera according to claim 32, wherein said control means detects the vibration speed of the camera from the output of said vibration sensor and inhibits the focus adjusting operation when said vibration speed is not lower than a predetermined value.

34. A camera according to claim 32, wherein said control means detects the vibration acceleration of the camera from the output of said vibration sensor and inhibits the focus adjusting operation when said vibration acceleration is not lower than a predetermined value.

35. A camera according to claim 32, further comprising: display means for displaying that said control means inhibits the focus adjusting operation.

36. A camera comprising:
   a) focus detection means for detecting the focus to an object;
   b) focus adjusting means for adjusting the focus so as to be focused on the object based on the output of said focus detection means;
   c) vibration sensor for detecting the vibration of the camera; and
   d) control means for inhibiting a focus detecting operation by said focus detection means based on the output of said vibration sensor.

37. A camera according to claim 36, wherein said control means detects the vibration speed of the camera from the output of said vibration sensor and inhibits the focus adjusting operation when said vibration speed is not lower than a predetermined value.

38. A camera according to claim 36, wherein said control means detects the vibration acceleration of the camera from the output of said vibration sensor and inhibits the focus adjusting operation when said vibration acceleration is not lower than a predetermined value.

39. A camera according to claim 36, further comprising:

display means for displaying that the focus adjusting operation is inhibited by said control means.

\* \* \* \* \*

UNITED STATES PATENT AND TRADEMARK OFFICE
CERTIFICATE OF CORRECTION

PATENT NO.    : 6,081,668
DATED         : June 27, 2000
INVENTOR(S)   : Kiyomitsu Furuyama, et al.

It is certified that error appears in the above-identified patent and that said Letters Patent is hereby corrected as shown below:

Column 14,
Line 22, delete "to step 408.whetheror not t is judged whether or not" and insert -- to step 408. In step 408, it is judged whether or not --.

Column 16,
Line 52, delete "50B" and insert -- 508 --.

Column 33,
Line 49, delete "other-may be" and insert -- other may be --.

Column 34,
Line 3, delete "of-the present" and insert -- of the present --.
Line 28, delete "LCPIJ" and insert -- LCPU --.

Signed and Sealed this

Eleventh Day of September, 2001

Attest:

NICHOLAS P. GODICI
*Attesting Officer*    *Acting Director of the United States Patent and Trademark Office*